United States Patent

Yagisawa et al.

[19]

[11] Patent Number: 5,996,046
[45] Date of Patent: Nov. 30, 1999

[54] PARITY GENERATION SYSTEM FOR GENERATING NEW PARITY USING OLD DATA IN TEMPORARY STORAGE WITHOUT ACCESSING MAIN DISK STORAGE OF DISK DRIVE

[75] Inventors: Ikuya Yagisawa; Naoto Matsunami; Takashi Oeda; Yasunori Kaneda; Hiroshi Arakawa, all of Yokohama; Masahiro Takano, Hiratsuka, all of Japan

[73] Assignee: Hitachi, Ltd., Tokyo, Japan

[21] Appl. No.: 08/849,236

[22] PCT Filed: Dec. 8, 1995

[86] PCT No.: PCT/JP95/02518

§ 371 Date: Jun. 5, 1997

§ 102(e) Date: Jun. 5, 1997

[87] PCT Pub. No.: WO96/18141

PCT Pub. Date: Jun. 13, 1996

[30] Foreign Application Priority Data

Dec. 8, 1994 [JP] Japan .................... 6-305050

[51] Int. Cl.⁶ .................... G06F 11/00; G06F 12/00
[52] U.S. Cl. .................... 711/114; 711/112; 714/6; 714/7; 714/9; 714/10; 371/40.4; 371/49.2; 371/51.1

[58] Field of Search .................... 711/114, 112, 711/6, 7, 9, 10; 371/40.4, 49.2, 51.1; 395/182.04, 182.05, 182.07, 182.08

[56] References Cited

U.S. PATENT DOCUMENTS

| | | | |
|---|---|---|---|
| 5,289,418 | 2/1994 | Youngerth | 371/40.2 |
| 5,675,726 | 10/1997 | Hohenstein et al. | 371/40.4 |
| 5,734,812 | 3/1998 | Yamamoto et al. | 395/182.04 |
| 5,819,109 | 10/1998 | Davis | 395/835 |

*Primary Examiner*—Tuan V. Thai
*Attorney, Agent, or Firm*—Antonelli, Terry, Stout & Kraus, LLP

[57] ABSTRACT

In a computer system having a host system including a plurality of disk devices, a CPU, a main memory and a disk control circuit for controlling the disk devices, a host CPU executes a program unit to generate intermediate data for parity generation and holds it in a data holding unit to asynchronously conduct a data write process and a parity write process. A unit for generating parity and a unit for transferring data operate without the intervention of the CPU in accordance with a command issued by the program unit executed by the host CPU.

30 Claims, 25 Drawing Sheets

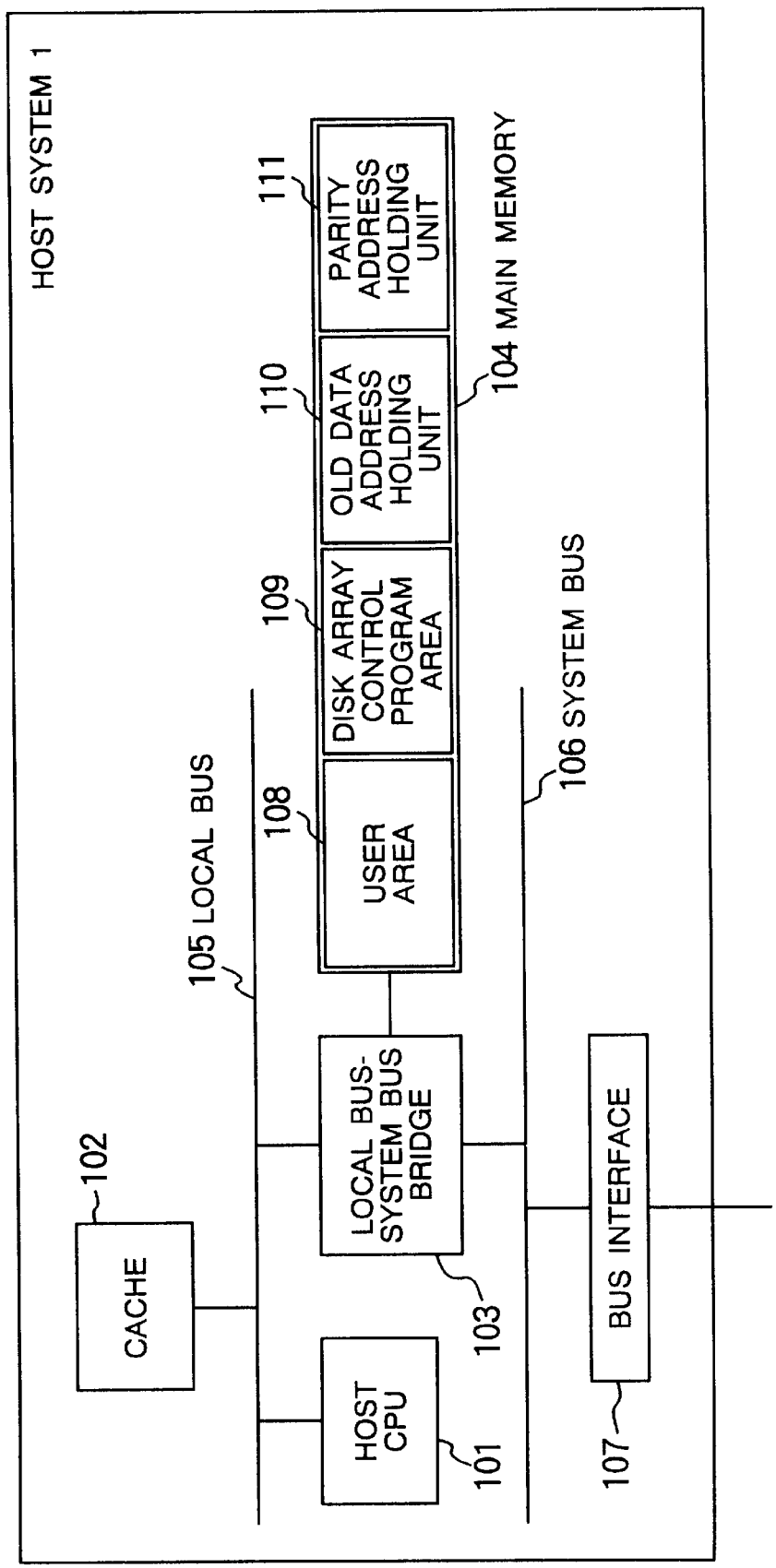

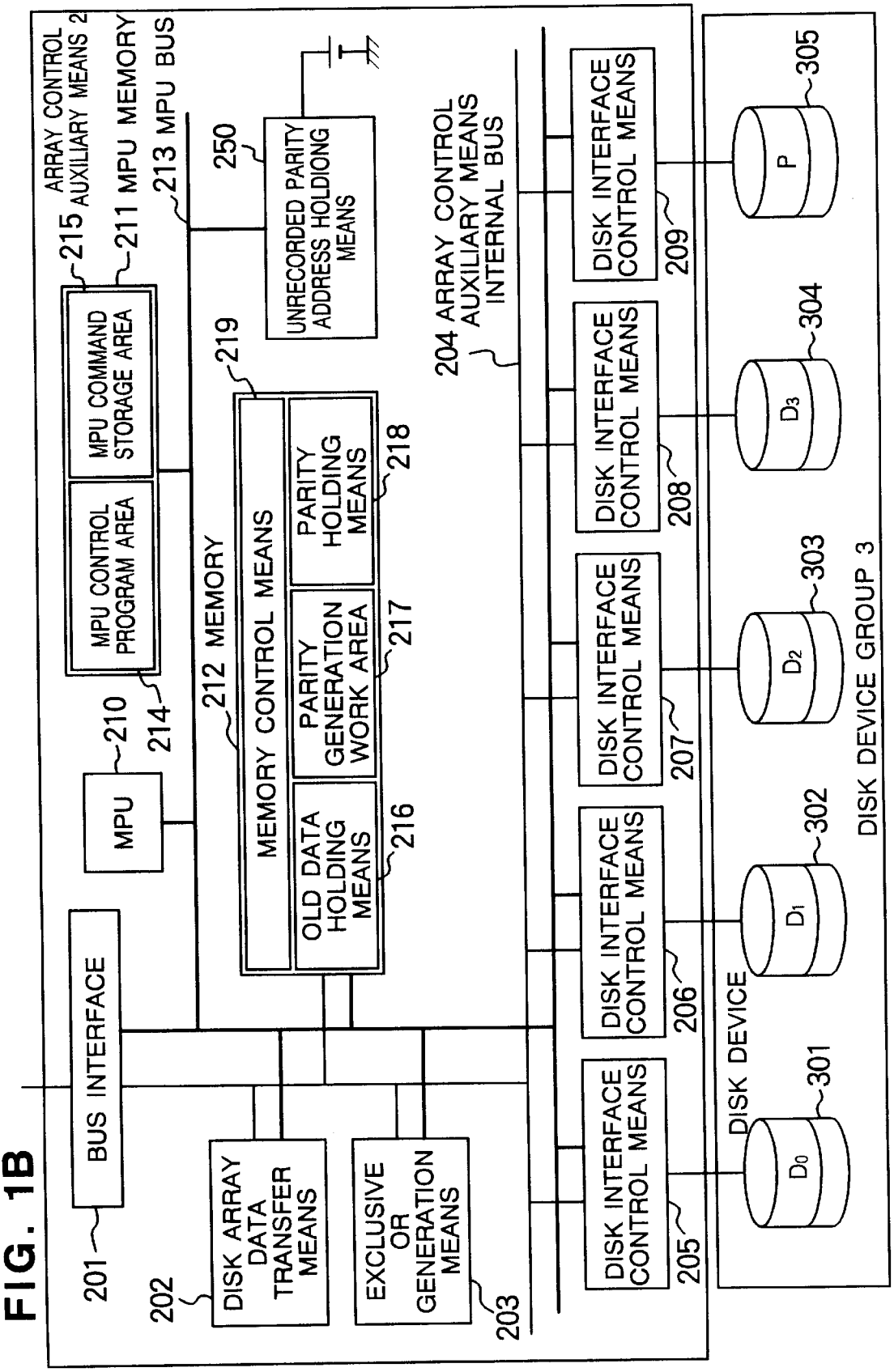

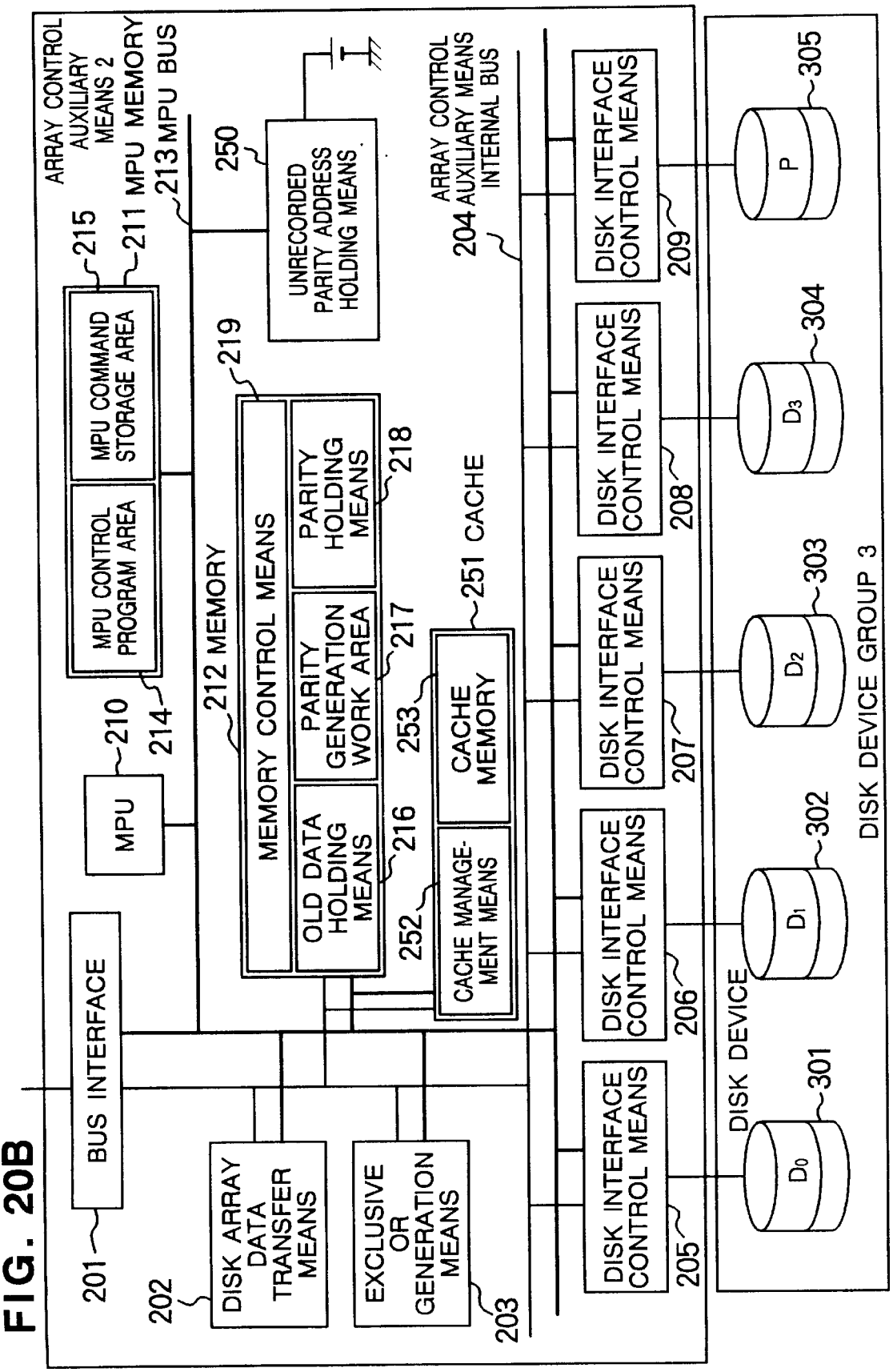

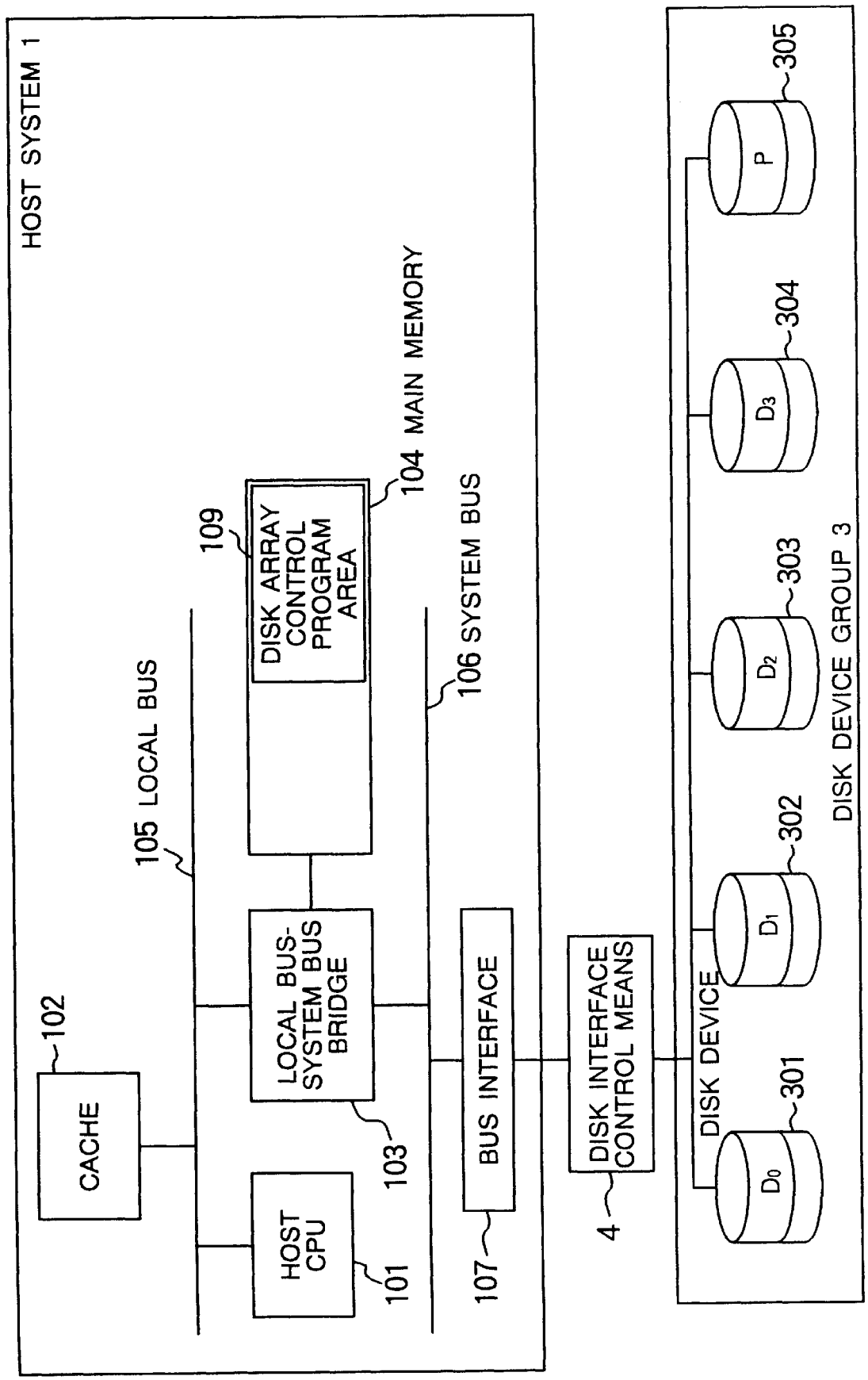

PARITY GENERATION SYSTEM FOR GENERATING NEW PARITY USING OLD DATA IN TEMPORARY STORAGE WITHOUT ACCESSING MAIN DISK STORAGE OF DISK DRIVE

TECHNICAL FIELD

The present invention relates to a control system for an array type disk system having a plurality of disk devices used as storage systems of a computer system arranged in array, and more particularly to a computer system intended to reduce a CPU load.

BACKGROUND ART

A disk array system is an external storage apparatus having a plurality of disk devices arranged in array to process a read request (data read request) and a write request (data write request) by a parallel operation of the disks at a high speed and enhance reliability by adding parity (redundant data). The disk array system is called a RAID (Redundant Arrays of Inexpensive Disks) and it is classified into five levels depending on type and structure of the parity data. (Article: "A case for Redundant Arrays of Inexpensive Disks (RAID)", David A. Patterson, Garth Gibson and Randy H. Katz, Computer Science Division Department of Electrical Engineering and Computer Sciences, University of California Berkeley).

In the level 5 (hereinafter referred to as a RAID5) of the above classification methodology, parities are scattered to respective disks and stored therein so that the concentration of the process to one parity disk during the parity updating is prevented and the performance reduction during the write process is suppressed. Accordingly, the performance is enhanced for the random access in which the reading/writing of small size data occurs frequently. ("Special Issue on Disk Array System", Nikkei Electronics Apr. 26, 1993, No. 579, pages 77~91).

In the disk array system, in order to operate the disks in parallel and add the parity data, a special address translation is required and such address translation has been conducted by dedicated hardware in the prior art. A known example of such system is disclosed in JP-A-2-236714. However, as the performance of a CPU (Central Processing Unit) of a host system is enhanced, a disk array system which conducts the address translation inherent to the disk array by software program. In the present specification, such disk array system is referred to as a software RAID. A known example of the disk array system which conduct the address translation for the parallel operation of the disks is disclosed in JP-A-5-250099.

As prior art, the software RAID of the RAID5 is explained with reference to a system configuration of FIG. 21. In FIG. 21, numeral 1 denotes a host system, numeral 4 denotes disk interface control means and numeral 3 denotes a disk device group.

The host system 1 comprises a host CPU 101, a cache 102 which can be read and written at a high speed, a local bus-system bus bridge 103, a main memory 104 for storing data and programs, and a bus interface 107. A local bus 105 connects the host CPU 101, the cache 102 and the local bus-system bus bridge 103. A system bus 106 connects the local bus-system bus bridge 103 and the bus interface 107. A disk array control program area 109 is arranged in the main memory 104 and stores a disk array control program necessary to control the disk array system.

The disk interface control means 4 is connected with the bus interface 107 of the host system 1.

The disk device group 3 comprise five disk devices 301~305 in the present prior art example. The disks 301~305 are connected to the disk interface control means 4 by daisy chain connection.

In the disk array system, a plurality of disks are striped, and parity data is added to each striping to enhance the reliability. During the disk array write process, a parity is generated by an exclusive OR operation of data of each stripe of each disk device. The host CPU 101 conducts the address translation and the parity generation for the striping by using the disk control program stored in the disk array control program area 109.

The read process and the write process conducted by the overall system including the disk parallel operation and the parity data addition are referred to as a disk array read process and a disk array write process, respectively. In the disk array read process and the disk array write process, a disk for which data is read and written is referred to as a data disk, and a disk for which parity data is read and written is referred to as a parity disk.

In the prior art RAID5 disk array write process, a parity is derived from a formula (1), where XOR represents an exclusive OR operator.

$$\text{New Parity} = \text{New Data XOR Old Data XOR Old Parity} \quad (1)$$

In the formula (1), the new data is data to be newly written in the disk array write process, and the old data is data immediately before the writing of the new data, that is, data on which the new data is to be overwritten. The new parity is a parity for the new data and the old parity is a parity for the old data.

In the disk array write process, the old data is read from the data disk and the old parity is read from the parity disk, and the new parity is generated in accordance with the formula (1), and then the new data is written into the data disk and the new parity is written into the parity disk.

The old data read process from the data disk is referred to as an old data read process, and the new data write process to the data disk is referred to as a new data write process. Similarly, the old parity read process from the parity disk is referred to as an old parity read process and the new parity write process to the parity disk is referred to as a new parity write process.

In the disk array write process in the prior art disk array, data and a parity corresponding to the data are updated substantially simultaneously to secure the reliability for a disk fault. However, when the disk array write process is to be conducted once, the read process and the write process are to be conducted once for each of the data disk and the parity disk, that is, a total of four times of disk access is required.

Further, since two disk devices are occupied, the multiplicity of the parallel operation of the disk devices is lowered.

As discussed above, in the prior art disk array, the write process performance is reduced.

Further, in the disk array with the redundancy by the software control, the address translation inherent to the disk array and the exclusive OR operation to generate the parity are conducted by the CPU and a load to the CPU required for the control of the disk array process program is large. Accordingly, when a large volume of disk array write processes are to be conducted, the application performance is lowered by the increase of the CPU load required for the control of the disk array process program.

DISCLOSURE OF INVENTION

It is a first object of the present invention to provide a computer system having a fast disk array write process by reducing the number of times of disk access other than the writing of the new data.

It is a second object of the present invention to provide a computer system having a reduced CPU load required for the control of the disk array process program.

It is a third object of the present invention to provide a computer system having expandability which allows the addition of a simple subsystem to an existing host system, in addition to the first and second objects.

It is a fourth object of the present invention to provide a computer system which is of simple structure to eliminate the need for a memory for holding data for generating a new parity and a control circuit for controlling the memory by storing the data for generating the parity in a main memory in the host system and which attains cost reduction, in addition to the first and second objects.

It is a fifth object of the present invention to provide a computer system which reduces the traffic of a bus connecting a system bus of the host system and a disk device control circuit for controlling the disk devices, the system bus and the main memory to attain the increase of the processing speed, in addition to the first and second objects.

It is a sixth object of the present invention to provide a computer system which holds data necessary to generate the parity without reducing the memory capacity of the main memory, reduces the traffic of the main memory access of the host system, and attains the fast CPU processing.

It is a seventh object of the present invention to provide a computer system which transfers the data for generating the parity on the main memory to the parity generation memory with a simple structure by utilizing a data transfer function to the main memory of the host system which the disk control circuit for controlling the disk devices has, in addition to the first and second objects.

It is an eighth object of the present invention to provide a computer system which transfers the data for generating the parity on the main memory to the area of the main memory in which the data necessary for the generation of the parity is stored by utilizing the data transfer function to the main memory of the host system which the disk control circuit for controlling the disk devices has, with a simple structure, in addition to the first and second objects.

It is a ninth object of the present invention to provide a computer system which can increase a data transfer rate for the parity generation.

In order to achieve the first and sixth object of the present invention, there is provided a computer system having a host system including a plurality of disk devices, a CPU, a main memory and a disk control circuit for controlling said disk devices, in which the CPU manages the disk devices as one logical disk array system with parity in accordance with a program on the main memory and controls the generation of new parity and a process to write the new parity to the disk device in a delayed fashion from and asynchronously with a process to write new data to the disk device, and the computer system is provided with a parity generation memory for holding updated data, old parity and old data.

In order to achieve the second object, a parity generation circuit for generating new parity or the updated data from data held in the parity generation memory and new data held on the main memory and to be written in the disk control circuit and a first data transfer circuit for transferring data to be read, from the disk control circuit to both the parity generation memory and the main memory in a data read process from the disk array system and transferring the new data from the main memory to both said parity generation memory and the disk control circuit in a data write process to the disk array system are provided.

In order to achieve the fourth object, the parity generation area on the main memory for holding the updated data, the old parity and the old data which is the data for generating the parity, on the main memory, the parity generation circuit for generating the new parity or the updated data from the data for the parity generation held in the parity generation area on the main memory and the new data on the main memory to be written in the disk control circuit, in the new data area on the main memory, and a second data transfer circuit for transferring the data to be read, from the disk control circuit to both the parity generation area on the main memory and the read data area on the main memory in which the data to be read on the main memory is stored in a read process from the disk array system, and transferring the new data from the new data area on the main memory to both the parity generation area on the main memory and the disk control circuit in a write process to the disk array system are provided.

In order to achieve the seventh object, the parity generation memory, the parity generation circuit, the disk control circuit for transferring the data to be read to the read data area on the main memory in the read process from the disk array system and transferring the new data from the new data area on the main memory to the disk control circuit in the write process to the disk array system, and a third data transfer circuit for transferring the data to be read to the parity generation memory in the read process from the disk array system and transferring the new data from the new data area on the main memory to the parity generation memory in the write process to the disk array system are provided.

In order to achieve the eighth object, the parity generation area on the main memory, the parity generation circuit, the disk control circuit for transferring the data to be read to the read data area on the main memory in the read process from the disk array system and transferring the new data from the new data area on the main memory to the disk control circuit in the write process to the disk array system, and a fourth data transfer circuit for transferring the read data in the read data area on the main memory to the parity generation area on the main memory in the read process from the disk array system and transferring the new data from the new data stored area on the main memory to the parity generation area on the main memory in the write process to the disk array system are provided.

In order to achieve the ninth object, a fast cache memory for the parity generation for temporarily storing the data for the parity generation is provided between the parity generation circuit and the first or third data transfer circuit.

In order to achieve the third object, the parity generation memory, the parity generation circuit and one of the first to fourth data transfer circuits are mounted on one board. Alternatively, the parity generation circuit and one of the first to fourth data transfer circuits are mounted on one board. Alternatively, the parity generation memory, the parity generation circuit, the fast cache and one of the first to fourth transfer circuits are mounted on one board.

In order to achieve the fifth object, the parity generation circuit and one of the first to fourth data transfer circuits are formed in one chip which is connected to a system bus or a bus connecting the disk controller and the system bus.

The CPU of the host system manages and controls the disk arrays as one logical disk array system having parity for adding the reliability to the disk devices in accordance with a the program on the main memory of the host system. The disk control circuit conducts the disk control such as the issuance of requests to the disk devices, the data transfer and the termination of the request.

When the CPU receives the data write request to the disk array system, it converts the request to a data write request to at least one disk device of the plurality of disk devices in accordance with the program. Prior to the data writing, the CPU reads the old data which is the data immediately before the writing of the new data necessary for the generation of the new parity in order to update parity for the new data which is the data to be written into the main memory to the new parity which is a novel parity, calculates exclusive OR of the new data and the old data, saves the result in the parity generation memory as the updated data and saves the new data as the old data in the subsequent accessing to the disk array device of the same address. After the processing, the new data is written into the disk array system and the data write request is terminated. The CPU reads the old parity which is the parity for the old data from the disk array device while asynchronously delaying from the new data write process, calculates the exclusive OR of the updated data stored in the parity generation memory and the old parity, saves the result in the disk array device as the new parity, and also saves it in the parity generation memory as the old parity in the subsequent accessing to the disk array system of the same address. Similarly, when the CPU receives the data read request to the disk array system, it reads the data from the disk array device in accordance with the program, transfers it to the main memory and saves it in the parity generation memory as the old data in the subsequent accessing to the disk array system of the same address.

The parity generation memory may temporarily store the old data, the updated data and the old parity, and when at least one of the updated data, the old data and the old parity which are necessary data in generating the new parity is present, the CPU may read the data from the parity generation memory instead of from the disk array device for use in the new parity generation process. Thus, it is not necessary to read the data from the disk array device and the number of times of access to the disk array device can be reduced.

Further, since the data necessary for the parity generation is stored in the parity generation memory, the memory capacity is not reduced and the traffic of the main memory access is reduced to achieve the first and sixth objects.

Further, the parity generation circuit can conduct the generation of the parity or the updated data from the updated data, the old data and the old parity stored in the parity generation memory and the new data in accordance with the instruction by the CPU without the intervention of the CPU during the generation. In the data read mode from the disk array system, the first data transfer circuit transfers the data to be read to both the parity generation memory and the read data area on the main memory, and in the write mode to the disk array system, it may transfer the new data from the new data area on the main memory to both the parity generation memory and the disk control circuit in accordance with the instruction by the CPU without the intervention of the CPU during the data transfer. Since the parity generation circuit and the first data transfer circuit can conduct the parity generation process which is the disk array control process and the data transfer process to the parity generation memory in accordance with the instruction by the CPU, the load of the CPU is reduced to achieve the second object.

Further, the parity generation area on the main memory holds the updated data, the old parity and the old data stored in the parity generation memory, on the main memory, the parity generation circuit generates the new parity or the updated data from the parity generation data stored in the parity generation area on the main memory and the new data stored in the new data area on the main memory, the second data transfer circuit transfers the data to be read, in the read mode from the disk array system, from the disk control circuit to both the parity generation area on the main memory and the read data area on the main memory, and in the write mode to the disk array system, transfers the new data from the new data area on the main memory to both the parity generation area on the main memory and the disk control circuit in accordance with the instruction by the CPU without requiring any intervention of the CPU during the data transfer, so that the first and second objects are achieved and the fourth object is also achieved by eliminating the need for the parity generation memory and the control circuit therefor to attain a simple structure and a low cost.

The disk control circuit transfers the read data, in the read mode from the disk array system, to the read data area on the main memory and transfers the new data on the main memory, in the write mode to the disk array system, from the new data area on the main memory to the disk control circuit without the intervention of the CPU during the data transfer, and the third data transfer circuit transfers, in the read mode from the disk array system, the read data transferred by the disk control circuit to the read data area on the main memory, to the parity generation memory, and transfers, in the write mode to the disk array system, the new data in the new data area on the main memory to the parity generation memory in accordance with the instruction by the CPU without the intervention of the CPU during the data transfer so that the first and second objects are achieved, and the seventh object is also achieved by transferring the data for the parity generation on the main memory to the parity generation memory with a simple structure by utilizing the data transfer function to the main memory which the disk control circuit for controlling the disk devices has.

The parity generation area on the main memory, the parity generation circuit and the disk control circuit operate in the same manner as that described above and the fourth data transfer circuit transfers, in the read mode from the disk array device, the read data transferred by the disk control circuit to the read data area on the main memory, to the parity generation area on the main memory, and transfers, in the write mode to the disk array device, the new data from the new data area on the main memory to the parity generation area on the main memory in accordance with the instruction by the CPU without the intervention of the CPU during the data transfer. Accordingly, the first and second objects are achieved. Further, the eighth object is achieved by transferring the data necessary for the parity generation to the parity generation area on the main memory with a simple structure by utilizing the data transfer function to the main memory which the disk control circuit has.

Since the parity generation fast cache memory is between the parity generation memory and the first or third data transfer circuit, it can temporarily store the data transferred between the disk control circuit or the main memory and the parity generation memory, and if the corresponding data is present in the parity generation fast cache memory in the parity generation process, the data may be transferred from the fast cache memory. Accordingly, the ninth object of increasing the data transfer rate for the parity generation is achieved.

By mounting the parity generation memory, the parity generation circuit and the first or third data transfer circuit on one board, they may be constructed as a simple subsystem which is independent from the host system so that the third object of providing the expandability which allows the addition of a simple subsystem to the existing host system is achieved.

By mounting the parity generation memory and the second or fourth data transfer circuit on one board, they may be constructed as a simple subsystem which is independent from the host system so that the third object of providing the expandability which allows the addition of the simple subsystem to the existing host system is achieved.

By integrating the parity generation circuit and one of the first to fourth data transfer circuits on one chip, there is no necessity for transferring the same data twice from the parity generation memory or the parity generation area on the main memory when the same data is to be processed in the new parity and the updated data generation process and the data transfer process so that the traffic of the bus connecting the system bus of the host system and the disk device control circuit or the system bus or the main memory is reduced and the process speed is increased to achieve the fifth object.

BRIEF DESCRIPTION OF DRAWINGS

FIGS. 1A and 1B show block diagrams of a computer system in accordance with a first embodiment, FIGS. 20A and 20B show block diagrams of a computer system in accordance with a ninth embodiment, and FIG. 21 shows a block diagram of a prior art computer system.

BEST MODE FOR CARRYING OUT THE INVENTION

Figure 2:
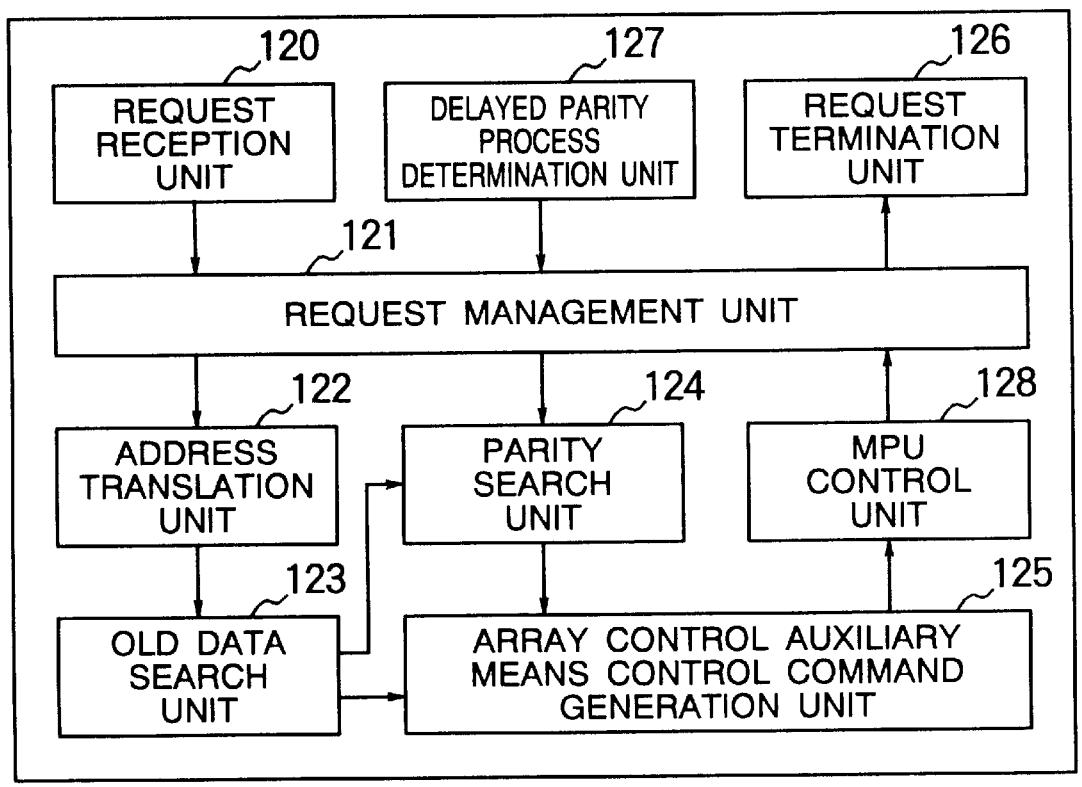
FIG. 2 shows a block diagram of a disk array control program area in the first embodiment.

Embodiments of the present invention are now explained with reference to the drawings.

Referring to a system configuration of FIG. 1, a first embodiment of the present invention is explained. In FIG. 1, numeral 1 denotes a host system, numeral 2 denotes array control auxiliary means and numeral 3 denotes a disk device group.

The host system 1 comprises a host CPU (Central Processing Unit) 101, a cache 102, a local bus-system-system bus bridge 103, a main memory 104 and a bus interface 107. The host CPU 101, the cache 102 and the local bus-system bus bridge 103 are connected by a local bus 105. The local bus-system bus bridge 103 and the bus interface 107 are connected to a system bus 106.

In the host system 1, the main memory 104 comprises a user area 108, a disk array control program area 109, an old data address holding area 110 and a parity address holding area 111.

As shown in FIG. 2, the disk array control program area 109 comprises a request reception unit 120 for receiving a request from an application, an address translation unit 122 for conducting the address translation (including data scattering/gathering) inherent to the disk array system and calculating a data disk address and a parity disk address, an old data search unit 123 for determining whether old data is present in the temporary holding means or not, a parity search unit 124 for determining whether old updated data to be described later or a new parity is present in the temporary holding means or not, an array control auxiliary means control command generation unit 125 for generating a disk command, a disk array data transfer means control command and an exclusive OR generation means control command, an MPU control unit 128 for issuing an array control auxiliary means control command to the MPU 210, a request termination unit 126 for notifying the termination of request to the application, and a delayed parity process determination unit 127 for determining whether a delayed parity process is to be conducted or not.

Returning to FIG. 1, the array control auxiliary means 2 comprises a bus interface 201, an MPU (micro-processing unit) 210, an MPU memory 211, five disk control circuits (hereinafter disk interface control means) 205~209, a data transfer circuit (disk array data transfer means) 202 for conducting the data transfer between memories, between disk and each memory, and between a parity generation circuit (hereinafter exclusive OR generation means) 203 and each memory, the exclusive OR generation means 203, a parity generation memory (hereinafter memory 212) for storing data for the parity generation, and unrecorded parity address holding means 250 for recording a parity address for which the delayed parity process has not been conducted. The respective units are connected to an MPU bus 213. The unrecorded parity address holding means 250 is battery-backed-up. The array control auxiliary means 2 may be provided as a portion of the host system, or the memory 212 included in the array control auxiliary means 2, the disk array data transfer means 202 and the exclusive OR generation means 203 may be constructed on one board and they may be connected to the system bus 106 of the host system 1 or an array control auxiliary means internal bus 204 which connects the system bus 106 and the disk interfaces 205~209. When they are mounted on one board, it may be added to an existing system as a simple subsystem so that the expandability is enhanced. The bus interface 201, the five disk interface control means 205~209, the disk array data transfer means 202, the exclusive OR generation means 203 and the memory 212 are connected by the array control auxiliary means internal bus 204. The bus interface 201 is connected to the bus interface 107 of the host system 1. When the memory 212 is mapped to a memory address space managed by the host CPU 101, it is of directly referred structure and the bus interface 201 controls it.

Figure 3:
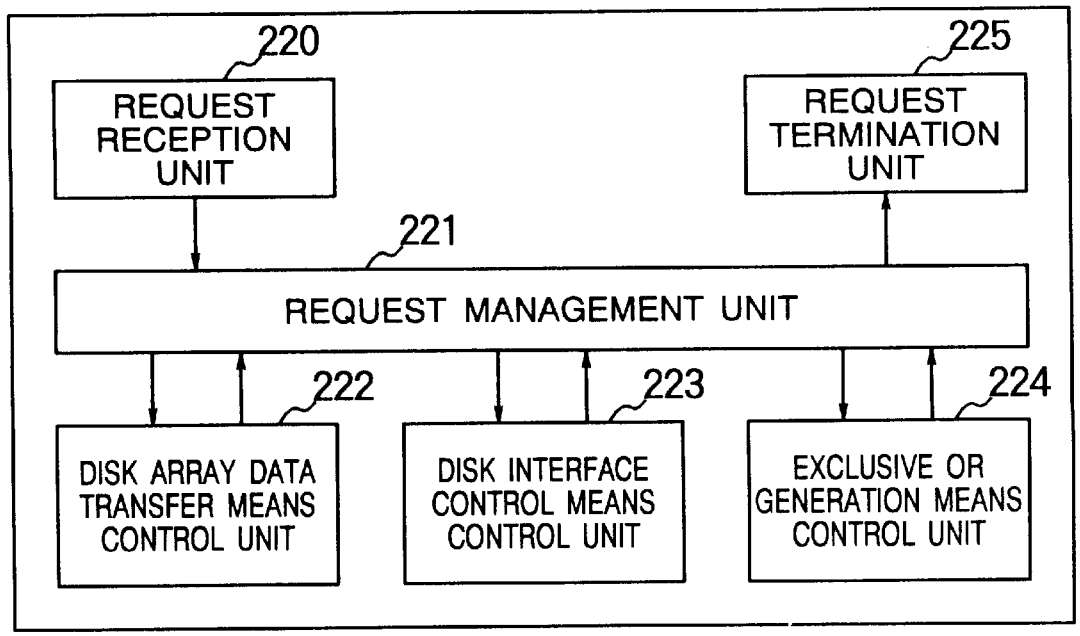
FIG. 3 shows a block diagram of an MPU control program area in the first embodiment.

In the array control auxiliary means 2, the MPU memory 211 comprises an MPU control program area 214 and an MPU command storage area 215 for queuing a number of sent MPU commands. As shown in FIG. 3, the MPU control program area 214 comprises a request reception unit 220 for receiving a request from the MPU control unit 128, a request management unit 221 for determining a next process, a disk array data transfer means control unit 222 for issuing a command to the disk array data transfer means 202, a disk interface control means control unit 223 for issuing a command to the disk interface control means 205~209, an exclusive OR generation means control unit 224 for issuing a command to the exclusive OR generation means, and a request termination unit 225 for issuing an interrupt signal for the termination of request to the host CPU 101.

Turning back to FIG. 1, in the array control auxiliary means 2, the memory 212 comprises old data holding means 216, a parity generation work area 217 for temporarily holding the data to be used for the parity generation work, parity holding means 218 for holding the old updated data or the old parity, and memory control means 219 for managing the address of the memory 212.

Figure 4:
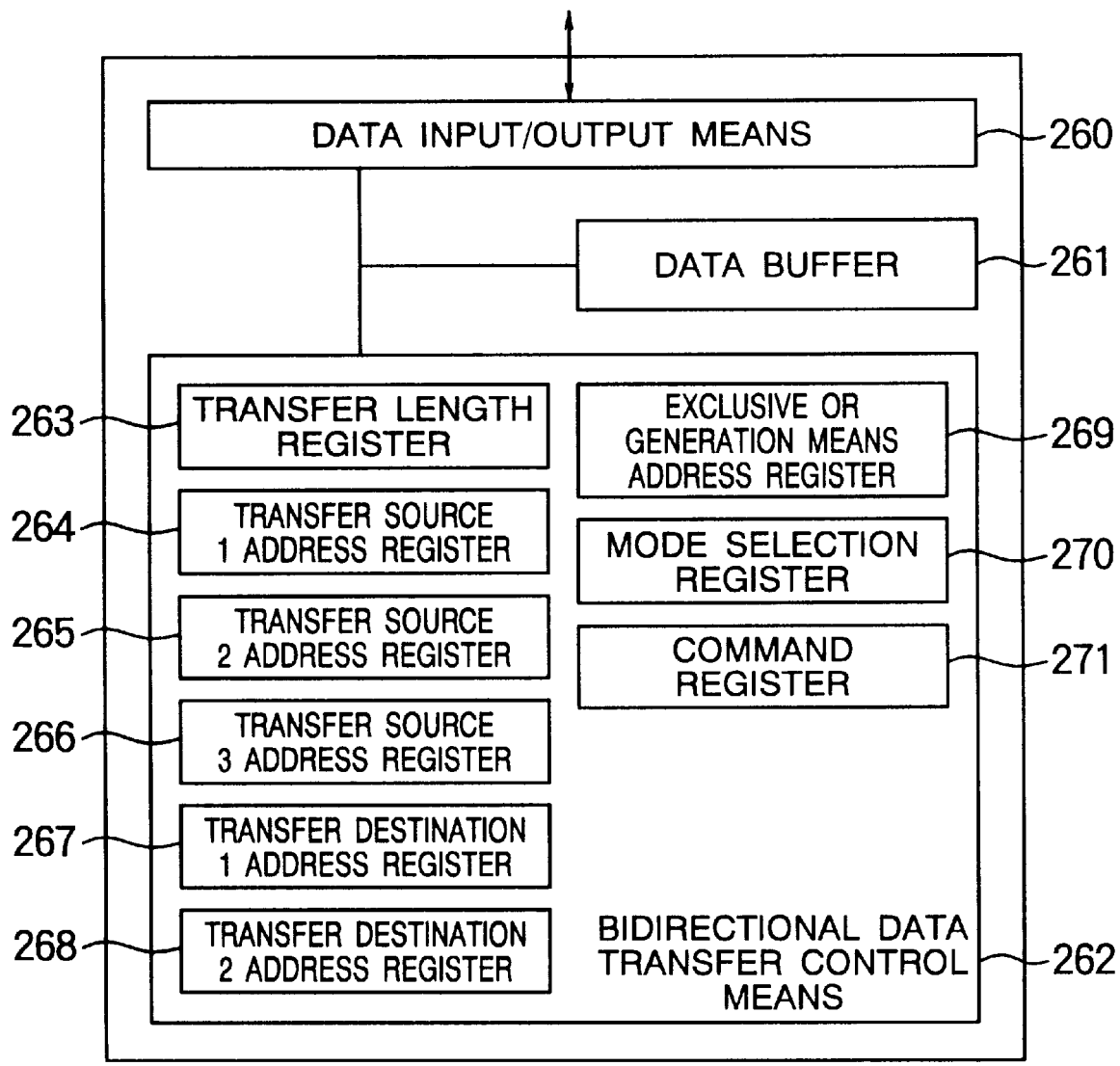
FIG. 4 shows a block diagram of disk array data transfer means in the first embodiment.

In the array control aufilary means 2, the disk array data transfer means 202 shown in FIG. 4 comprises data input/output means 260, a data buffer 261 and bidirectional data transfer control means 262. The bidirectional data transfer control means 262 comprises a transfer length register 263 for designating a data length to be transferred in byte unit, a transfer source 1 address register 264, a transfer source 2 address register 265 and a transfer source 3 address register 266 as registers for storing an I/O addresses or memory addresses of the data transfer sources. It also comprises a transfer destination 1 address register 267 and a transfer destination 2 address register 268 as registers for storing I/O addresses or memory addresses of the data transfer destinations. It also comprises an exclusive OR generation means address register 269 for storing the IO address of the exclusive OR generation means 203, a mode selection register 270 for selecting the IO or the memory for a transfer source and a transfer destination and designating whether the data transfer relates to the exclusive OR generation, and a command register 271 for receiving a transfer start command.

In the Embodiment 1, the disk array data transfer means 202 conducts the DMA (Direct Memory Access) transfer of the transfer length bytes from the transfer source 1 to the transfer destination 1, or from the transfer source 1 to the two destinations, the transfer destination 1 and the transfer destination 2. In the DMA transfer, once started by the CPU or the MPU, the data is subsequently transferred without the intervention of the CPU or the MPU. The simultaneous DMA transfer to two transfer destinations is referred to as a collective DMA transfer.

Figure 5:
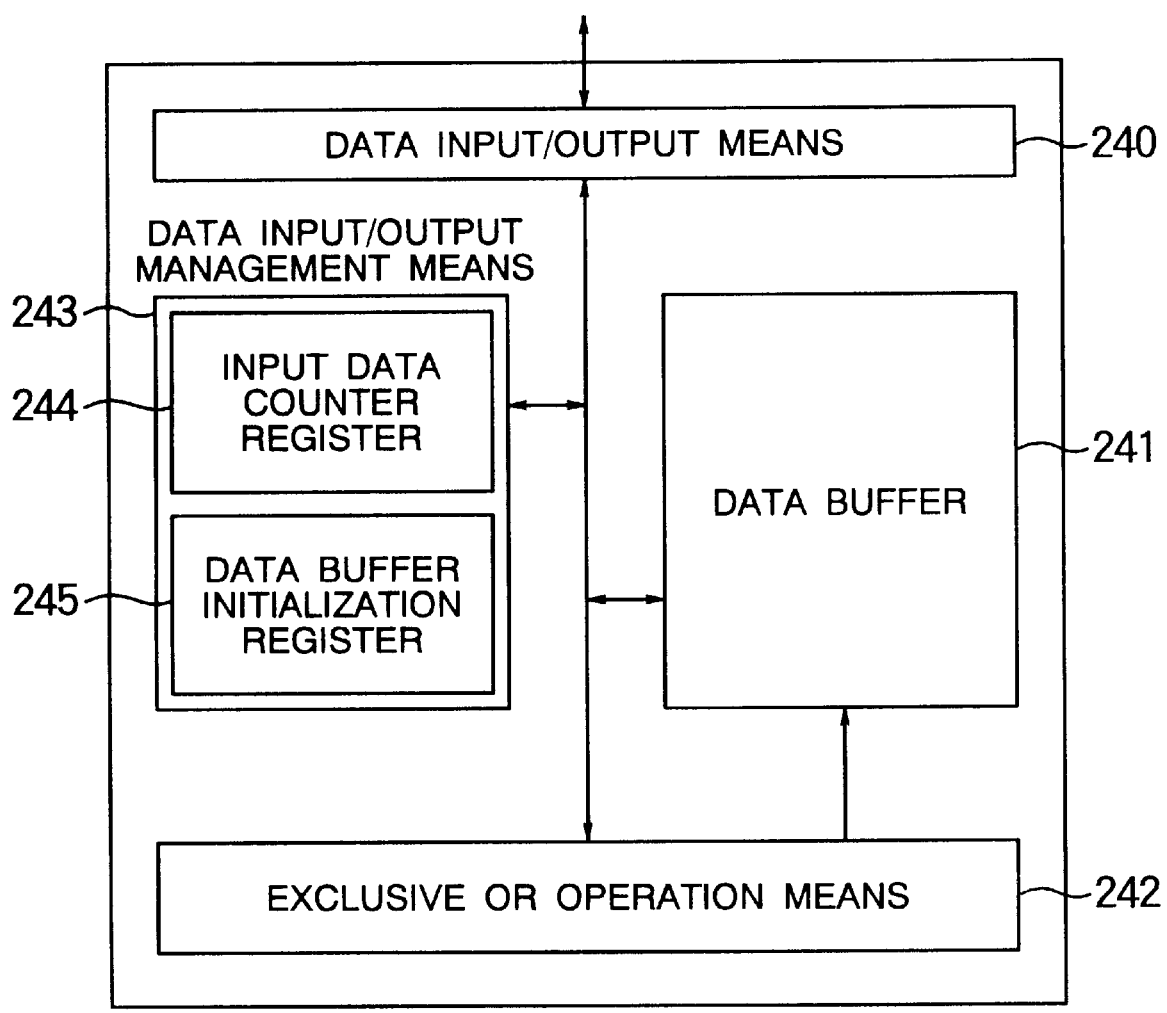
FIG. 5 shows a block diagram of exclusive OR generation means in the first embodiment.
Figure 6:
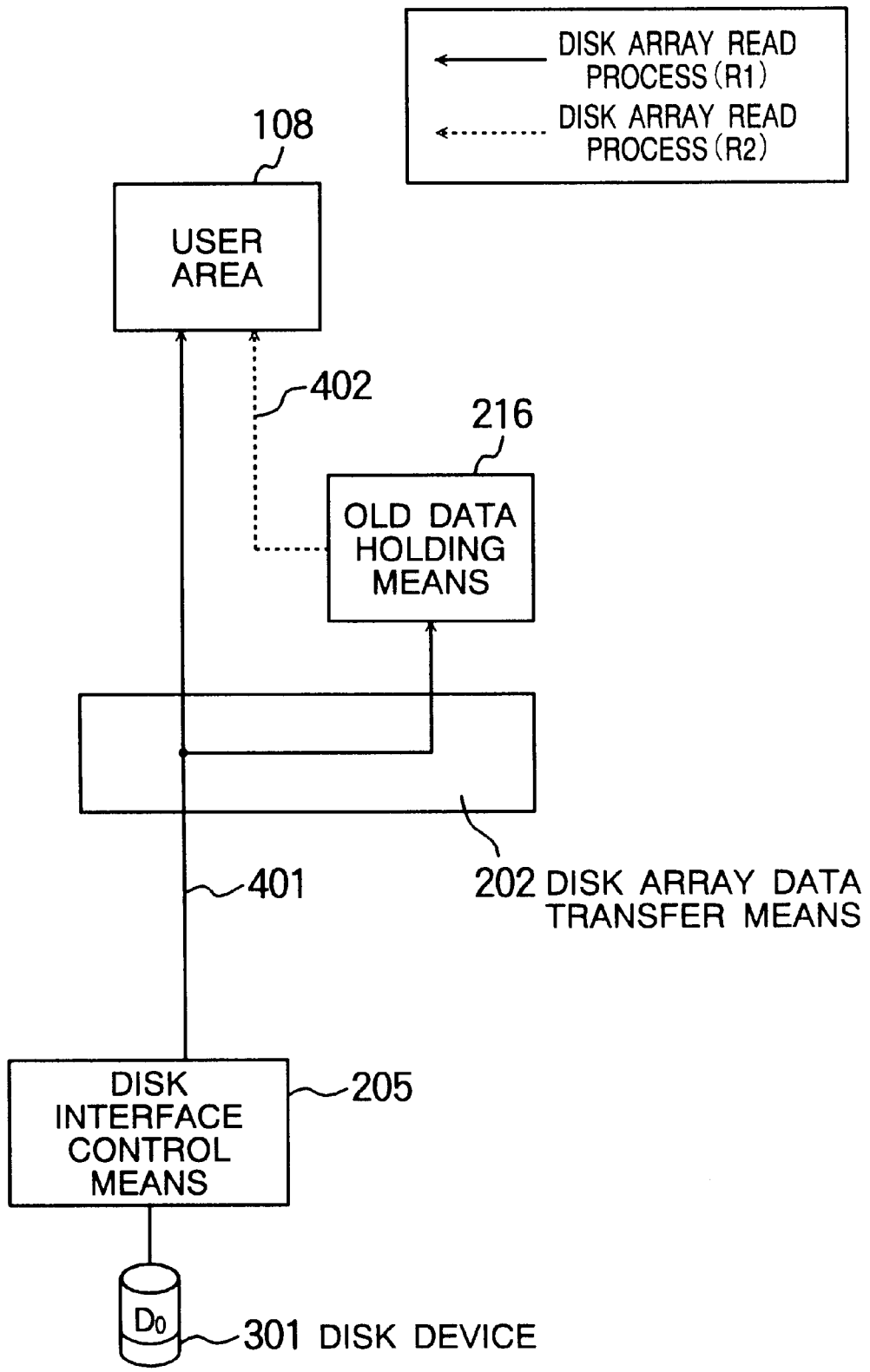
FIG. 6 shows an operation of a disk array read process in the first embodiment.

In the array control auxiliary means 2, the exclusive OR generation means 203 shown in FIG. 5 comprises data input/output means 240, a data buffer 241, exclusive OR operation means 242 for conducting the exclusive OR operation, and data input/output management means 243 for managing the data input/output and initializing the data buffer 241. The data input/output management means 243 comprises an input data counter register 244 for storing the number of input data and a data buffer initialization register 245 for initializing the data buffer 241.

Turning back to FIG. 1, the old data holding means 216 of the memory 212 and the old data address holding unit 110 of the main memory 104 hold the same number of data, respectively. For example, the p-th data in each holding means correspond to each other, where p is a natural number.

The old data holding means 216 is a set of p memory areas having a block size equal to the logical block length of the magnetic disk device. The old data address holding unit 110 is an array of structures including the memory address of the old data held in the old data holding means 216, a disk device number which stores the data corresponding to the memory address, a data disk address which is the logical block address in the disk device and a time stamp, and the number of arrays corresponds to the number of blocks p of the old data holding means 216.

The parity holding means 218 of the memory 212 and the parity address holding unit 111 of the main memory 104 hold the same number of data, respectively. For example, the q-th data in each holding means correspond to each other, where q is a natural number.

The parity holding means 218 is a set of memory areas having a block size equal to the logical block length of the magnetic disk device. The number q of blocks which the parity holding means 218 has determines the number of parity data which can be used for the delayed parity process. The parity address holding unit 111 is an array of structures including a memory address of the old parity or the old updated data held in the parity holding means 218, a disk device number which stores the parity corresponding to the memory address, a parity disk address which is the logical block address in the disk device, a time stamp, and a flag for indicating whether the held content is the old updated data or the old parity, and if it is the old parity, whether it is same as that written on the disk. The number of arrays corresponds to the number of blocks q of the parity holding means 218.

Unrecorded parity address holding means 250 is a set of r memory areas for storing parity disk addresses mismatched with the parities of the data disk, where r is a natural number.

The disk device group 3 comprises five disk devices 301~305 in the present embodiment. The respective disk devices 301~305 are connected to the five disk interface control means 205~209 of the array control auxiliary means 2 through respective cables.

The disk array write process in the present embodiment is explained below. In the prior art RAID5, the old data read process and the new data write process for the data disk as well as the old parity read process and the new parity write process for the parity disk are needed in the disk array write process so that the number of occupied disks is two and a total of four times of disk access occur. Thus, the disk array write performance is significantly lowered.

In the disk array write process of the RAID5, the new parity is derived from the formula (1). By defining the exclusive OR of the new data and the old data as the new updated data, the new parity is the exclusive OR of the new updated data and the old parity. This is shown by the following formulas.

New Updated Data=New Data XOR Old Data (2)

New Parity=New Updated Data XOR Old Parity (3)

During the new data write process, the new updated data is generated as shown by the formula (2) and it is stored in the temporary holding means. The old data holding means 216, the parity generation work area 217 and the parity holding means 218 are collectively referred to as the temporary holding means. Then, the new parity is generated as shown by the formula (3) by using the stored new updated data, asynchronously with the new data write process, to conduct the new parity write process. In this manner, the prior art disk array write process is divided into two independent processes and the number of occupied disk is reduced to one for each process. The new updated data in the formulas (2) and (3) are identical but in the delayed parity process (P1) to be described later, the new updated data in the stage of the formula (3) is referred to as the old updated data. The old updated data means the new updated data stored in the temporary holding means in the previous disk array write process. The new parity in the formula (3) is referred to as the old parity in the delayed parity process (P2) to be described later.

The data such as the new data and the old data is held in the temporary holding means, and when the data is again accessed, it is read from the temporary holding means instead of from the disk. Thus, the number of times of access in the old data read process and the old parity read process is reduced. In this manner, the disk array write performance is improved.

The above process relating to the new data write process is referred to as the data write process. The process relating to the new parity write process, which is conducted asynchronously with the data write process is referred to as the delayed parity process. The disk array write process in the present embodiment comprises the data write process and the delayed parity process.

The data write process is classified to the following six types depending on the content stored in the temporary holding means. The transfer is conducted by the disk array data transfer means 202.

(W1) Nothing is stored in the temporary holding means:

The process to read the old data from the data disk and transfer it to the temporary holding means, the process to transfer the new data from the user area 108 to the data disk and the temporary holding means, and the process to generate the new updated data from the old data stored in the temporary holding means and the new data and transferring it to the temporary holding means are conducted. The formula (2) is used for the generation of the new updated data.

(W2) The old data is stored in the temporary holding means:

It is substantially same as the case of (W1) but the process to read the old data from the data disk and transfer it to the temporary holding means is not necessary. The formula (2) is used for the generation of the new updated data.

(W3) The old updated data is stored in the temporary holding means:

The process to read the old data from the data disk and transfer it to the temporary holding means, the process to transfer the new data from the user area 108 to the data disk and the temporary holding means, and the process to generate the new updated data from the old data, the new data and the old updated data stored in the temporary holding means and transfer it to the temporary holding means are conducted. The formula (4) is used for the generation of the new updated data.

New Updated Data=New Data XOR Old Data XOR Old Updated Data (4)

The formula (4) is derived below. First, it is assumed that the data write process of (W1) or (W2) is conducted and the new data and the new updated data derived thereby are stored in the temporary holding means. When the new data is updated, the newly written data is referred to as new data, the generated new updated data is referred to as new updated data, and the new parity for the new data is referred to as a new parity. Namely, the new data before the updating is the old data when viewed from the new data, and the new parity for the new data is the old parity when viewed from the new parity. When the new data write process is completed and the delayed parity process for the new data is conducted, the temporary holding means contains the new data and the new updated data. The formula (5) is derived from the formula (1) and the formula (6) is derived from the formulas (3) and (5).

New parity=New Data XOR New Data XOR New parity (5)

New Parity=New Data XOR New Data XOR New Updated Data XOR Old Parity (6)

New Updated Data=New Data XOR New Data XOR New Updated Data (7)

New New Parity=New New Updated Data XOR Old Parity (8)

By exclusively logically ORing the new new updated data, the new new data, the new data and the new updated data as shown by the formula (7), the new new parity is the exclusive OR of the new new updated data and the old parity as shown by the formula (8). Accordingly, when the new new parity is generated, only the old parity is needed and the new parity is not needed so that the data write process can be continuously conducted even if the delayed parity process is not conducted. In this manner, since the delayed parity process for the new new data can be conducted by using the old parity, the updated data may be re-updated as many time as required without the delayed parity process. Accordingly, the formula (4) is derived from the formula (7).

(W4) The old updated data and the old data are stored in the temporary holding means:

It is substantially same as the case (W3) but the process to read the old data from the data disk and transfer it to the temporary holding means is not needed. The formula (4) is used for the generation of the new updated data.

(W5) The old parity is stored in the temporary holding means:

The process to read the old data and transfer it to the temporary holding means, the process to transfer the new data from the user area 108 to the disk and the temporary holding means, and the process to generate the new parity from the old data, the new data and the old parity stored in the temporary holding means, the new data and the old parity and transfer it to the temporary holding means are conducted. The formula (1) is used for the generation of the new parity.

(W6) The old parity and the old data are stored in the temporary holding means:

It is substantially same as the case (W5) but the process to read the old data from the disk and transfer it to the temporary holding means is not needed. The formula (1) is used for the generation of the new parity.

In the data write process, the new data stored in the temporary holding means is the old data in the next data write processes (W2), (W4) and (W6). In the data write processes (W2), (W4) and (W6), the old data read process is not conducted so that the disk access is reduced by one time.

In the data write processes (W1), (W2), (W3) and (W4), the new updated data stored in the temporary holding means is the old updated data in the next data write processes (W3) and (W4) and the delayed parity process (P1) to be described later.

In the data write processes (W5) and (W6), the new parity stored in the temporary holding means is the old parity in the next data write processes (W5) and (W6) and the delayed parity process (P2) to be described later. In the data write processes (W5) and (W6), since the old parity read process is not conducted, the disk access can be reduced by one time. Further, since the new parity is stored in the temporary holding means and the new parity write process is not conducted, the disk access can be reduced by one time. In this manner, since the temporary holding means is used in the old parity read process and the new parity write process, the data write process may be continuously conducted without accessing to the parity disk.

The delayed parity process is classified to the following two types depending on the content stored in the temporary holding means. The delayed parity process is not conducted when the old parity which has already been written on the disk is stored. Further, the delayed parity process is not conducted when nothing is stored in the temporary holding means or only the old data is stored therein. The transfer is conducted by the disk array data transfer means 202.

(P1) The old updated data is stored in the temporary holding means:

The process to read the old parity from the disk and transfer it to the temporary holding means, the process to generate the new parity from the old parity and the old updated data stored in the temporary holding means and transfer it to the temporary holding means and the process to transfer the new parity from the temporary holding means to the disk are conducted. The formula (3) is used for the generation of the new parity. The old updated data in (P1) corresponds to the new updated data in the formula (3). The new parity stored in the temporary holding means is the old parity in the next data write processes (W5) and (W6).

(P2) The old parity not written on the disk is stored in the temporary holding means:

The old parity is transferred from the temporary holding means to the disk. The old parity in (P2) corresponds to the new parity in the formula (3).

The disk array write process of the present embodiment has thus been described. As described above, by using the temporary holding means in the data read process and the parity read/write process, the number of times of disk access is reduced and the process speed is increased.

However, it is necessary to copy the new data in the user area 108 in the main memory into the memory area of the temporary holding means and hold it. Hereinafter, this copy is referred to as a memory-to-memory copy. Further, it is necessary to conduct the exclusive OR operation to generate the new updated data and the new parity. The present embodiment provides a method for conducting the memory-to-memory copy and the exclusive OR operation by using the array control auxiliary means 2 to reduce the CPU load.

The disk array read process of the present embodiment is described below. The disk array read process is classified into the following two types depending on the content stored in the temporary holding means. The transfer is conducted by the disk array data transfer means 202.

(R1) The old data is not stored in the temporary holding means:

The process to read the old data which is the intended data from the disk and transfer it to the temporary holding means and the user area 108 is conducted.

(R2) The old data is stored in the temporary holding means:

The old data which is the intended data is transferred from the temporary holding means to the user area 108.

The disk array read process operation and the disk array write process operation in the disk array system configured as shown in FIG. 1 are explained. In the disk array system, it is necessary to generate the parity data in order to enhance the reliability. In the disk array system of the present embodiment, the new data write process and the new parity write process are conducted asynchronously in the disk array write process in order to avoid the reduction of the performance due to the disk access. For the disk array write process, the data write process and the delayed parity process which is conducted with a delay from the data write process are separately explained.

[Disk Array Read Process]

First, referring to FIGS. 1, 2, 3 and 6, the disk array read process operation is explained. In the description of the operation, (401) and (402) correspond to the reference numerals in FIG. 6. It is assumed that the intended data is D0 which is stored in the disk device 301 of FIG. 1. In FIG. 2, when the disk array read request is issued from an application on the host system 1, the host CPU 101 conducts the following process by using the programs in the disk array control program area 109. First, the request reception unit 120 of FIG. 2 receives the read request. The request management unit 121 passes the read request to the address translation unit 122 which calculates the data disk address of the intended data.

The old data search unit 123 checks whether the data disk address of the intended data is stored in the old data address holding unit 110 of the main memory 104 or not to determine whether the intended data is stored in the old data holding means 216 in the memory 212 to classify the disk array read process to (R1) or (R2).

If the data disk address is not stored in the old data address holding unit 110, the disk array read process (R1) is conducted and the a memory of a size necessary to hold the intended data is secured in the old data holding means 216, the memory address is calculated, and the memory address and the data disk address are combined into an array of structures and it is stored in the old data address holding means 110.

When the old data address is stored in the old data address holding means 110, the disk array read process (R2) is conducted and the memory address of the old data holding means 216 in which the intended data is stored is calculated.

Then, the array control auxiliary means control command generation unit 125 generates the following commands.

In the disk array read process (R1), the read command for the data disk which contains the data disk address of the intended data and the disk array data transfer means control command for collectively DMA-transferring the intended data from the disk interface control means 205 to the old data holding means 216 and the user area 108 are generated, and the respective commands are combined into the MPU control commands. The disk array data transfer means control command includes a transfer length, an IO address of the disk interface control means 205 which is the transfer source 1, a memory address of the old data holding means 216 which is the transfer destination 1, a memory address of the user area 108 which is the transfer destination 2, a mode selection command for designating whether the transfer source 1, the transfer destination 1 and the transfer destination 2 are IO or memory, and a start of transfer command.

In the disk array read process (R2), a disk array data transfer means control command for DMA-transferring the intended data from the old data holding means 216 to the user area 108 is generated and that command is used as the MPU control command. The disk array data transfer means control command includes a transfer length, a memory address of the old data holding means 216 which is the transfer source 1, a memory address of the user area 108 which is the transfer destination 1, a mode selection command for designating whether the transfer source 1 and the transfer destination 1 are memory, and a start of transfer command.

The MPU control unit 128 issues the MPU control command to the MPU 210 through the bus interface 107 of FIG. 1. When the MPU 210 receives the MPU control command, it conducts the following processes by using the programs in the MPU control program area 214. First, the request reception unit 220 of FIG. 3 receives the MPU control command and passes it to the request management unit 221.

In the disk array read process (R1), the disk interface control means 223 issues the read command for the intended data, of the MPU control commands to the disk interface control means 205. Then, the disk interface control means 205 issues the read command received for the disk device 301 in which the intended data is stored. The disk device 301 receives the read command and transfers the data to the disk interface control means 205. The disk interface control means 205 issues the interrupt signal to the MPU 210.

Then, the disk array data transfer means control unit 222 issues the disk array data transfer means control command, of the MPU commands to the disk array data transfer means 202. The disk array data transfer means 202 receives the command and collectively DMA-transfers the intended data from the disk interface control means 205 to the user area 108 and the old data holding means 216 (401). The disk array data transfer means 202 issues the interrupt signal to the MPU 210.

Referring to FIG. 4, the operation of the disk array data transfer means 202 when it collectively DMA-transfers the data in the disk array read process (R1) is explained.

When the transfer length register 263 of the bidirectional data transfer control means 262, the transfer source 1 address register 264, the transfer destination 1 address register 267, the transfer destination 2 address register 268 and the mode selection register 270 are set by the disk array data transfer means control command and the start of transfer command is set in the command register 271, the disk array data transfer means 202 starts the transfer.

In this case, the transfer source 1 is the IO and the transfer destination 1 and the transfer destination 2 are the memory. Assuming that the capacity of the data buffer 261 is n bytes, the transfer unit is n bytes. The transfer length is set to m bytes, the transfer source 1 address is set to address x, the transfer destination 1 address is set to address y and the transfer destination 2 address is set to address z, and the address x is the IO address and the addresses y and z are memory addresses, and the collective DMA-transfer from the IO to the two areas of the memory is conducted. First, the n-byte transfer from the address x to the data buffer 261 through the data input/output means 260 is conducted, then the n-byte transfer is conducted from the data buffer 261 to the address y through the data input/output means 260, then the n-byte transfer to the address z is conducted in the similar manner, and the transfer of one transfer unit is completed.

Before the transfer of the next transfer unit, n is subtracted from the transfer length register 263 and n is added to the transfer destination 1 and the address register 267 and the transfer destination 2 address register 268. Since the transfer source 1 is the IO, the content of the transfer source 1 address register 264 is not changed. Then, the n-byte transfer from the address x to the address (y+n) is conducted and the n-byte transfer from the address x to the address (z+n) is conducted in the same manner as that described above. The above operation is repeated until the transfer length register 263 reaches zero so that the m-byte collective DMA-transfer from the address x to the address y and the address z is conducted. When the DMA transfer is completed, the bidirectional data transfer control means 262 issues the interrupt signal.

In the disk array read process (R2), the disk array data transfer control unit 222 of FIG. 3 issues the disk array data transfer means control command, of the MPU control commands to the disk array data transfer means 202. The disk array data transfer means 202 receives the command and DMA-transfers the intended data from the old data holding means 216 to the user are 108 (402). The disk array transfer means 202 issues the interrupt signal to the MPU 210.

Referring to FIG. 4, the operation of the disk array data transfer means 202 when it conducts the DMA-transfer in the disk array read process (R2) is explained.

When the transfer length register 263 of the bidirectional data transfer control means 262, the transfer source 1 address register 264, the transfer destination 1 address register 267 and the mode selection register 270 are set by the disk array data transfer means control command and the start of transfer commands is set in the command register 271, the disk array data transfer means 202 starts the transfer.

In this case, the transfer source 1 and the transfer destination 1 are the memory. Assuming that the capacity of the data buffer 261 is n bytes, the transfer unit is n bytes. The transfer length is set to m bytes, the transfer source 1 address is set to the address x, the transfer destination 1 address is set to the address y, and the address x and the address y are the memory addresses and the DMA transfer form the memory to the memory is conducted. First, the n-byte transfer is conducted from the address x to the data buffer 261 through the data input/output means 260, then the n-byte transfer is conducted from the data buffer 261 to the address y through the data input/output means 260, and the transfer of one transfer unit is completed.

Before the transfer of the next transfer unit, n is subtracted from the transfer length register 263 and n is added to the transfer source 1 address register 264 and the transfer destination 1 address register 263. Then, the n-byte transfer is conducted from the address (x+n) to the address (y+n) in the similar manner as that described above. The above operation is repeated until the transfer length register 263 reaches zero so that the DMA transfer of m bytes from the address x to the address y is conducted. When the DMA transfer is completed, the bidirectional data transfer control means 262 issues the interrupt signal.

Thereafter, the processes are same irrespective of the disk array read process (R1 or R2). When the transfer of the intended data is completed, the request management unit 221 of FIG. 3 shifts the process to the request termination unit 225 which issues the interrupt signal to the host CPU 101 of FIG. 1. When the host CPU 101 receives the interrupt signal, it shifts the process to the request termination unit 126 by using the request management unit 121 in the disk array control program area 109 of FIG. 2, and the request termination unit 126 terminates the overall read process.

In general, the application frequently conducts the read-modify-write to read the data, modify it and write it back when the data in the file is to be updated. Accordingly, in the disk array read process, the read data is held in the old data holding means 216 so that the speed in the next read process is increased and the speed in the updated data generation process in the read-modify-write process is increased.

[Disk Array Write Process]

The data write process and the delayed parity process in the disk array write process are now explained.

[Data Write Process]

Referring to FIGS. 1, 2, 3 and 7, the data write process operation is explained for the data write process (W3). In the description of the operation, (501) to (506) correspond to the reference numerals in FIG. 7. It is assumed that the new data is written on D0 of the disk device 301 of FIG. 1. When the disk array write request is issued from the application on the host system 1, the host CPU 101 conducts the following processes by using the programs in the disk array control program area 109.

First, the request reception unit 120 of FIG. 2 receives the write request. The request management unit 121 passes the write request to the address translation unit 122 which calculates the data disk address in which the new data is to be written and the parity disk address corresponding to the new data.

The old data search unit 123 determines whether the calculated data disk address is stored in the old data address holding unit 110 of the main memory 104 to determine whether the old data is stored in the old data holding means 216 in the memory 212 to classify the data write process type.

In the data write process (W3), since the data disk address is not stored in the old data address holding unit 110, the memory of a size necessary to hold the new data is secured in the old data holding means 216, and the memory address and the data address are combined into one array of structures and it is held in the old data address holding unit 110.

The parity search unit 124 determines whether the calculated parity disk address is stored in the parity address holding unit 111 of the main memory 104 to determine whether the old updated data or the old parity is stored in the parity holding means 218 in the main memory 212 to classify the data write process type.

If the parity disk address is stored in the parity address holding unit 111, whether it is the old updated data or the old parity based on the flag added to the parity disk address. In the data write process (W3), the memory address of the parity holding means 218 in which the old updated data is stored is calculated.

In the data write process (W3), the array control auxiliary means control command generation means 125 generates the following commands which are collectively referred to as the MPU control commands.

It generates the read command of the data disk in which the data disk address of the old data is stored and the disk array data transfer means control command for DMA-transferring the old data from the disk interface control means 205 to the parity generation work area 217. As the exclusive OR generation means control command, it generates the data buffer initializing command, and the number of input data of 3 as the value to be set in the input data counter register 244. Also, it generates the write command of the data disk which stores the data disk address in which the new data is to be written.

Further, it generates the disk array data transfer means control command or collectively DMA-transferring the new data from the user area 108 to the disk interface control means 205 and the old data holding means 216. It further generates the disk array data transfer means control command in the exclusive OR generation mode for DMA-transferring the new data from the old data holding means 216 to the exclusive OR generation means 203, the old data from the parity generation work area 217 to the exclusive OR generation means 203, the old updated data from the parity holding means 218 to the exclusive OR generation means 203, and the newly generated new updated data from the exclusive OR generation means 203 to the parity holding means 218, respectively.

The array control auxiliary means control command generation unit 125 generates the following commands which are collectively referred to as the MPU control commands, and the MPU control unit 128 issues the MPU control command to the MPU 210 through the bus interface 107 of FIG. 1.

When the MPU 210 receives the MPU control command, it conducts the following processes by using the programs in the MPU control program area 214. First, the request reception unit 220 of FIG. 3 receives the MPU control command and passes it to the request management unit 221.

The disk interface control means control unit 223 issues the read command of the old data, of the MPU control commands, to the disk interface control means 205. Then, the disk interface control means 205 issues the received read command to the disk device 301 in which the old data is stored. The disk device 301 receives the read command and transfers the data to the disk interface control means 205. The disk interface control means 205 issues the interrupt signal to the MPU 210.

Then, the disk array data transfer means control unit 222 issues the disk array data transfer means control command, of the MPU commands, to the disk array data transfer means 202. The disk array data transfer means 202 receives the command and transfers the old data from the disk interface control means 205 to the parity generation work area 217 (501). In this case, the transfer source 1 address is the IO address of the disk interface control means 205 and the transfer destination 1 address is the memory address of the parity generation work area 217. The MPU 210 sets those addresses to the bidirectional data transfer control means 262 of the disk array data transfer means 202 by using the disk array data transfer means control command, sets the mode selection register 270 so that the transfer from the IO to the memory is conducted and issues the execution command to the command register 271 to conduct the transfer. The disk array data transfer means 202 issues the interrupt signal to the MPU 210.

Then, the exclusive OR generation means control unit 224 issues a command to the exclusive OR generation means 203. The structure of the exclusive OR generation means control command which enable the operation of the exclusive OR generation means 203 is explained below. The command includes the number of data inputted to calculate the exclusive OR and an initialization command for the data buffer 241. In the data write process (W3), since the setting is made to conduct the exclusive OR operation for three input data, the number of input data is three.

In the exclusive OR generation means 203 of FIG. 5, when the number of data of 3 is set in the input data counter register 244 of the data input/output management means 243 by the exclusive OR generation means control command, the data input/output means 240 is set to the input mode, and when the data buffer initialization register 245 is set, the data in the data buffer 241 is initialized by zero so that it is ready to receive the data. The input/output of all data is conducted by the disk array data transfer means 202.

The disk interface control means control unit 223 issues the new data write command to the disk interface control means 205. Then, the disk interface control means 205 issues the received write command to the disk device in which the new data is stored. The disk device 301 receives the command and waits for the data.

Then, the disk array data transfer means control unit 222 issues the disk array data transfer means control command to the disk array data transfer means 202. The disk array data transfer means 202 receives the command and collectively DMA-transfers the new data from the user area 108 to the disk interface control means 205 and the old data holding means 216 (502). The new data is written on the data disk.

In this case, the transfer source 1 address is the memory address of the user area 108, the transfer 1 address is the IO address of the disk interface control means 205, and the transfer 2 address is the memory address of the old data holding means 216. The MPU 210 sets those addresses to the bidirectional data transfer control means 262 of the disk array data transfer means 202 by using the disk array data transfer means control command, sets the mode selection register 270 so that the transfer is conducted to the IO and the memory, and issues the execution command to the command register 271 to conduct the transfer. The disk array data transfer means 202 issues the interrupt signal to the MPU 210.

Referring to FIG. 4, the operation of the disk array data transfer means 202 when it conducts the collective DMA transfer in the data write process (W3) is explained.

First, the registers are set in the same manner as that in the disk array read process (R1), the n-byte transfer is conducted from the memory address of the address x to the IO address of the address y and the memory address of the address z through the data buffer 261, and the transfer of one transfer unit is completed.

Before the transfer of the next transfer unit, n is subtracted from the transfer length register 263 and n is added to the transfer source 1 address register 264 and the transfer destination 2 address register 268. Since the transfer destination 1 is the IO, the content of the transfer destination 1 address register 267 is not changed. The n-byte transfer from the address (x+n) to the address y and the n-byte transfer from the address (x+n) to the address (z+n) are conducted in the same manner as that described above. The above operation is repeated until the transfer length register 263 reaches zero so that the collective DMA transfer of m bytes from the address x to the address y and the address z is conducted. When the DMA transfer is completed, the bidirectional data transfer control means 262 issues the interrupt signal.

Then, the disk array data transfer means control unit 222 issues the disk array transfer means control command in the exclusive OR generation mode to the disk array data transfer means 202. The disk array data transfer means 202 receives the command and transfers the new data from the old data holding means 216 to the exclusive OR generation means 203 (503), the old data from the parity generation work area 217 to the exclusive OR generation means 203 (504), and the old updated data from the parity holding means 218 to the exclusive OR generation means 203 (505), respectively. Then, it transfers the new updated data newly generated by the exclusive OR generation means 203 from the exclusive OR generation means 203 to the parity holding means 218 (506). The respective data transfers are conducted in accordance with the operation procedure of the disk array data transfer means 202.

The exclusive OR generation mode is now explained. This mode is a combination of several DMA transfers and comprises the DMA transfer from the transfer source 1, the transfer source 2 and the transfer source 3 to the exclusive OR generation means 203 and the DMA transfer from the exclusive OR generation means 203 to the transfer destination 1. When the transfer length register 263 of the bidirectional data transfer control means 262, the transfer source 1 address register 264, the transfer source 2 address register 265, the transfer source 3 address register 266, the transfer destination 1 address register 267, the transfer destination 2 address register 268, the exclusive OR generation means address register 269 and the mode selection register 270 are set by the disk array data transfer means control command and the start of transfer command is set in the command register 271, the disk array data transfer means 202 starts the transfer. A feature of this mode resides in the issuance of the interrupt signal at the stage of the completion of the DMA transfer from the exclusive OR generation means 203 to the transfer destination 1 without interrupting each of the DMA transfers. The number of transfer sources of three is set in the mode selection register 270.

Referring now to FIG. 5, an operation of the exclusive OR generation means 302 is explained. The exclusive OR generation means 203 applies the data inputted from the data input/output means 240 and the data stored in the data buffer 241 to the exclusive OR operation means 242, calculates the exclusive OR of those two data and applies the result to the data buffer 241.

First, the data in the data buffer 241 which is initialized to zero and the data 1 which is inputted first are exclusively logically ORed and the result is applied to the data buffer 241. Thus, the data 1 is now present in the data buffer 241. Then, the data inputted secondly and the data 1 in the data buffer 241 are exclusively logically ORed and the result is applied to the data buffer 241. Thus, the exclusive OR of the data 1 and the data 2 is now present in the data buffer 241. Similarly, when the third data 3 is inputted, the data 3 and the data in the data buffer 241 are exclusively logically ORed and the result is applied to the data buffer 241. Thus, the exclusive OR of the data 1, the data 2 and the data 3 is now present in the data buffer 241. Each time the data is inputted, the input data counter register 244 is incremented, and when the input at a counter register 244 reaches 0, the data input/output means 240 is changed to the output mode and the operation result is outputted from the data buffer 241 by the disk array data transfer means 202.

Turning back to the explanation of the operation, when the request management unit 221 of FIG. 3 receives the interrupt signal from the disk interface control means 205 which completed the writing of the new data and the disk array data transfer means 202, it shifts the process to the request termination unit 225 and the request termination unit 225 issues the interrupt signal to the host CPU 101.

When the host CPU 101 receives the interrupt signal, it shifts the process to the request termination unit 126 by using the request management unit 121 in the disk array control program area 109 of FIG. 2 and the request termination unit 126 terminates the overall data write process.

A difference between the data write process (W3) and other data write processes is described below.

Figure 7:
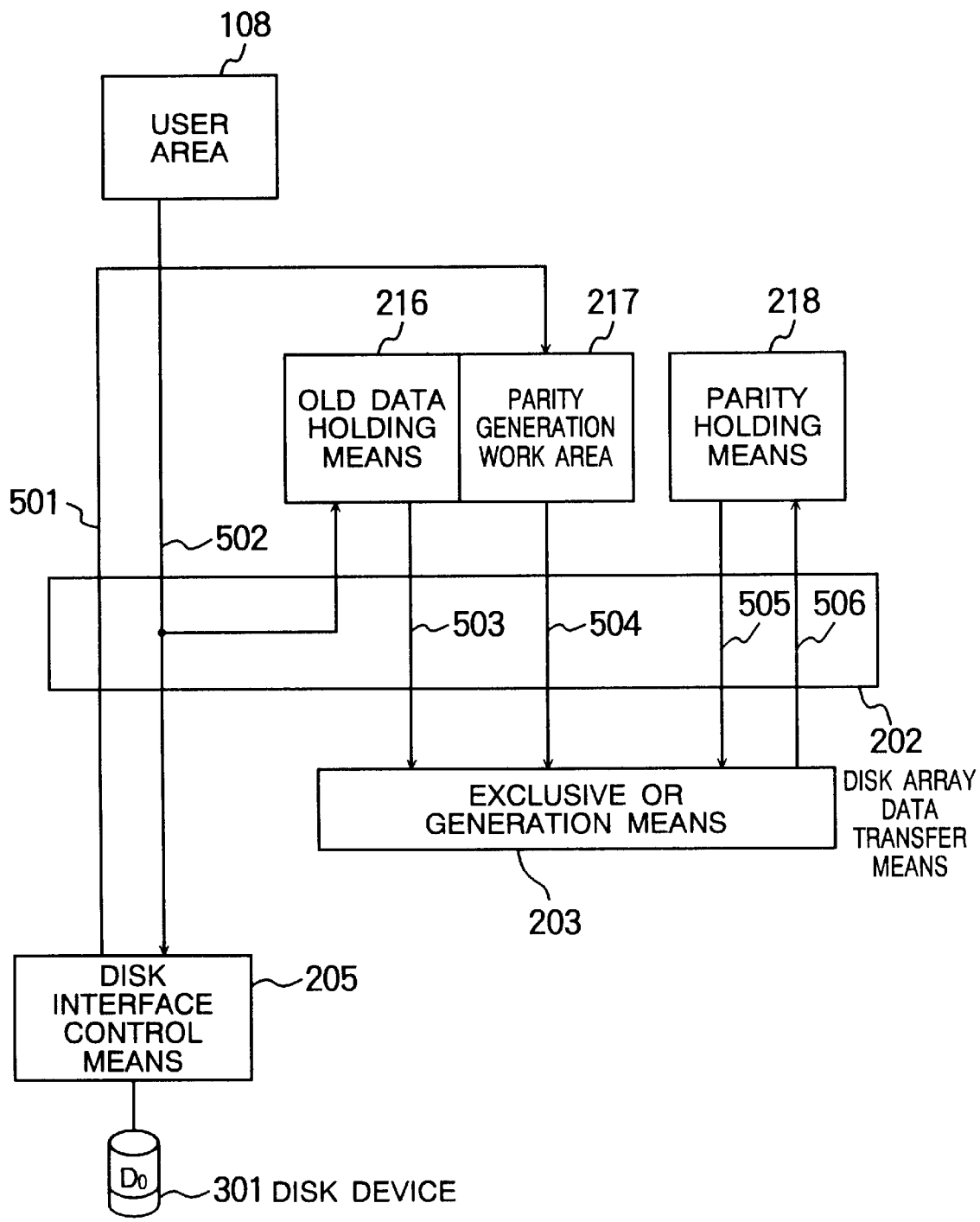
FIG. 7 shows an operation of a data write process in the first embodiment.
Figure 8:
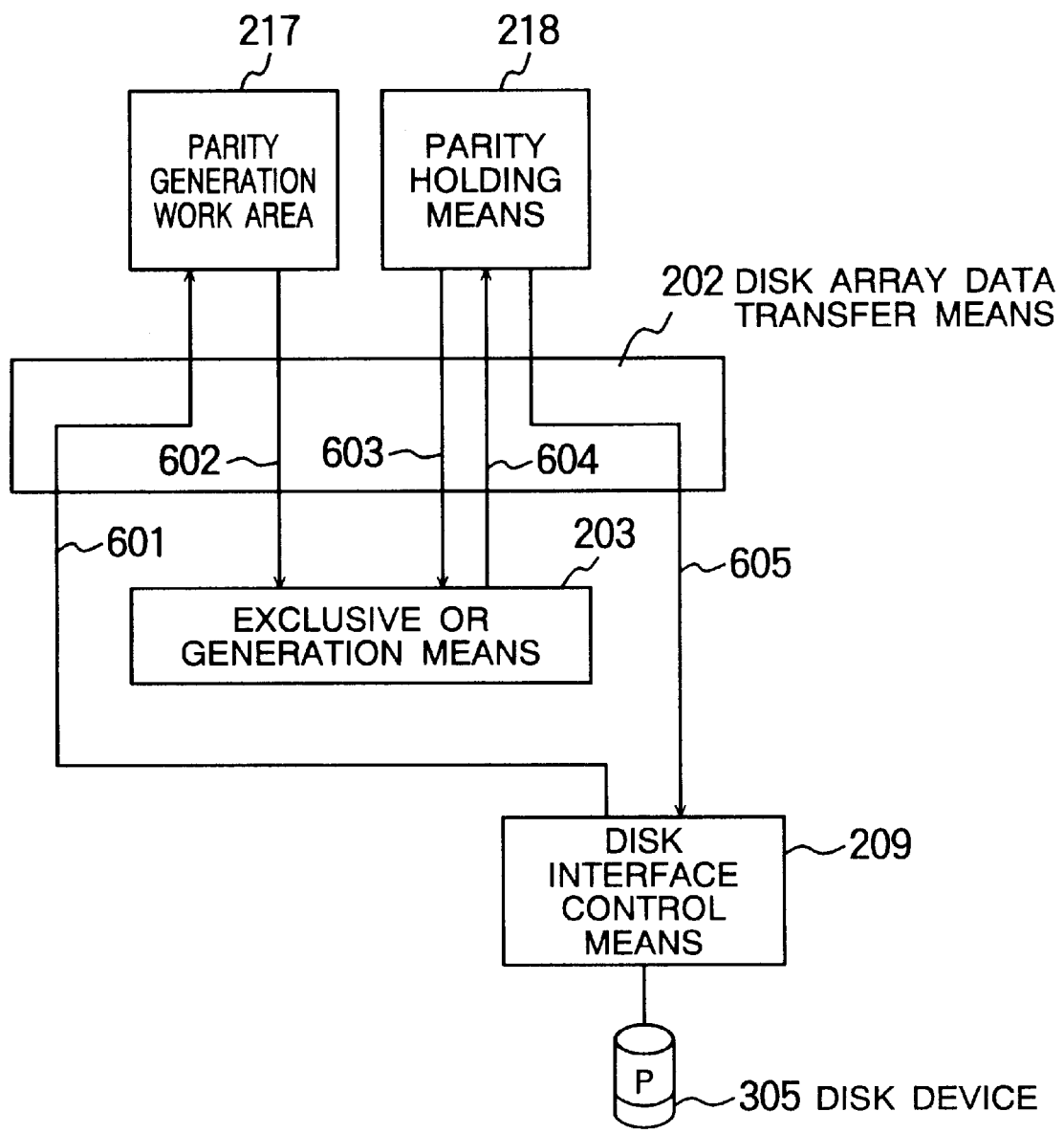
FIG. 8 shows an operation of a delayed parity process in the first embodiment.

The data write process (W5) is the substitution of the old updated data of the data write process (W3) by the old parity and the newly generated new data by the new parity. In FIG. 7, the old parity is transferred in (505) and the new parity is transferred in (506). The parity search unit 124 in the disk array control program area 109 causes the flag added to the parity disk address stored in the parity address holding means 111 to indicate the old parity which is different from the parity written in the parity disk.

The data write process (W1) is a process to generate the new updated data without using the old updated data in the data write process (W3), and the operation of the new parity generation is different from that of the data write process (W3). It also records the parity which is not matched to the data in the parity disk address.

In the process in the disk array control program area 109, the parity search unit 124 determines whether the calculated parity disk address is stored in the parity address holding unit 111 of the main memory 104 to determine whether the old updated data or the old parity data is stored in the parity holding means 218 in the memory 212 or not. In the data write process (W1), since the parity disk address is not present in the parity address holding unit 111, a memory of a size necessary to hold the new updated data is secured in the parity holding means 218, and the memory address, the parity disk address and the flag which indicates that it is the new updated data that is stored in the parity holding means 218 after the data write process are combined into one structure and it is held in the parity address holding unit 111. The parity disk address is stored in the unrecorded parity address holding means 250.

The exclusive OR generation means control command sets the number of input data to 2. The disk array data transfer control command sets the number of transfer sources of two in the mode selection register 270 in the exclusive OR generation mode. The transfer in (505) of FIG. 7 is not conducted.

In the data write processes (W2), (W4) and (W6), the processes relating to the old data read from the data write processes (W1), (W3) and (W5), respectively, are not conducted. Since the old data is stored in the old data holding means 216, the new data is transferred to the parity generation work area 217, and when the exclusive OR generation is completed, the new data is stored in the old data holding means 216.

In the process in the disk array control program area 109, the old data search unit 123 determines whether the calculated data disk address is present in the old data address holding unit 110 of the main memory 104 or not to determine whether the old data is present in the old data holding means 216 in the memory 212. In the data write processes (W2), (W4) and (W6), since the old data disk address is present in the old data address holding unit 110, the memory address of the old data holding means 216 at which the old data is present is calculated. The memory of a size necessary to hold the new data is secured in the parity generation work area 214 and the memory address is calculated.

Thereafter, the parity generation work area 217 at which the new data is stored when the exclusive OR generation is completed and the data disk address are combined into one structure and it is stored in the old data address holding unit 110. In this manner, by updating the memory address in the old data address holding unit 110, the new data stored in the parity generation work area 217 is now stored in the old data holding means 216. Namely, the transfer of (501) in FIG. 7 is not conducted and the old data holding means 216 and the parity generation work area 217 are replaced.

In the data write process of the present embodiment, a particular disk device and a particular logical block which require the updating of the parity are recorded by the parity disk address written in the unrecorded parity address holding means 250. The new data stored in the old data holding means 216 is the old data in the next data write process so that the process speeds of the generation process of the new updated data and the generation process of the new parity by the exclusive OR generation means 203 are increased.

Further, in the read-modify-write process, since the data read in the read process is stored in the old data holding means 216, it is not necessary to newly read the old data in the data write process of the updated data and the process for the disk device can be reduced by one time.

[Delayed Parity Process]

In the disk array system, it is necessary to generate the parity data in order to enhance the reliability. In the disk array system of the present invention, since the write process of the new parity is not conducted in the data write process, the delayed parity process is required. The delayed parity process is a process which is conducted asynchronously with the data write process command issued from the application. Referring to FIGS. 1, 2, 3 and 8, the delayed parity process is explained. In the description of the operation, (601) to (605) correspond to the reference numerals in FIG. 8. It is assumed that the new parity is written in P of the disk array 305 of FIG. 1.

The host CPU 101 conducts the following processes by using the programs in the disk array control program area 109. First, when the delayed parity process determination unit 127 determines that the delayed parity process is to be conducted, it passes the control to the request management unit 121. The timing to start the delayed parity process may be a time when the access frequency to the drive is low or a time when the parity holding means 218 is filled with the old updated data.

The request management unit 121 passes the process to the parity search unit 124 and the parity search unit 124 determines whether the parity disk address is present in the parity address holding unit 111 of the main memory 104, and if it is present, it examines the flag added thereto.

When the parity address holding means 111 is empty or stores only the parity disk address which is same as the a parity stored in the parity disk, it passes the process to the request management unit 121 and the request management unit 126 terminates the delayed parity process.

When the parity disk address of the old updated data or the parity disk address of the old parity which is different from that written in the parity disk is present in the parity address holding unit 111, the memory address of the corresponding parity holding means 218 is calculated and the flag is updated to indicate that the content of the parity holding means 218 after the delayed parity process is the old parity which is identical to that written in the parity disk.

The array control auxiliary means control command generation unit 125 generates the following commands which are collectively referred to as the MPU control commands. The disk array data transfer means control command and the exclusive OR generation means control command are structure in the manner described above.

In the delayed parity process (P1), the read command of the parity disk in which the parity disk address of the old parity is stored and the disk array data transfer means control command to DMA-transfer the old parity from the disk interface control means 209 to the parity generation work area 217 are generated. For the exclusive OR generation means control command, the data buffer initialization command and the number of input data of two as the value to be set in the input data counter register 244 are set.

Further, the disk array transfer means control command in the exclusive OR generation mode for DMA-transferring the old updated data from the parity holding means 218 to the exclusive OR generation means 203, the newly generated new parity from the exclusive OR generation means 203 to the parity holding means 218 and the newly generated new parity from the exclusive OR generation means 203 to the parity holding means 218 is generated.

Further, the write command of the parity disk in which the parity disk address of the new parity is stored is generated. Further, the disk array data transfer means control command for DMA-transferring the new parity from the parity holding means 218 to the disk interface control means 209 is generated.

In the delayed parity process (P2), the write command of the parity disk address in which the parity disk address of the new parity is stored is generated. Further, the disk array data transfer control command for DMA-transferring the new parity from the parity holding means 218 to the disk interface control means 209 is generated.

The array control auxiliary means control command generation unit 125 generates the above commands which are collectively referred to as the MPU control commands, and the MPU control unit 128 issues the MPU control commands to the MPU 210 through the bus interface 107 of FIG. 1.

When the MPU 210 receives the MPU control command, it conducts the following processes by using the programs in the MPU control program area 214. First, the request reception unit 220 in FIG. 3 receives the MPU control command and passes it to the request management unit 221.

In the delayed parity process (P1), the disk interface control means control unit 223 generates the read command of the old parity, of the MPU commands to the disk interface control means 209. Then, the disk interface control means 209 issues the received read command to the disk device 305 in which the old parity is stored. The disk device 305 receives the read command and transfers the old parity to the disk interface control means 209. The disk interface control means 209 issues the interrupt signal to the MPU 210.

Then, the disk array transfer control unit 222 issues the disk array data transfer means control command, of the MPU commands to the disk array data transfer means 202. The disk array data transfer means 202 receives the command and transfers the old parity from the disk interface control means 209 to the parity generation work area 217 (601). The disk array data transfer means 202 issues the interrupt signal to the mpu 210.

Then, the exclusive OR generation means control unit 224 issues the command to the exclusive OR generation means 203, and when the exclusive OR generation means 203 receives the command, the data buffer 241 is initialized so that the designated number of data may be received. In this case, the setting is made to conduct the exclusive OR operation of two input data.

The disk interface control means control unit 223 issues the write command of the new parity to the disk interface control means 209. Then, the disk interface control means 209 issues the received write command to the disk device in which the new parity is stored. The disk device 305 receives the write command and waits for data.

Then, the disk array data transfer means control unit 222 issues the disk array data transfer means control command in the exclusive OR generation mode to the disk array data transfer means 202. The disk array data transfer means 202 receives the command and transfers the old parity from the parity generation work area 217 to the exclusive OR generation means 203 (602), the old updated data from the parity holding means 218 to the exclusive OR generation means 203 (603), and the new parity newly generated by the exclusive OR generation means 203 from the exclusive OR generation means 203 to the parity holding means 218 (604). Further, it transfers the new parity from the parity holding means 218 to the disk interface control means 209 (605). In this case, the new parity is written on the parity disk. The respective data transfers are conducted in accordance with the operation procedure of the disk array data transfer means 202.

In the delayed parity process (P2), the disk interface control means control unit 223 issues the write command of the new parity to the disk interface control means 209. Then, the disk interface control means 209 issues the received write command to the disk device in which the new parity is stored. The disk device 305 receives the write command and waits for data.

The disk array data transfer means control unit 222 issues the disk array data transfer means control command to the disk array data transfer means 202. The disk array data transfer means 202 receives the command and transfers the new parity from the parity holding means 218 to the disk interface control means 209 (605). In this case, the new parity is written on the parity disk.

The subsequent processes are identical without regard to the delayed parity processes (P1) and (P2). When the request management unit 221 of FIG. 3 receives the interrupt signal from the disk interface control means 209 in which the writing of the new parity is completed and the disk array data transfer means 202, it erases the parity disk address for which the delayed parity process was conducted and which is stored in the unrecorded parity address holding means 250 and shifts the process to the request termination unit 225 which issues the interrupt signal to the host CPU 101.

When the host CPU 101 receives the interrupt signal, it shifts the process to the request termination unit 126 which terminates the overall delayed parity process.

The effect of the unrecorded parity address holding means 250 of the present embodiment is explained. In the disk array system, it is necessary to generate and hold the parity data in order to maintain the reliability. In the disk array system of the present embodiment, however, the new parity is not written on the parity disk when the new data is written but the delayed parity process is conducted asynchronously thereafter. However, when an event such as power failure occurs before the delayed parity process is conducted, the integrity between the data and the parity is not maintained. Thus, the unprocessed parity disk address is registered in the unrecorded parity address holding means 250 so that even if the old updated data or the parity is erased from the parity holding means 218 by the power failure, the particular disk device and the particular logical address at which the parity is to be generated in the next start-up can be determined. The parity is generated by conducting the exclusive OR operation to the data recorded on the disk device.

The effect of the present embodiment is now explained. In the present invention, the disk array write process is divided into the data write process and the delayed parity process to reduce the number of times of disk access necessary in writing the new data. Further, the means for temporarily holding the new data, the new updated data and the new parity is provided to reduce the number of times of disk access for reading the old data and the old parity. In this manner, the disk array read/write process performance is enhanced. Further, since the CPU is not used for the memory-to-memory copy and the exclusive OR operation, the load to the CPU is reduced.

First, the disk array read/write process performance is discussed. It is assumed that 15 (msec) is required for one disk access, five disk devices are provided and an overall overhead of the system is 28(%), the disk access at 240 times per second is attained.

The number of times of disk access in the prior art software RAID is one time in the disk array read process and four times in the disk array write process. Accordingly, when a read factor is 50(%), five times of disk access are required in order to conduct the disk array read/write process one time, respectively, and each process per second is 48 (IOPS) and the process performance is 96 (IOPS). The read factor 50(%) means that the proportion of the disk array read/write processes are 50(%) per unit time, respectively where IOPS is a unit for representing the number of IO processes per second.

In the present embodiment, assuming that the hit ratio of the old data holding means in the data write process is 85(%), the number of times of disk access is one time in the disk array read process, and in the data write process, it is one time in case of the old data hit and two times in case of the old data miss, and 1.15 times in average. When the data to be read is present in the holding means, it is referred to as the hit, and when the data is not present, it is referred to as the miss. Accordingly, when the read factor is 50(%), 2.15 times of disk access is needed in order to conduct the disk array read process and the data write process one time, respectively, and each process per second is 112 (IOPS) or total of 224 (IOPS).

However, when the hit rate of the parity holding means in the data write process is 85(%), 15(%) of the 112 (IOPS) of the data write process, that is, 16.8 (IOPS) are the process to store the old updated data in the parity holding means. When the capacity of the parity holding means becomes full, it is necessary to conduct the delayed parity process and the process to write the parity of the present invention to the parity disk is 240 (IOPS). Accordingly, the overhead of 7(%) relating to the writing of the parity disk results in for the data write process and the process performance of the present embodiment is 209 (IOPS). Accordingly, in the read factor of 50(%), the present embodiment has the process performance which is 2.18 times as high as that of the prior art software RAID.

The load to the CPU is discussed. Assuming that ten clocks are required for the transfer of 4 (KBytes) eight bursts at 33 (MHz), the data input/output rate for the memory is 107 (MBytes/sec), and assuming that the overhead is approximately two times, the data input/output rate for the memory is 50 (MBytes/sec).

First, the load factor of the CPU is considered for the software RAID. In the exclusive OR operation of the disk array write process, the input/output for the memory is conducted four times, and assuming that the overall overhead of the system is approximately two times, 640 ($\mu$sec) is needed for the exclusive OR operation of 4 (KBytes). Assuming that 100 ($\mu$sec) is needed for the management of the RAID, the precess time needed for 1 (IO) of 4 (KBytes) is 1000 ($\mu$sec) in the disk array read process and 1640 ($\mu$sec) in the disk array write process, and 1320 ($\mu$sec) in average. Accordingly, the proportion of the CPU process per IO is 0.132(%).

Next, the present embodiment in which the memory-to-memory copy is conducted by the disk array data transfer means and the exclusive OR operation is conducted by the exclusive OR generation means is considered. The load to the CPU is only the management of the RAID and the process time required for the 1 (IO) of 4 (KBytes) is 1000 ($\mu$sec) for both the disk array read process and the disk array write process. Accordingly, the proportion of the CPU process per IO is 0.100(%).

Considering the disk array read/write process performance and the CPU load factor, the process performance when the read factor is 50(%) is 96 (IOPS) in the software RAID and 209 (IOPS) in the present embodiment. The CPU load factor per second is 96 (IOPS)×0.132(%)=12.7(%) for the software RAID and 209 (IOPS)×0.100(%)=20.9(%) for the present embodiment.

In summary, when the read factor is 50(%), the CPU load factor of the present embodiment exhibits the rise of approximately 8.2(%) from that of the prior art software RAID and the IO performance is improved by the factor of 2.2 so that the high performance is attained with the low CPU load.

An Embodiment 2 of the disk array data transfer means 202 of the present invention is now explained.

The system configuration is identical to FIG. 1 and differences from the Embodiment 1 reside in the difference of the structure and the operation of the disk array data transfer means 202 and the difference of the structure and the operation of the disk interface control means 205~209.

Figure 9:
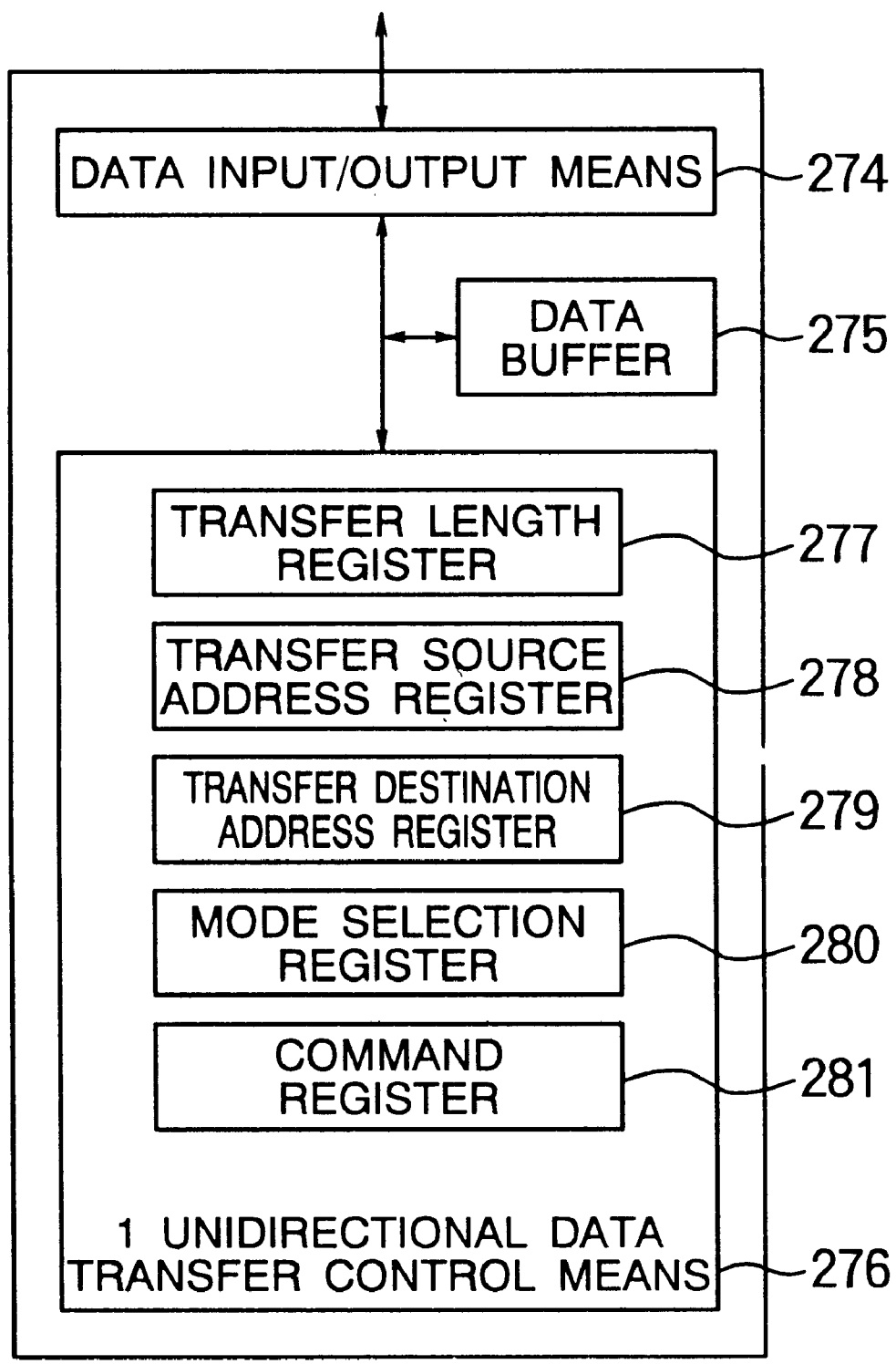
FIG. 9 shows a block diagram of disk array data transfer means in a second embodiment.

FIG. 9 shows a configuration of the disk array data transfer means 202 of the Embodiment 2. The disk array data transfer means 202 comprises data input/output means 274, a data buffer 275 and unidirectional data transfer control means 276. The unidirectional data transfer control means 276 comprises a transfer length register 277 for designating the transfer length to be transferred by byte unit, a transfer source address register 278 for storing an IO address of a transfer source of the data or a memory address, a transfer destination address register 279 for storing an IP address of a transfer destination of the data or a memory address, a mode selection register 280 for specifying whether the transfer source and the transfer destination are IO or memory, respectively, and a command register 281 for receiving a start of transfer command.

The disk interface control means 205~209 have the DMA transfer function and conduct the DMA transfer between the disk interface control means and the memory. The transfer length of the data for the DMA transfer and the memory address of the data transfer source or the data transfer destination are also stored in the read command and the write command sent to the disk interface control means 205~209.

Unlike the Embodiment 1, the disk array data transfer means 202 of the Embodiment 2 has only one register for storing the transfer destination address and the transfer destination in one DMA transfer is only one location. Thus, the two DMA transfers simultaneously conducted in the collective DMA transfer of the Embodiment 1 are conducted by the disk interface control means 205~209 and the disk array data transfer means 202. The DMA transfer between the disk interface control means 205~209 and the user area 108 is conducted by the disk interface control means 205~209.

Referring to FIG. 9, the operation of the disk array data transfer means 202 is explained. In the Embodiment 2, the disk array data transfer means 202 conducts the DMA transfer of the transfer length of several bytes from one transfer source to one transfer destination.

First, a structure of the disk array data transfer means control command for starting the disk array data transfer means 202 is explained. The command comprises the transfer length, the transfer source address, the transfer destination address, the mode selection command for specifying whether the transfer source and the transfer destination are IO or memory, respectively, and the start of transfer command.

A method for conducting the DMA transfer is now explained. When the transfer length register 277 of the unidirectional data transfer control mean 276, the transfer source address register 278, the transfer destination address register 279 and the mode selection register 280 are set by the disk array data transfer means control command and the transfer start command is set in the command register 281, the disk array transfer means 202 starts the transfer.

An example of the DMA transfer when the transfer source is the IO and the transfer destination is the memory is shown below. In the Embodiment 2, the IO is the exclusive OR generation means 203. Assuming that the capacity of the data buffer 275 is n bytes, the transfer unit is n bytes. The transfer length is set to m bytes, the transfer source address is set to the address x and the transfer destination address is set to the address y, and the address x is the IO address and the address y is the memory address, and the DMA transfer from the IO to the memory is conducted. First, the n-byte transfer is conducted from the address x to the data buffer 275 through the data input/output means 274. Then, the n-byte transfer is conducted from the data buffer 275 to the address y through the data input/output means 274 so that the transfer of one transfer unit is completed.

Prior to the transfer of the next transfer unit, n is subtracted from the transfer length register 277 and n is added to the transfer destination address register 279. Then, the n-byte transfer from the address x to the address (y+n) is conducted in the same manner as that described above. The above operation is repeated until the transfer length register 277 reaches zero so that the m-byte DMA transfer from the address x to the address y is conducted. When the DMA transfer is completed, the unidirectional data transfer control means 276 issues the interrupt signal and the process is terminated.

When the transfer source is the memory and the transfer destination is the IO, the DMA transfer similar to that described above may be attained. In this case, when the n-byte transfer is to be conducted after the transfer of one transfer unit, n bytes has been conducted, n is added to the register in which the memory address is stored because the transfer source is the memory address, and the n is not added to the register in which the IO address is stored but the same value is used because the transfer destination is the IO address. This operation is controlled by the unidirectional data transfer control means 276 by setting in the mode selection register whether the addresses stored in the respective registers are IO addresses or memory addresses.

The differences of the disk array read process and the disk array write process in the disk array system of the Embodiment 2 from those of the Embodiment 1 are now explained.
[Disk Array Read Process]
The classification of the type of the disk array read process of the Embodiment 2 is same as that of the Embodiment 1 but the operation is different. The changes from the Embodiment 1 are shown below. In the disk array read process (R1), the old data which is the intended data is read from the disk and it is transferred to the user area 108, and the old data is transferred from the user area 108 to the temporary holding means. The process to transfer the old data from the disk to the user area 108 is conducted by the disk interface control means. The disk array read process (R2) is identical to that of the Embodiment 1.
[Disk Array Write Process]
[Data Write Process]
The classification of the type of the data write process of the Embodiment 2 is same as that of the Embodiment 1 but the operation is different. The changes from the Embodiment 1 are shown below. In all data write processes, the process to transfer the new data from the user area 108 to the data disk and the temporary holding means is divided into the process to transfer the new data from the user area 108 to the data disk and the process to transfer the new data from the user area 108 to the temporary holding means. The process to transfer the new data from the user area 108 to the data disk is conducted by the disk interface control means. In the data write processes (W1), (W3) and (W5), the process to transfer the old data to the temporary holding means is conducted by the disk interface control means.

Since the exclusive OR generation mode is not provided in the disk array data transfer means 202 of the Embodiment 2, the data transfer between the temporary holding means and the exclusive OR generation means 203 is conducted individually.
[Delayed Parity Process]
The classification of the type of the delayed parity process of the Embodiment 2 is same as that of the Embodiment 1 but the operation is different. The changers from the Embodiment 1 are shown below. The process to transfer the old parity to the temporary holding means and the process to transfer the new parity to the parity disk are conducted by the disk interface control means.

Since the exclusive OR generation mode is not provided in the disk array data transfer means 202 of the Embodiment 2, the data transfer between the temporary holding means and the exclusive OR generation means 203 is conducted individually.

With the configuration of the Embodiment 2, the structure of the disk array data transfer means 202 may be simplified and the cost may be reduced, and the DMA transfer relating to the disk interface control means 205~209 is conducted by the disk interface control means and the DMA transfer relating to the memory-to-memory copy is conducted by the disk array data transfer means 202 so that the DMA transfer efficiency is improved.

Figure 10A:
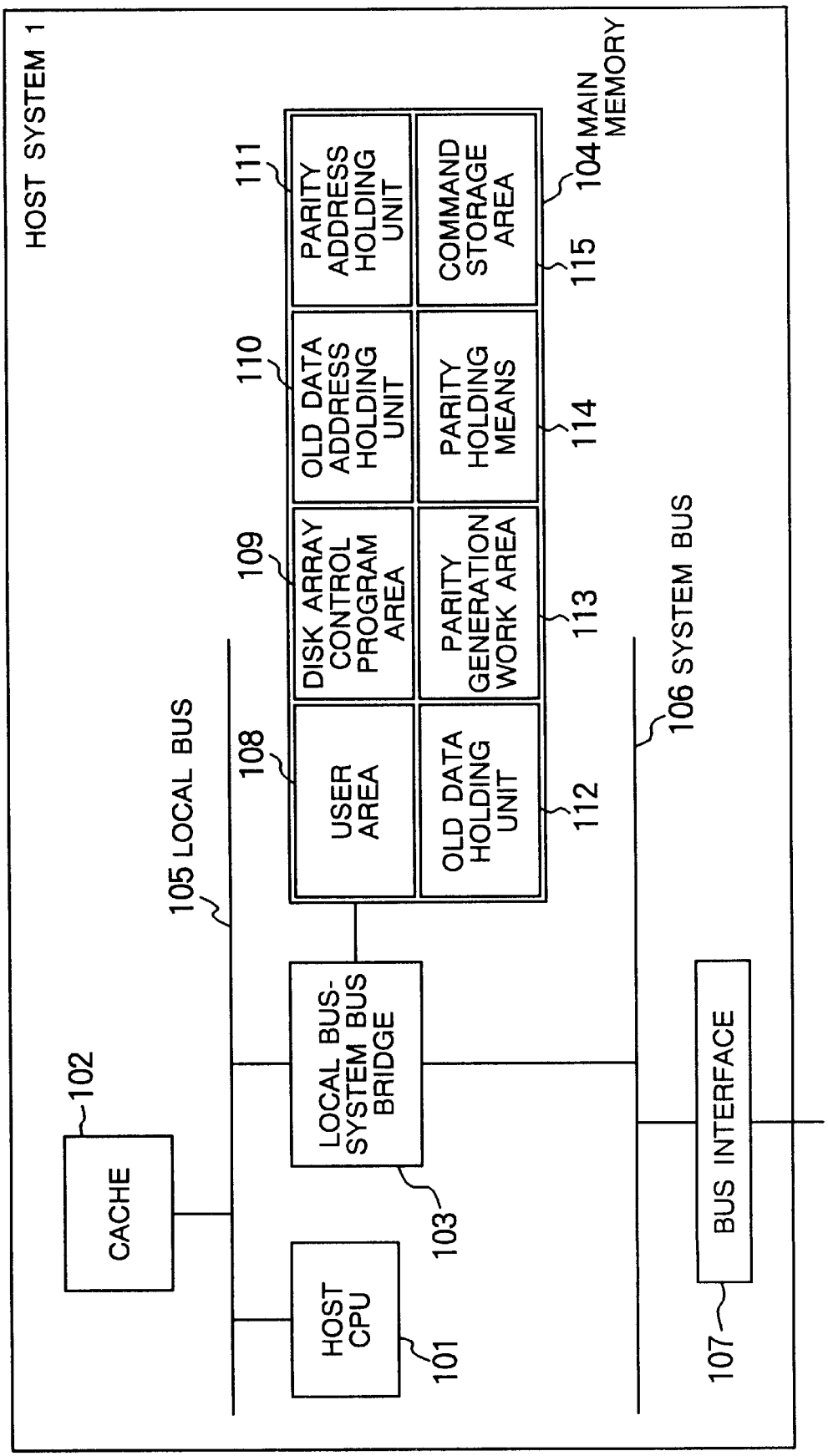
FIGS. 10A and 10B show block diagrams of a computer system in accordance with a third embodiment.
Figure 10B:
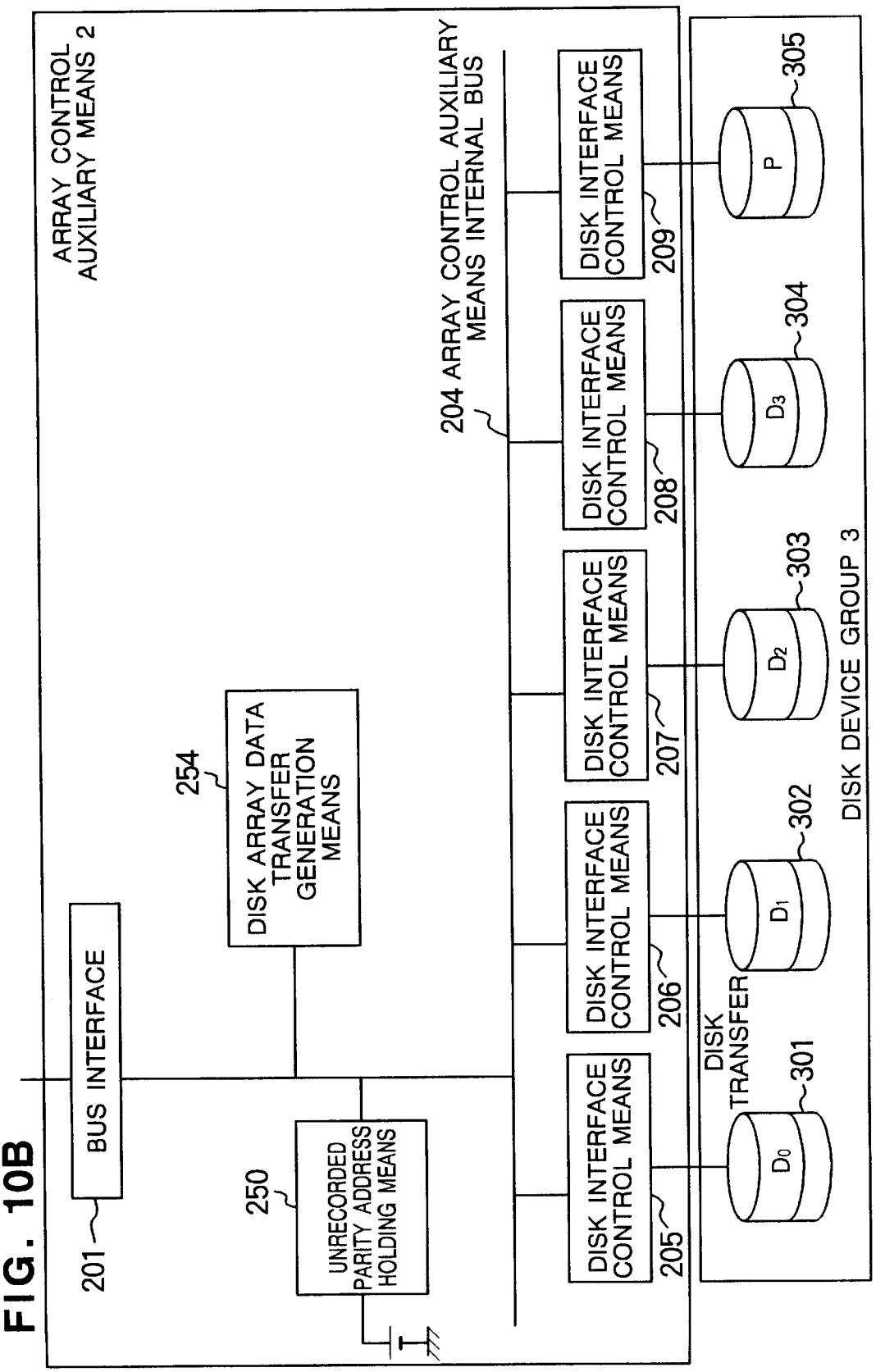

Referring to a system configuration of FIG. 10, a third embodiment of the present invention is explained.

In FIG. 10, numeral 1 denotes a host system, numeral 2 denotes array control auxiliary means and numeral 3 denotes a disk device group.

The host system 1 comprises a host CPU 101, a cache 102, a local bus-system bus bridge 103, a main memory 104 and a bus interface 107. The host CPU 101, the cache 102 and the local bus-system bus bridge 103 is connected by a local bus 105. The local bus-system bus bridge 103 and the bus interface 107 are connected to the system bus 106.

The main memory 104 comprises a user area 108, a disk array control program area 109, an old data address holding unit 110, a parity address holding unit 111, old data holding means 112, a parity generation work area 113, parity holding means 114 and a command storage area 115 for queuing a number of sent commands.

Figure 11:
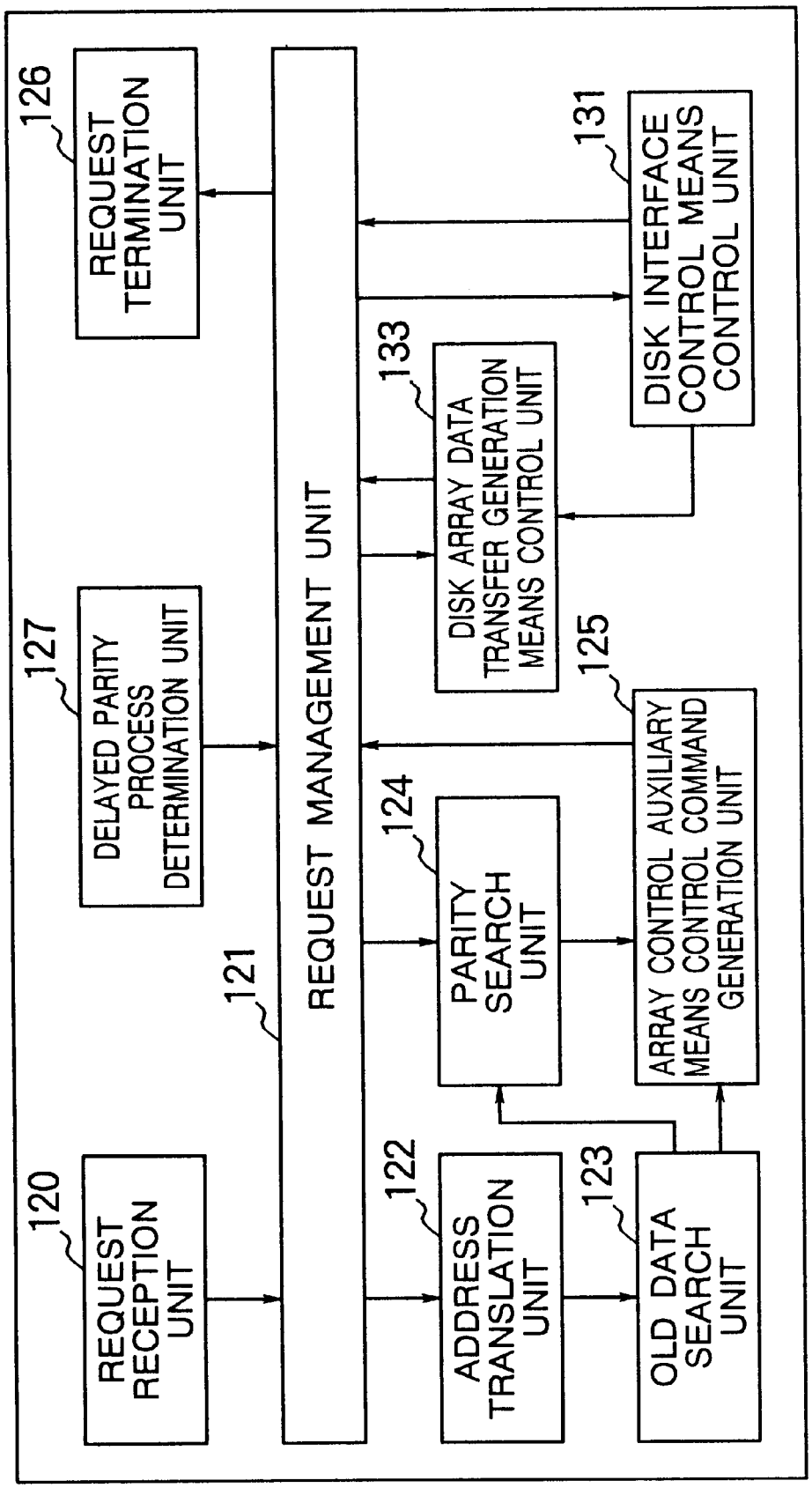
FIG. 11 shows a block diagram of a disk array control program area in the third embodiment.

As shown in FIG. 11, the disk array control program area 109 comprises q request reception unit 120, a request management unit 121, an address translation unit 122, an old data search unit 123, a parity search unit 124, an array control auxiliary means control command generation unit 125, a disk array data transfer generation means control unit 133 for issuing a command to a disk array data transfer generation means 254, a disk interface control means control unit 131, a request termination unit 126 and a delayed parity process determination unit 127.

Turning back to FIG. 10, the array control auxiliary means 2 comprises a bus interface 201, a disk array data transfer generation means 254 for conducting the data transfer and generating an exclusive OR, five disk interface control means 205~209 having the DMA transfer function, and battery-backed-up unrecorded parity address holding means 250, and they are connected by an array control auxiliary means internal bus 204. The bus interface 201 is connected to the bus interface 107 of the host system 1. By constructing the disk array data transfer generation means 254 of the array control auxiliary means 2 in one chip, it is not necessary to transfer the same data twice from the parity generation area on the main memory when the same data is to be handled during the data transfer process, and the traffic of the bus connecting the system bus of the host system and the disk interface control means or the system bus or the main memory is reduced and the process speed is increased.

The disk device group 3 comprises five disk devices 301~305 in the present embodiment. The respective disk devices 301~309 are connected to the five disk interface control means 205~209 of the array control auxiliary means 2 through respective cables.

The configurations of the unrecorded parity address holding means 250, the old data holding means 112 in the main memory 104, the old data address holding unit 110, the parity holding means 114 and the parity address holding unit 111 are identical to those of the old data holding means 216, the old data address holding unit 110, the parity holding means 218, the parity address holding unit 111 and the unrecorded parity address holding means 250 of the Embodiment 1 of FIG. 1.

Figure 12:
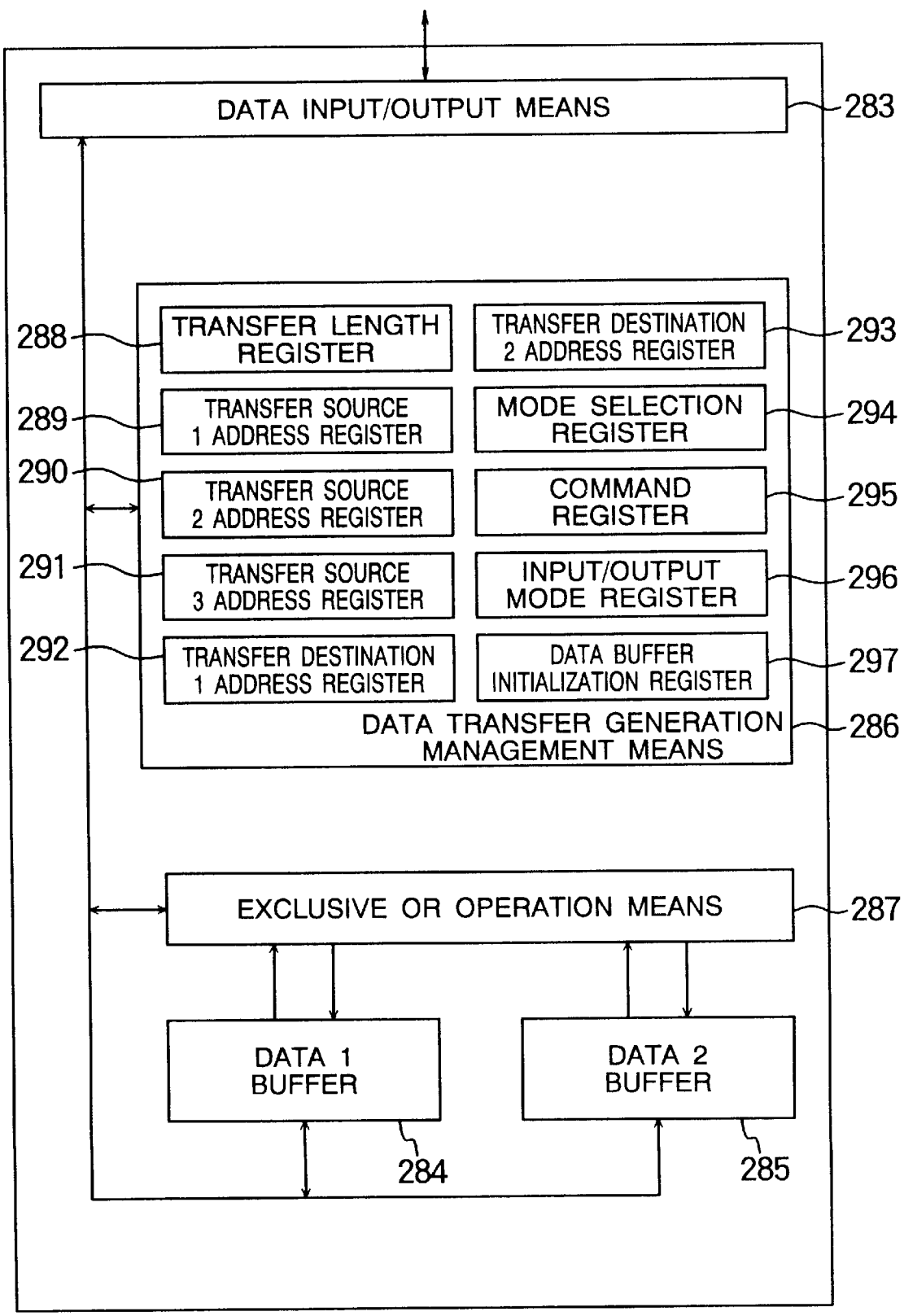
FIG. 12 shows a block diagram of disk array data transfer generation means in the third embodiment.

Referring to FIG. 12, a configuration of the isk array data transfer generation means 254 of the array control auxiliary means 2 is explained.

The disk array data transfer generation means 254 comprises a data 1 buffer 284, a data 2 buffer 285, data transfer generation management means 286 and exclusive OR operation means 287 for conducting the exclusive OR operation.

The data transfer generation management means 286 comprises a transfer length register 288 for designating the data length to be transferred by byte unit, and a transfer source 1 address register 289, a transfer source 2 address register 290 and a transfer source 3 address register 291 as registers for storing memory addresses of the data transfer sources. It further comprises a mode selection register 294 for designating a particular data transfer with which the exclusive OR is to be generated, a command register 295 for receiving the start of transfer command, an input/output mode register 296 for designating an input/output mode of the data input/output means 283 and a data buffer initialization register 297 for initializing the data 1 buffer 284 and the data 2 buffer 285. In the Embodiment 3, the disk array data transfer means 254 operates in one of the disk array read process mode, the data write mode and the delayed parity mode.

Major differences from the Embodiment 1 of FIG. 1 reside in that the temporary holding means necessary for the parity generation is located in the main memory 104, the disk array data transfer generation means 254 for conducting the two operations, the data transfer and the parity generation is located in the array control auxiliary means 2 and the array control auxiliary means 2 is conducted not by the MPU 210 but by the host CPU 101. The old data holding means 112, the parity generation work area 113 and the parity holding means 114 are collectively referred to as the temporary holding means. The DMA transfer between the disk interface control means 205~209 and the main memory 104 is conducted by the disk interface control means 205~209 and other DMA transfers are conducted by the disk array data transfer generation means 254.

The disk array write process of the Embodiment 3 comprises the data write process and the delayed parity process as it is in the Embodiment 1.

The data write process is classified to the following six types depending on the content stored in the temporary holding means.

(W1) Nothing is stored in temporary holding means:

The process to read the old data from the data disk and transferring it to the temporary holding means, the process to transfer the new data from the user area 108 to the disk array data transfer generation means 254, the process to transfer the old data transferred to the temporary holding means to the disk array data transfer generation means 254, the process to generate the new updated data from the new data and the old data in the disk array data transfer generation means 254, the process to transfer the new data stored in the disk array data transfer generation means 254 to the temporary holding means, the process to transfer the new updated data stored in the disk array data transfer generation means 254 to the temporary holding means, and the process to transfer the new data from the user area 108 to the data disk are conducted. The formula (2) is used for the generation of the new updated data.

(W2) Old data is stored in temporary holding means:

It is substantially same as the case of (W1) but the process to read the old data from the data disk and transfer it to the temporary holding means is not necessary. The formula (2) is used for the generation of the new updated data.

(W3) Old updated data is stored in temporary holding means:

The process to read the old data from the data disk and transfer it to the temporary holding means, the process to transfer the new data from the user area 108 to the disk array data transfer generation means 254, the process to transfer the old data transferred to the temporary holding means to the disk array data transfer generation means 254, the process to transfer the old updated data stored in the temporary holding means to the disk array transfer generation means 254, the process to generate the new updated data from the new data, the old data and the old updated data in the disk array data transfer generation means 254, the process to transfer the new data stored in the disk array data transfer generation means 254 to the temporary holding means, the process to transfer the new updated data stored in the disk array data transfer generation means 254 to the temporary holding means and the process to transfer the new data from the user area 108 to the data disk are conducted. The formula (4) is used for the generation of the new updated data.

(W4) Old updated data and old data are stored in temporary holding mean:

It is substantially same as the case of (W3) but the process to read the old data from the disk and transfer it to the temporary holding means is not necessary. The formula (4) is used for the generation of the new updated data.

(W5) Old parity is stored in temporary holding means:

The process to read the old data from the data disk and transfer it to the temporary holding means, the process to transfer the new data from the user area 108 to the disk array data transfer generation means 254, the process to transfer the old data stored in the temporary holding means to the disk array data transfer generation means 254, the process to transfer the old parity stored in the temporary holding means to the disk array data transfer generation means 254, the process to generate the new parity from the new data and the old parity in the disk array data transfer generation means 254, the process to transfer the new data stored in the disk array data transfer generation means 254 to the temporary holding means, the process to transfer the new parity stored in the disk array data transfer generation means 254 to the temporary holding means, and the process to transfer the new data from the user area 108 to the data disk are conducted. The formula (1) is used for the generation of the new updated data.

(W6) Old parity and old data are stored in temporary holding means:

It is substantially same as the case of (W5) but the process to read the old data from the disk and transfer it to the temporary holding means is not necessary. The formula (1) is used for the generation of the new parity.

In the data write process, the new data stored in the temporary holding means is the old data in the next data write processes (W2), (W4) and (W6). In the data write processes (W2), (W4) and (W6), since the old data read process is not conducted, the disk access can be reduced by one time.

In the data write processes (W1), (W2), (W3) and (W4), the new updated data stored in the temporary holding means is the old updated data in the next data write processes (W3) and (W4) and the delayed parity process (P1) to be described later.

In the data write processes (W5) and (W6), the new parity stored in the temporary holding means is the old parity in the next data write processes (W5) and (W6) and the delayed parity process (P2) to be described later. In the data write processes (W5) and (W6), since the old parity read process is not conducted, the disk access is reduced by one time. Further, since the old parity is stored in the temporary holding means and the new parity write process is not conducted, the disk access is reduced by one time. In this manner, since the temporary holding means is used for the reading of the old parity and the writing of the new parity, the data write process may be continuously conducted without accessing to the parity disk.

The delayed parity process is classified to the following two types depending on the content stored in the temporary holding means. When the old parity already written on the disk is stored in the temporary holding means, the delayed parity process is not conducted. The delayed parity process is also not conducted when nothing is stored in the temporary holding means or only the old data is stored in the temporary holding means.

(P1) Old updated data is stored in the temporary holding means:

The process to read the old parity from the disk and transfer it to the temporary holding means, the process to transfer the old parity transferred to the temporary holding means to the disk array data transfer generation means 254, the process to transfer the old updated data stored in the temporary holding means to the disk array data transfer generation means 254, the process to generate the new parity from the old parity, the old updated data and the new parity in the disk array data transfer generation means 254, the process to transfer the new parity stored in the disk array data transfer generation means 254 to the temporary holding means, and the process to transfer the new parity from the temporary holding means to the parity disk are conducted. The formula (3) is used for the generation of the new parity. The new parity stored in the temporary holding means is the old parity in the next data write processes (W5) and (W6).

(P2) Old parity not written on disk is stored in temporary holding means:

The old parity is transferred from the temporary holding means to the disk. The old parity in (P2) corresponds to the new parity in the formula (3).

The disk array read process of the Embodiment 3 is described below.

The disk array read process is classified to the following two types depending on the content stored in the temporary holding means.

(R1) Old data is not stored in temporary holding means:

The process to read the old data which is the intended data and transfer it to the user area 108, the process to transfer the old data from the user area 108 to the disk array data transfer generation means 254, and the process to transfer the old data from the disk array data transfer generation means 254 to the temporary holding means are conducted.

(R2) Old data is stored in temporary holding means:

The process to transfer the old data which is the intended data from the temporary holding means to the disk array data transfer generation means 254 and the process to transfer the old data from the disk array data transfer generation means 254 to the user area 108 are conducted.

The disk array read process operation and the disk array write process operation of the disk array system configured as shown in FIG. 10 are explained. The disk array write process are divided to the data write process and the delayed parity process for explanation.

[Disk Array Read process]

Figure 13:
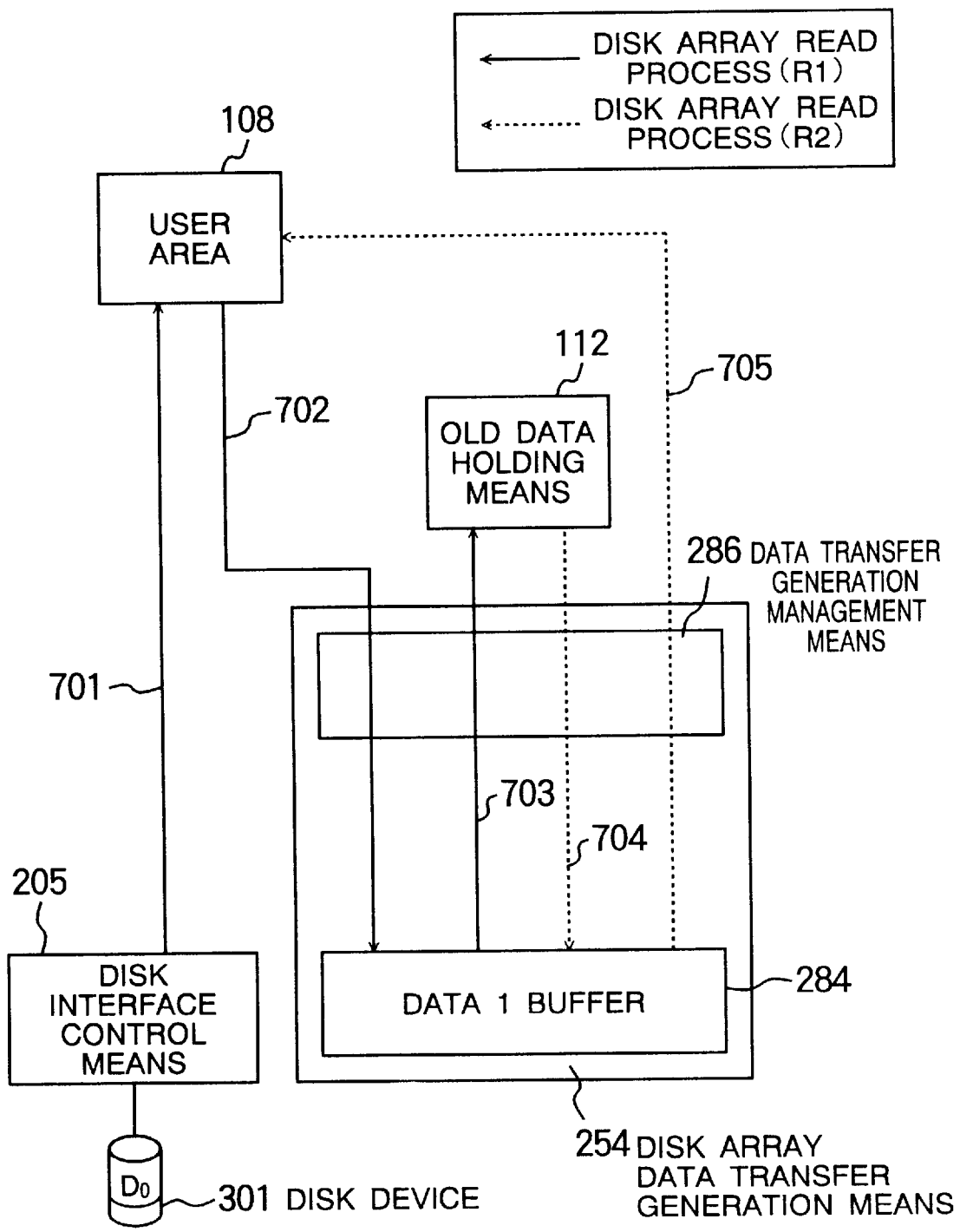
FIG. 13 shows an operation of a disk array read process in the third embodiment.

First referring to FIGS. 10, 11 and 13, the disk array read process operation is explained. In the description of the operation, (701) to (705) correspond to the reference numerals in FIG. 13. It is assumed that the intended data is stored at D0 in the disk device 301 of FIG. 10. When the disk array read request is issued from the application on the host system 1, the host CPU 101 conducts the following processes by using the programs in the disk array control program area 109. First, the request reception unit of FIG. 11 receives the read request. The request management unit 121 passes the read request to the address translation unit 122 which calculates the data disk address of the intended data.

The old data search unit 123 determines whether the data disk address of the intended data is stored in the old data address holding unit 110 of the main memory 104 or not to determine whether the intended data is stored in the old data holding means 112 in the main memory 104 or not to classify the type of the disk array read processes (R1) and (R2).

When the data disk address is not stored in the old data address holding unit 110, the disk array read process (R1) is conducted, and the memory of a size necessary to hold the intended data is secured in the old data holding means 112 and the memory address is calculated, and the memory address and the data disk address are combined into one array structure and it is held in the old data address holding unit 110.

When the old data disk address is stored in the old data address holding unit 110, the disk array read process (R2) is conducted, and the memory address of the old data holding means 112 in which the intended data is stored is calculated.

The address control auxiliary means control command generation unit 125 generates the following commands.

In the disk array read process (R2), the disk array data transfer generation means control command in the disk array read process mode to DMA-transfer the intended data from the old data holding means 112 to the user area 108 is generated, and the command is referred to the array control auxiliary means control command. The disk array data transfer generation means control command comprises a transfer length, a memory address of the old data holding means 112 which is the transfer source, a memory address of the user area 108 which is the transfer destination 1, a mode selection command for designating an operation mode and a start of transfer command.

In the disk array read process (R1), the read command of the data disk in which the data disk address of the intended data and the memory address of the user area 108 to which the read intended data is transferred are stored, and the disk array data transfer generation means control command of the disk array read process mode to DMA-transfer the intended data to from the user area 108 to the old data holding means 112 are generated and the respective commands are combined to the array control holding means control command. The disk array data transfer generation control command comprises the transfer length, the memory address of the user area 108 which is the transfer source 1, the memory address of the old data holding means 112 which is the transfer destination 1, the mode selection command for designating the operation mode and the start of transfer command.

The array control auxiliary means control command generation unit 125 passes the process to the request management unit 121.

First, in the disk array read process (R2), the disk array data transfer generation means issues the disk array data transfer generation means control command, of the array control auxiliary means control commands to the disk array data transfer generation means 254. The disk array data transfer generation means 254 receives the command and DMA-transfers the intended data from the old data holding means 112 to the user area 108. In this case, the transfer source address 1 is the memory address of the old data holding means 112 and the transfer destination 1 address is the memory address of the user area 108. The host CPU 101 sets those addresses in the data transfer generation management means 286 of the disk array data transfer generation means 254, sets the disk array read process mode in the mode selection register 294 and issues the start of transfer command to the command register 295 to conduct the DMA transfer. When the DMA transfer is completed, the disk array data transfer generation means 254 issues the interrupt signal to the host CPU 101.

Referring to FIG. 12, the operation of the disk array read process mode of the disk array data transfer generation means 254 is explained. By the disk array data transfer generation means control command, the transfer length of m bytes is stored in the transfer length register 288, the memory address x of the intended data stored in the old data holding means 112 is stored in the transfer source 1 address register 289, and the memory address y of the user area 108 to which the intended data is to be transferred is stored in the transfer destination 1 address register 292.

Assuming that the capacities of the data 1 buffer 284 and the data 2 buffer 285 are n bytes, respectively, the transfer unit is n bytes. First, n bytes of the intended data are transferred from the address x to the data 1 buffer 284 through the data input/output means 283 (704), then n bytes of the intended data are transferred from the data 1 buffer 284 to the address y through the data input/output means 283 (705), and the transfer of one transfer unit is completed.

Before the transfer of the next transfer unit, n is subtracted from the transfer length register 288 and n is added to the transfer source 1 address register 289 and the transfer destination 1 address register 292. Then, the n-byte transfer is conducted from the address (x+n) to the address (y+n) in the same manner as that described above. The above operation is repeated until the transfer length register 288 reaches zero so that the DMA transfer is conducted from the address x to the address y. When the DMA transfer is completed, the data transfer generation management means 286 issues the interrupt signal and the process is terminated. In the disk array read process mode, the data input/output means 283 repeats the input mode and the output mode.

In an Embodiment 4 to be described later, the disk array data transfer generation means 254 of FIG. 12 has a transfer destination 2 address register for storing the data transfer destination address in the data transfer generation management means 286. When the transfer source or the transfer destination is the IO, the same DMA transfer as that described above may be attained. In this case, when further n-byte transfer is to be conducted after the transfer of one transfer unit of n bytes, n is not added to the address registers in which the IO addresses are stored but the same values are used because the transfer source is the IO. The IO in the transfer source or the transfer destination is set in the mode selection register 294 of the data transfer generation management means 286.

Turning back to the description of the operation, when the transfer of the intended data is completed, the request management unit 121 of FIG. 11 shifts the process to the request termination unit 126 which terminates the overall read process.

In the disk array read process (R1), the disk interface control means control unit 131 issues the read command of the intended data, of the array control auxiliary means control commands to the disk interface control means 205. Then, the disk interface control means 205 issues the received read command to the disk device 301 in which the intended data is stored. The disk device 301 receives the read command and transfers the intended data to the disk interface control means 205. The disk interface control means 205 DMA-transfers the intended data to the user area 108 (701) and issues the interrupt signal to the host CPU 101. Then, the disk array data transfer generation means control unit 133 issues the disk array data transfer generation means control command, of the array control auxiliary means control commands to the disk array data transfer generation means 254. The disk array data transfer means 254 receives the command and DMA-transfers the intended data from the user area 108 to the old data holding means 112 (702) (703). When the DMA transfer is completed, the disk array data transfer generation means 254 issues the interrupt signal to the host CPU 101.

When the transfer of the intended data is completed, the request management unit 121 shifts the process to the request management unit 126 which terminates the overall read process.

[Disk Array Write Process]

The data write process and the delayed parity process in the disk array write process are now explained.

[Data Write Process]

Figure 14:
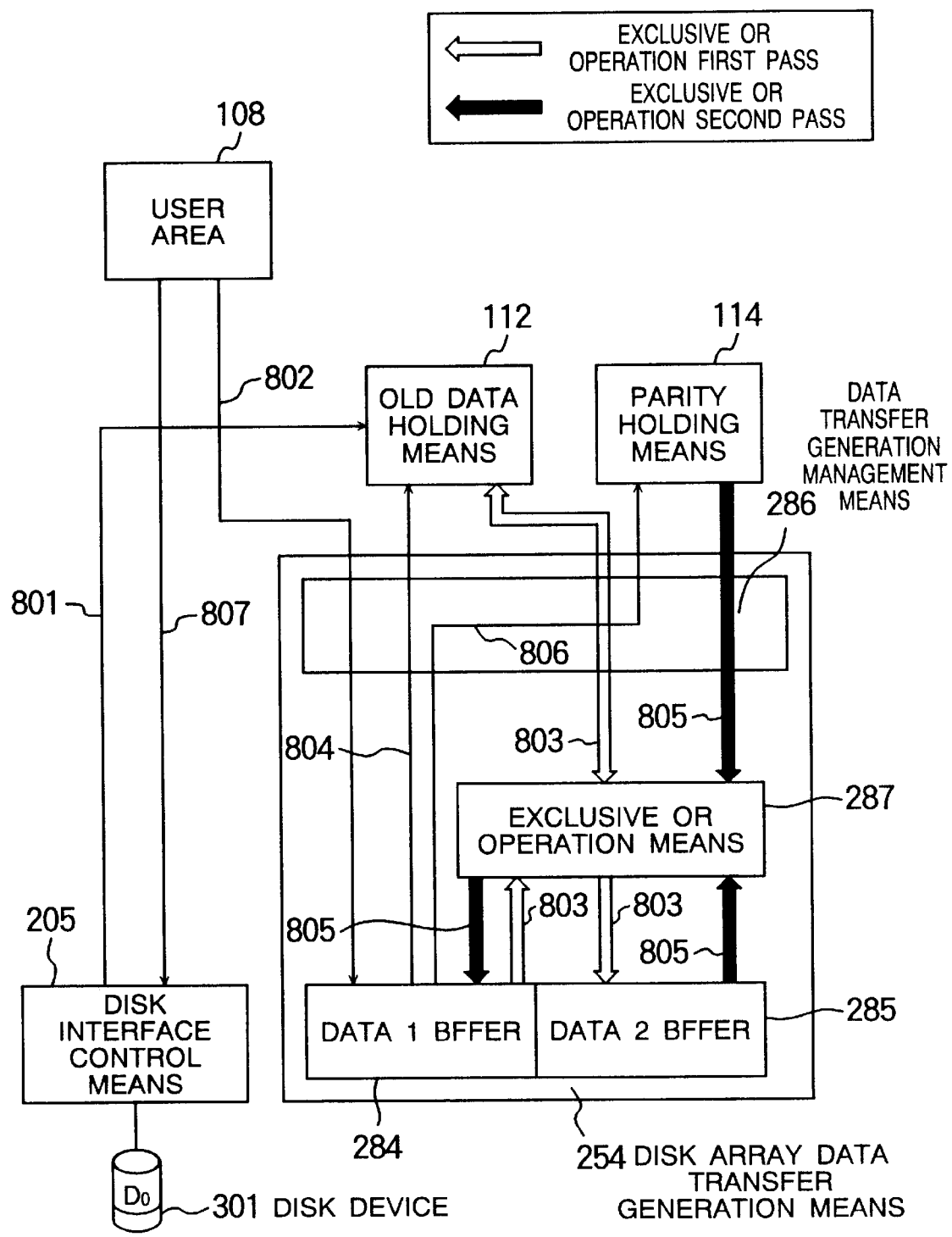
FIG. 14 shows an operation of a data write process in the third embodiment.

Referring to FIGS. 10, 11 and 14, the data write process operation is explained for the data write process (W3). In the description of the operation, (801) to (807) correspond to the reference numerals in FIG. 14. It is assumed that the new data is written at D0 of the disk device 301 of FIG. 10. When the disk array write request is issued from the application on the host system 1, the host CPU 101 conducts the following processes by using the programs in the disk array control program area 109.

First, the request reception unit 120 of FIG. 11 receives the write request. The request management unit 121 passes the write request to the address translation unit 122 which calculates the data disk address in which the new data is to be written and the parity disk address corresponding to the new data.

The old data search unit 123 determines whether the calculated data disk address is stored in the old data address holding unit 110 of the main memory 104 to determine whether the old data is stored in the old data holding means 112 in the main memory 104 to classify the type of the data write process.

In the data write process (W3), since the data disk address is not stored in the old data address holding unit 110, the memory of a size necessary to hold the new data is secured in the old data holding means 112, and the memory address and the data disk address are combined into one structure of array and it is held in the old data address holding unit 10.

The parity search unit 124 determines whether the calculated parity disk address is stored in the parity address holding unit 111 of the main memory 104 or not to determine whether the old updated data or the old parity is stored in the parity holding means 114 in the main memory 104 or not to classify the type of the data write process.

If the parity disk address is not stored in the parity address holding unit 111, whether it is the old updated data or the old parity is determined based on the flag added to the parity disk address. In the data write process (W3), the memory address of the parity holding means 114 in which the old updated data is stored is calculated.

Then, the array control auxiliary means control command generation unit 125 generates the following commands in the data write process (W3) which are collectively referred to as the array control auxiliary means control command.

The read command of the data disk in which the data disk address of the old data and the memory address of the old data holding means 112 to which the old data is to be transferred are stored is generated.

As the disk array data transfer generation means control command, the command of the data write process mode to generate the new parity from the new data in the user area 108, the old data in the old data holding mean 112 and the old updated data in the parity holding means 114, transfer the new data to the old data holding means 112 and transfer the generated new updated data to the parity holding means 114 is generated. The write command of the data disk in which the memory address of the user area in which the new data is stored and the data disk address in which the new data is to be written are stored is also generated.

The disk array transfer generation means control commands of the data write process mode are shown below.

In the data write process (W3), the command comprises the transfer length, the memory address of the user area 108 of the transfer source 1, the memory address of the old data holding means 112 of the transfer source 2, the memory address of the parity holding means 114 of the transfer source 3, the memory address of the old data holding means 112 of the transfer destination 1, the memory address of the parity holding means 114 of the transfer destination 2, the mode selection command for designating the operation mode, the input/output mode selection command for designating the input/output mode of the data input/output means 283, the initialization command of the data 1 buffer 284 and the data 2 buffer 285, and the start of transfer command.

The array control auxiliary means control command generation unit 125 generates the above commands which are collectively referred to as the array control auxiliary means control command and it is passes to the request management unit 121.

First, the disk interface control means control unit 131 issues the read command of the old data, of the array control auxiliary means control commands to the disk interface control means 205. Then, the disk interface control means 205 issues the received read command to the disk device 301 in which the old data is stored. The disk device 301 receives the read command and transfers the old data to the disk interface control means 205. The disk interface control means 205 DMA-transfers the old data to the old data holding means 112 (801) and issues the interrupt signal to the host CPU 101.

The disk array data transfer generation means control unit 133 issues the disk array data transfer generation means control command, of the array control auxiliary means control commands to the disk array data transfer generation means 254. The disk array data transfer generation means 254 receives the command, generates the new updated data from the new data of the user area 108, the old data of the old data holding means 112 and the old updated data of the parity holding means 114, transfers the new data to the old data holding means 112 and transfers the generated new updated data to the parity holding means 114 to conduct the transfer in the data write process mode.

In this case, the transfer source 1 is the memory address of the user area 108, the transfer source 2 is the memory address of the old data holding means 112, the transfer source 3 is the memory address of the parity holding means 114, the transfer destination 1 is the memory address of the old data holding means 112, and the transfer destination 2 is the memory address of the parity holding means 114. The hist CPU 101 sets those addresses in the data transfer generation management means 286 of the disk array data transfer generation means 254 by using the disk array data transfer generation means control command, sets the data write process mode in the mode selection register 294 by the mode selection command, sets the input/output mode in the input/output mode register 296, sets the buffer initialization command in the data buffer initializing register 297 and issues the execution command to the command register 295 to conduct the DMA transfer. The disk array data transfer generation means 254 issues the interrupt signal to the host CPU 101.

Referring to FIG. 12, an operation of the data write process mode of the disk array data transfer generation means 254 is explained. By the disk array data transfer generation means control command, the transfer length of m bytes is set in the transfer length register 288, the memory address x of the new data stored in the user area 108 is set in the transfer source 1 address register 289, the memory address y of the old data stored in the old data holding means 112 is set in the transfer source 2 address register 290, the memory address z of the old updated data stored in the parity holding means 114 is set in the transfer source 3 address register 291, the memory address i of the old data holding means 112 in which the new data is to be transferred is set in the transfer destination 1 address register 292, and the memory address j of the parity holding means 114 in which the new updated data is to be transferred is set in the transfer destination 2 address register 293.

First, when the data process (W3) mode is set in the input/output mode register 296 by the disk array data transfer generation means control command, the data input/output means is changed to the input mode and the input/output mode is switched thereafter in accordance with the process. When the data buffer initializing register 297 is set, the data stored in the data 1 buffer 284 and the data 2 buffer 285 bare initialized to 0 and the exclusive OR operation means 287 is ready to receive the data.

Assuming that the capacities of the data 1 buffer 284 and the data 2 buffer 285 are n bytes, respectively, the transfer unit is n bytes. First, n bytes of the new data are transferred from the address x to the data 1 buffer 284 through the data input/output means 283 (802). Then, n bytes of the old data are transferred from the address y to the exclusive OR operation means 287 through the data input/output means 283, the exclusive OR with the new data stored in the data 1 buffer 284 is calculated and the result is applied to the data 2 buffer 285 (803). Thus, the data 2 buffer now stores the exclusive OR of the new data and the old data. Then, n bytes of the new data stored in the data 1 buffer 284 are transferred to the address i through the data input/output means 283 (804).

Then, n bytes of the old updated data are transferred from the address z to the exclusive OR operation means 287 through the data input/output means 283, the exclusive OR with the data stored in the data 2 buffer 285 is calculated and the result is applied to the data 1 buffer 284 (805). In this case, the data 1 buffer 284 now stores the new updated data which is the exclusive OR of the new data, the old data and the old updated data. Further, n bytes of the new updated data stored in the data 1 buffer 284 are transferred to the address j (806).

The operation for one transfer unit in the data write process mode has thus been described.

Before the transfer of the next transfer unit, n is subtracted from the transfer length register 288 and n is added to the respective address registers. Then, the n-byte transfer is conducted from the address (x+n), the address (y+n) and the address (z+n) and the n-byte transfer is conducted to the address (i+n) and the address (j+n). The above operation is repeated until the transfer length register 288 reaches 0 so that the DMA transfer in the data write process mode is conducted. When the DMA transfer is completed, the data transfer generation management means 286 issues the interrupt signal and the process is terminated.

Then, the disk interface control means control unit 131 issues the write command of the new data to the disk interface control means 205. The disk interface control means 205 issues the received write command to the disk device in which the new data is stored. The disk device 301 receives the write command and waits for data. The disk interface control means 205 DMA-transfers the new data from the user area 108 to the disk interface control means 205 (807) and issues the interrupt signal to the host CPU 101. In this case, the new data is written on the data disk.

Turning back to the description of the operation, when the request management unit 121 receives the interrupt signal from the disk interface control means 205 which as completed the writing of the new data, it shifts the process to the request termination unit 126 which terminates the overall data write process.

Differences between the data write (W3) and other data write processes are shown below.

In the data write process (W5), the old updated data of the data write process (W3) is replaced by the old parity and the newly generated data by the new parity. The old parity is transferred in (805) and the new parity is transferred in (806). The parity search unit 124 in the disk array control program area 109 causes the flag added to the parity disk address stored in the parity address holding unit 111 to indicate that the old parity which is different from that stored in the parity disk is included.

The data write process (W1) is a process to generate the new updated data in the data write process (W3) without using the old updated data, and the operation relating to the parity generation is different from that of the data write process (W3). It also conducts the process to record the parity disk address of the parity which is not matched with the data.

In the process in the disk array control program area 109, the parity search unit 124 determines whether the calculated parity address is stored in the parity holding means 111 of the main memory 104 or not to determine whether the old updated data or the old parity is stored in the parity holding means 114 in the main memory 104 or not. In the data write process (W1), since the parity disk address is not stored in the parity address holding unit 111, the memory of a size necessary to hold the new updated data is secured in the parity holding means 114, and the memory address, the parity disk address and flag indicating that it is the new updated data that is stored in the parity holding means 114 after the data write process are combined into one structure and it is stored in the parity address holding unit 111. Further, the parity disk address is stored in the unrecorded parity address holding means 250. By the disk array data transfer generation means control command of the data write mode, the data process (W1) mode is set in the input/output register 296. The transfer of (805) is not conducted and the new updated data stored in the data 2 buffer 285 is transferred to the parity holding means 114 instead of the transfer of (806).

In the data write processes (W2), (W4) and (W6), the processes relating to the old data reading in the data write processes (W1), (W3) and (W5), respectively, are not conducted. In the process in the disk array control program area 109, the old data search unit 123 determines whether the calculated data disk address is stored in the old data address holding unit 1120 of the main memory 104 or not to determine whether the old data is stored in the old data holding means 112 in the main memory 104 or not. In the data write processes (W2), (W4) and (W6), since the data disk address is stored in the old data address holding unit 110, the memory address of the old data holding means 112 in which the old data is stored is calculated. Further, the memory of a size necessary to store the new data is secured in the old data holding means 112 and the memory address is calculated.

In the data write process of the Embodiment 3, a particular disk device and a particular logical block which require the change of the parity by the parity disk address written in the unrecorded parity address holding means 250 are recorded. Further, the new data stored in the old data holding means 112 is the old data in the next data write process so that the speeds of the generation process of the new updated data by the disk array data transfer generation means 254 and the generation process of the new parity are increased. Further, in the read-modify-write process, since the data read in the read process is stored in the old data holding means 112, it is not necessary to newly read the old data in the data write process of the updated data and the process to the disk device is reduced by one time.

[Delayed Parity Process]

Figure 15:
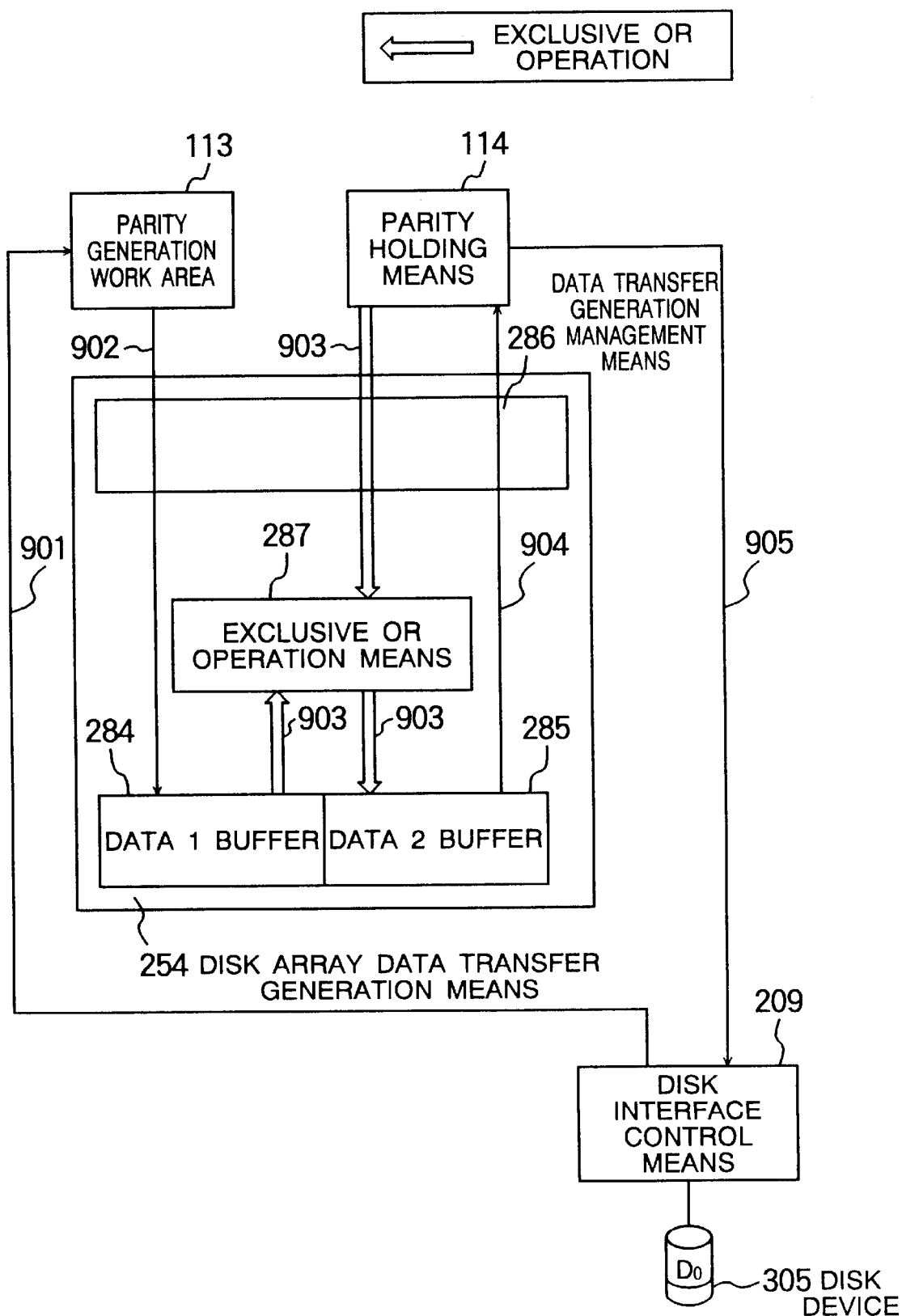
FIG. 15 shows an operation of a delayed parity process in the third embodiment.

Referring to FIGS. 10, 11 and 15, the delayed parity process is explained. In the description of the operation, (901) to (905) correspond to the reference numerals in FIG. 15. It is assumed that the new parity is written at P of the disk device 305 of FIG. 10.

The host CPU 101 conducts the following processes by using the programs in the disk array control program area 109. First, when the delayed parity process determination unit 127 of FIG. 11 determines that the delayed parity process is to be conducted, it passes the process to the request management unit 121. As the timing to start the delayed parity process, the time when the access frequency to the drive is low or the time when the parity holding means 114 is filled wit the old updated data may be considered.

The request management unit 121 passes the process to the parity search unit 124 which determines whether the parity disk address is stored in the parity address holding unit 111 of the main memory 104 or not, and if it is stored, it checks the added flag.

When nothing is stored in the parity address holding unit 111 or only the parity disk address which is identical to the parity stored in the parity disk is stored, it passes the process to the request management unit 121 and the request termination unit 126 terminates the delayed parity process.

If the parity disk address of the old updated data or the parity disk address of the old parity which is different from that written on the parity disk is stored in the parity address holding unit 111, the corresponding memory address of the parity holding means 114 is calculated and the flag is updated to indicate that it is the old parity identical to that written on the parity disk that is stored in the parity holding means 114 after the delayed parity process.

Then, the array control auxiliary means control command generation means 125 generates the following commands which are collectively referred to as the array control auxiliary means control command.

In the delayed parity process (P1), the read command of the parity disk in which the parity disk address of the old parity and the memory address of the parity generation work area 113 to which the read old parity is transferred are stored is generated. As the disk array data transfer generation means control command, the command of the delayed parity process mode to generate the new parity from the old parity of the parity generation work area 113 and the old updated data of the parity holding means 114 and transfer the generated new parity to the parity holding means 114 is generated. The write command of the parity disk in which the memory address of the parity holding means 114 in which the new parity is stored and the parity disk address in which the new parity is to be written are stored is also generated.

The disk array data transfer generation control command in the delayed parity process mode comprises the transfer length, the memory address of the parity generation work area 113 which is the transfer source 1, the memory address of the parity holding means 114 which is the transfer source 2, the memory address of the parity holding means 114 which is the transfer destination 1, the mode selection command, the initialization command for the data 1 buffer 284 and the data 2 buffer 285, and the start of transfer command.

In the delayed parity process (P2), the write command of the parity disk in which the memory address of the parity holding means 114 in which the new parity is stored and the parity disk address in which the new parity is to be written are stored is generated.

The array control auxiliary means control command generation unit 125 generates the above commands which are collectively referred to as the array control auxiliary means control command and it passes the process to the request management unit 121.

The delayed parity process (P2) is first described. The disk interface control means control unit 131 issues the write command of the new parity to the disk interface control means 209. The disk interface control means 209 issues the received write command to the disk device 305 in which the new parity is stored. The disk device 305 receives the write command and waits for data. The disk interface control means 209 DMA-transfers the new parity from the parity holding means 114 to the disk interface control means 209 (905) and issues the interrupt signal to the host CPU 101. In this case, the new parity is written on the parity disk.

When the request management unit 121 receives the interrupt signal from the interface control means 209 which has completed the writing of the new parity, it erases the parity disk address at which the delayed parity process was conducted, in the unrecorded parity address holding means 250, and then it shifts the process to the request termination unit 126 which terminates the overall delayed parity process.

The delayed parity process (P1) is now explained. The disk interface control means 131 issues the old parity read command, of the array control auxiliary means control commands to the disk interface control means 209. The disk interface control means 209 issues the received read command to the disk device 305 in which the old data is stored. The disk device 305 receives the read command and transfers the old parity to the disk interface control means 209. The disk interface control means 209 DMA-transfers the old parity to the parity generation work area 113 (901) and issues the interrupt signal to the host CPU 101.

The disk array data transfer generation means control unit 133 issues the disk array data transfer generation means control commands, of the array control auxiliary control commands to the disk array data transfer generation means 254. The disk array data transfer generation means 254 receives the command, generates the new parity from the old parity in the parity generation work area 113 and the old updated data of the parity holding means 114 and conducts the transfer in the delayed parity process mode to transfer the generated new parity to the parity holding means 114.

In this case, the transfer source 1 is the memory address of the parity generation work area 113, the transfer source 2 is the memory address of the parity holding means 114 and the transfer destination 1 is the memory address of the parity holding means 114. The host CPU 101 sets those addresses in the data transfer generation management means 286 of the disk array data transfer generation means 254 by using the disk array data transfer generation means control command, sets the delayed parity process mode in the mode selection register 294, and issues the execution command to the command register 295 to conduct the DMA transfer. The disk array data transfer generation means 254 issues the interrupt signal to the host CPU 101.

The operation of the disk array data transfer generation means 254 in the delayed parity mode is explained below. By the disk array data transfer generation means control command, the transfer length of m bytes is stored in the transfer length register 288, the memory address x of the old parity stored in the parity work area 113 is stored in the transfer source 1 address register 289, the memory address y of the old updated data stored in the parity holding means 114 is stored in the transfer source 2 address register 290, and the memory address i of the parity holding means 114 to which the new parity is transferred is stored in the transfer destination 1 address register 292.

When the data buffer initialization register 297 is set by the disk array data transfer generation means control command, the data stored in the data 1 buffer 284 and the data 2 buffer 285 are initialized yo zero and the exclusive OR operation means 287 is ready to receive the data. In the delayed parity process mode, the input/output mode is switched in accordance with the delayed parity process (P1).

Assuming that the capacities of the data 1 buffer 284 and the data 2 buffer 285 are n bytes, respectively, the transfer unit is n bytes. First, n bytes of the old parity are transferred from the address x to the data 1 buffer 284 through the data input/output means 283 (902). Then, n bytes of the old updated data are transferred from the address y to the exclusive OR operation means 287 through the data input/output means 283, the exclusive OR with the new data stored in the data 1 buffer 284 is calculated and the result is applied to the data 2 buffer 285 (903). The data 2 buffer 285 now stores the new parity. Then, n bytes of the new parity stored in the data 2 buffer 285 are transferred to the address i through the data input/output means 283 (904).

The operation of one transfer unit in the delayed parity process mode has thus been described.

Before the transfer of the next transfer unit, n is subtracted from the transfer length register 288 and n is added to the respective address registers. Then, n bytes are transferred from the address (x+n) to the address (y+n) and the n-byte transfer to the address (i+n) is conducted. The above operation is repeated until the transfer length register 288 reaches 0 so that the DMA transfer in the delayed parity mode is conducted. When the DMA transfer is completed, the data transfer generation management means 286 issues the interrupt signal and the process is terminated.

When the new parity is stored in the parity holding means 114, the process is similar to that of (P1).

In the Embodiment 3, the disk array data transfer generation means 254 simultaneously conducts the data transfer in the generation of the new updated data and the new parity and the exclusive OR operation so that the overhead created in the data transfer for generating the new updated data and the new parity is reduced. Further, since the temporary holding means is arranged in the main memory 104, the effective utilization of the memory is attained and the manufacturing cost is reduced.

A system configuration of an Embodiment 4 is identical to that shown in FIG. 10. A difference from the Embodiment 3 resides in a difference of the structure and the operation of the disk array data transfer generation means 254 and the disk interface control means 205~209.

In the structure of the disk array data transfer generation means 254 of the Embodiment 4, a transfer 2 address register for storing the address of the transfer destination of the data is added in the data transfer generation management means 286 of the Embodiment 3 shown in FIG. 12. In addition to the operation of the disk array transfer generation means 254 of the Embodiment 3, the disk array data transfer generation means 254 of the Embodiment 4 has a function to collectively DMA-transfer from the transfer destination 1 to the transfer destination 2 and the transfer destination 3 as the disk array data transfer means 202 of the Embodiment 1 does. Further, the transfer between the disk interface control means 205~209 and the main memory 104 is conducted by the disk array data transfer generation means 254.

The disk array read process and the classification of the type in the disk array write process in the disk array system of the Embodiment 4 are same as those in the Embodiment 3 but the operations are different. The changes from the Embodiment 3 are described below.

[Disk Array Read Process]

In the disk array read process (R1), the old data which is the intended data is read from the disk and it is DMA-transferred to the user area 108 and the temporary holding means. The disk array read process (R2) is same as that of the Embodiment 3.

[Disk Array Write Process]
[Data Write Process]

In all data write processes, the process to transfer the new data from the user area 108 to the data disk and the process to transfer the new data from the user area 108 to the temporary holding means are conducted by the collective DMA transfer of the new data from the user area 108 to the data disk and the temporary holding means.

[Delayed Parity Process]

The process to transfer the old parity to the temporary holding means and the process to transfer the new parity to the parity disk are conducted by the disk array data transfer generation means 254.

The Embodiment 4 attains the same effects as those of the Embodiment 3.

Figure 16A:
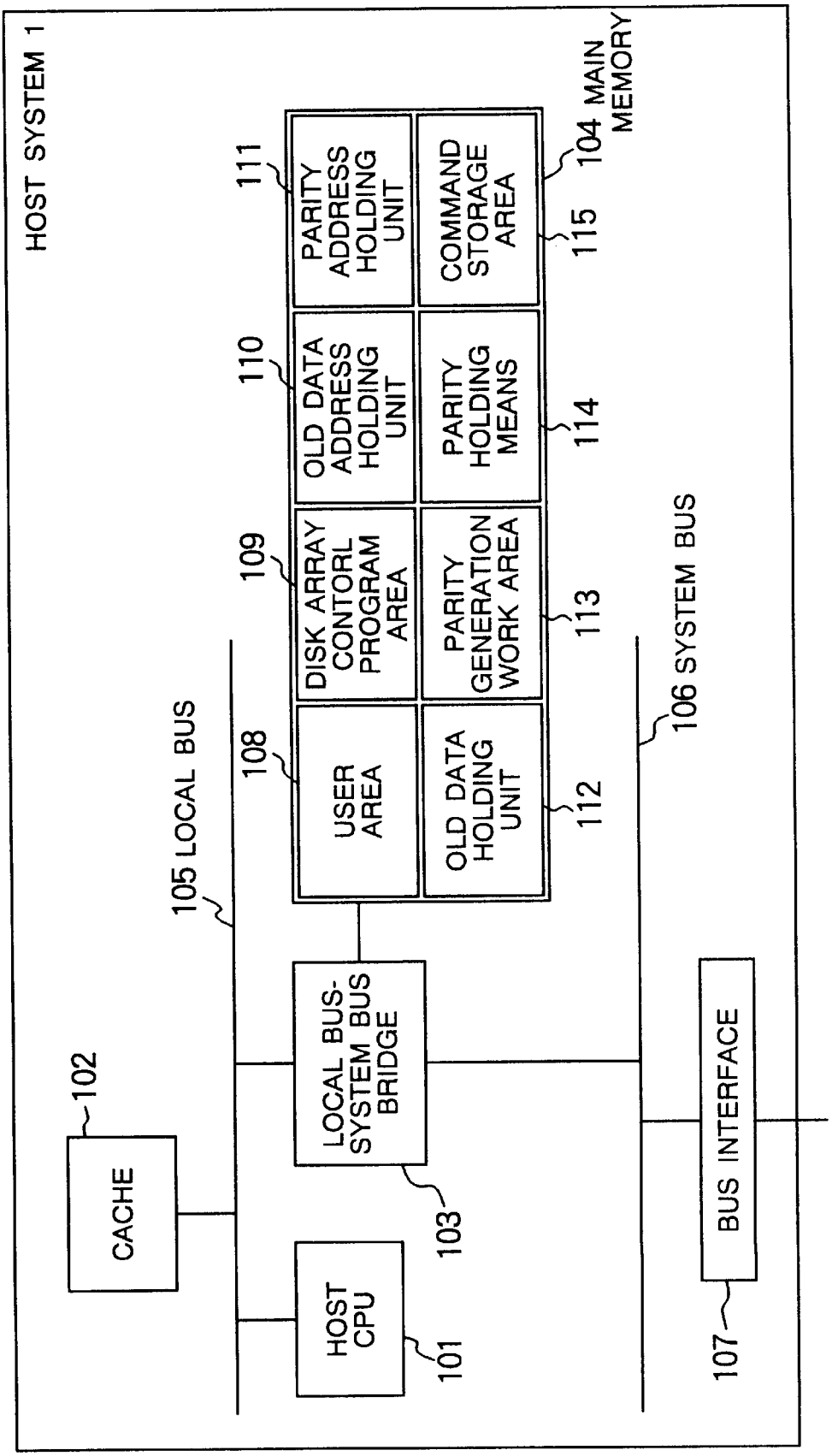
FIGS. 16A and 16B show block diagrams of a computer system in accordance with a fifth embodiment.
Figure 16B:
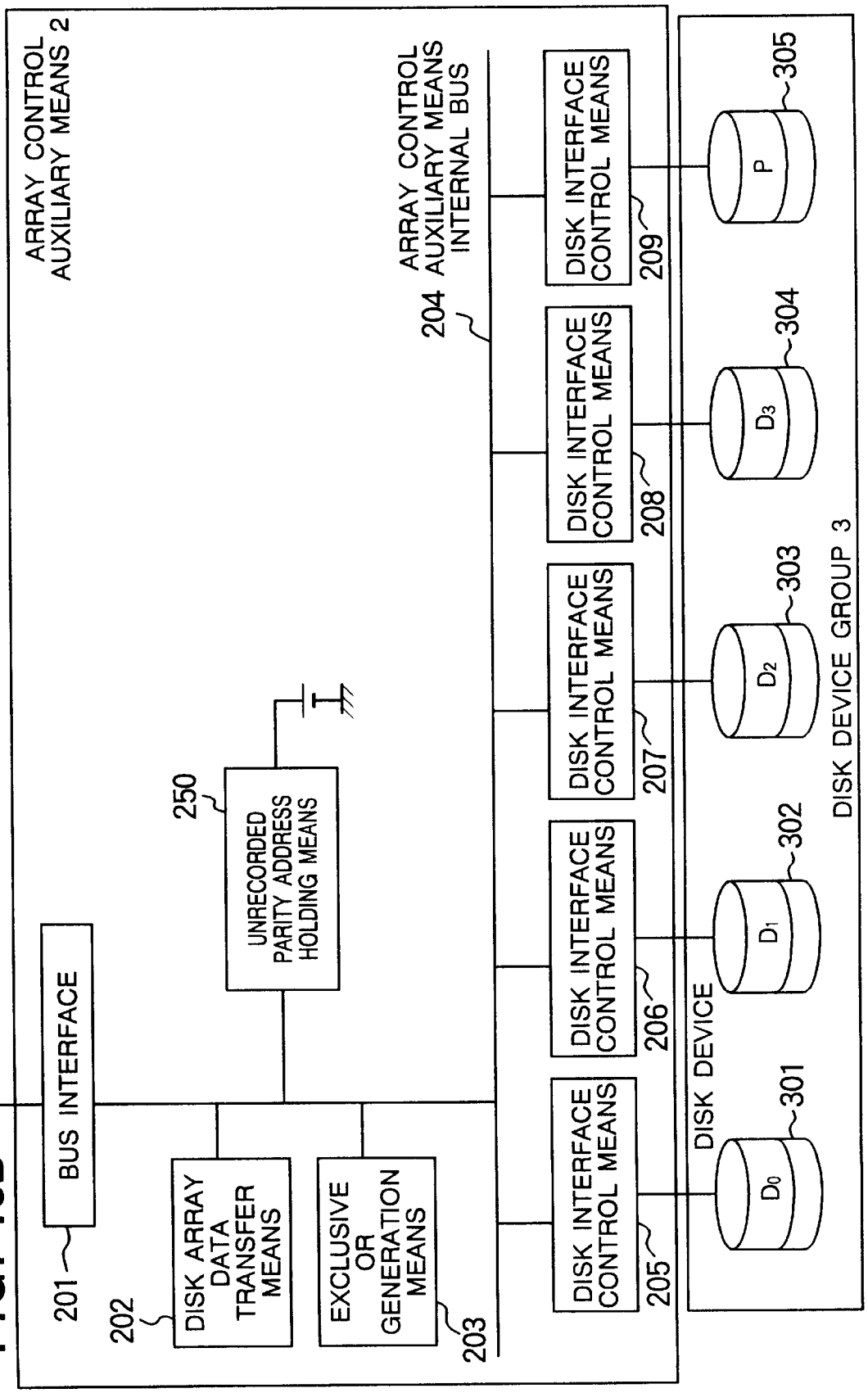

FIG. 16 shows a system configuration of a fifth embodiment.

In FIG. 16, the disk array transfer generation means 254 of the Embodiment 3 shown in FIG. 10 is replaced by the disk array data transfer means 202 of the Embodiment 1 shown in FIG. 1 and the exclusive OR generation means 203 shown in FIG. 5. By providing the disk array data transfer means 202 of the array control auxiliary means 2 and the exclusive OR generation means 203 in one chip, the effect described in conjunction with the Embodiment 3 may be attained, and by mounting it on one board, the expandability of the system may be enhanced as discussed in the Embodiment 1.

Figure 17:
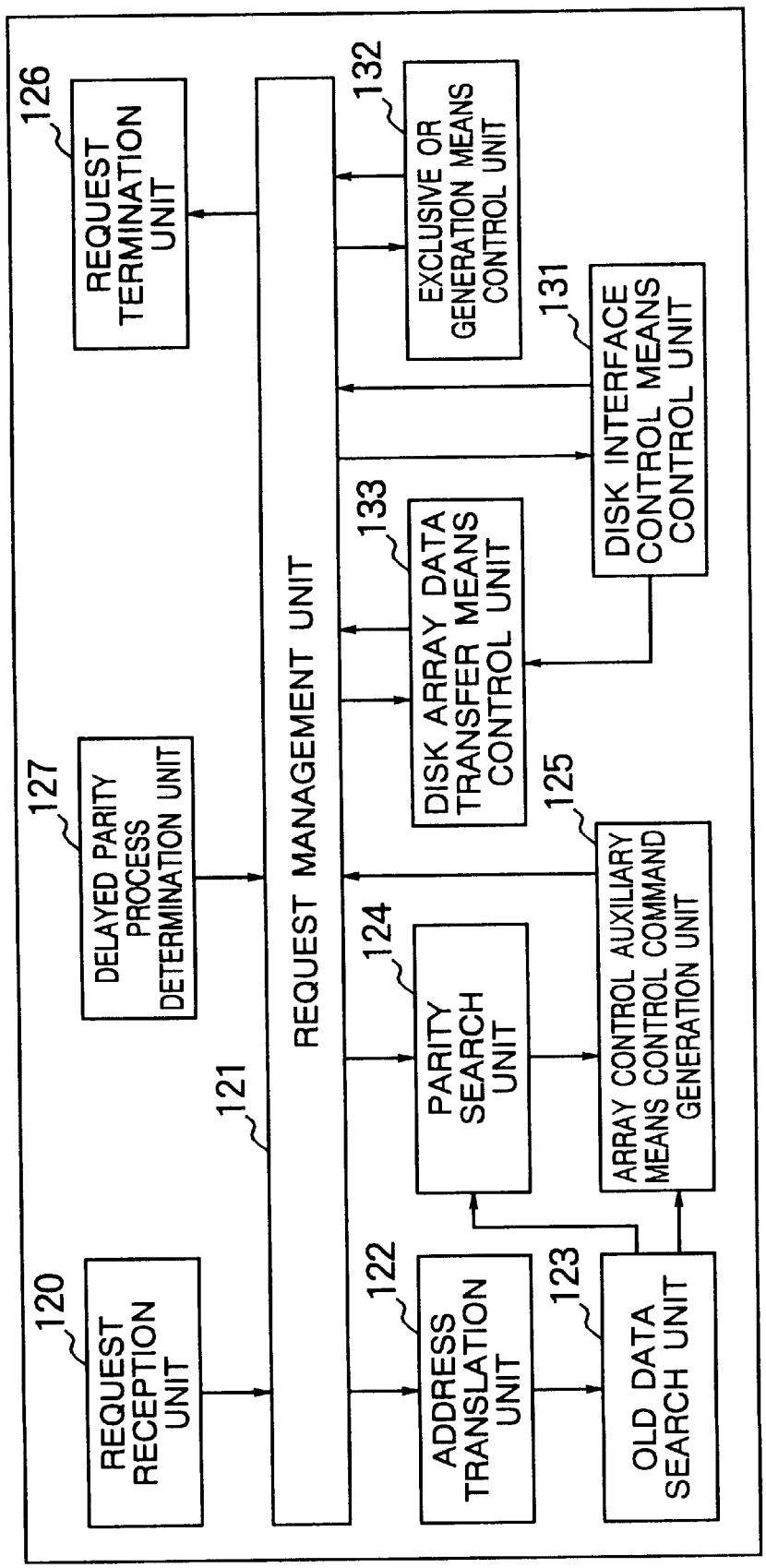
FIG. 17 shows a block diagram of a disk array control program area in the fifth embodiment.

As shown in FIG. 17, the disk array control program area 109 of the main memory 104 comprises the request reception unit 120, the request management unit 121, the address translation unit 122, the old data search unit 123, the parity search unit 124, the array control auxiliary means control command generation unit 125, the disk array data transfer means control unit 130, the disk interface control means control unit 131, the exclusive OR generation means control unit 132, the request termination unit 126, and the delayed parity process determination unit 127.

The structures of the old data holding means 112, the old data address holding unit 110, the parity holding means 114, the parity address holding unit 111 and the unrecorded parity address holding means 250 of FIG. 16 are identical to those of the old data holding means 216, the old data address holding means 110, the parity holding means 218, the parity address holding unit 111 and the unrecorded parity address holding means 250 of the Embodiment 1 shown in FIG. 1, respectively. The operations of the disk array data transfer means 202 and the exclusive OR generation means 203 are identical to those of the Embodiment 1 and the disk array data transfer means 202 may conduct the collective DMA transfer.

Unlike the Embodiment 1, in the disk array read/write process of the Embodiment 5, the array control auxiliary means 2 is controlled not by the MPU 210 in FIG. 1 but by the host CPU 101, and the temporary holding means is arranged in the main memory 104 of the host system 1.

A difference between the disk array read/write process operations of the Embodiment 5 and the Embodiment 1 is shown below.

In the Embodiment 1 and the Embodiment 5, the types of classification by the content of the temporary holding means are identical.

First, in the Embodiment 1, the control command generated by the array control auxiliary means control command generation unit 125 in the disk array control program area 109 shown in FIG. 2 is passed to the MPU control unit 128, and the MPU control unit 128 issues the control command to the MPU 210.

When the MPU 210 receives the control command, it conducts the following processes by using the MPU control program area 214 shown in FIG. 3. The request reception unit 220 received the control command and passes it to the request management unit 221. The request management unit 221 shifts the process to the disk array data transfer means control unit 222, the disk interface control means control unit 223 and the exclusive OR generation control unit 224, and the disk array data transfer control means control unit 222 issues the control command to the disk array data transfer means 202, the disk interface control means control unit 223 issues the control command to the disk interface control means 205~209 and the exclusive OR generation means control unit 224 issues the control command to the exclusive OR generation means 203. The request management unit 221 receives the interrupt signals from the disk array data transfer means 202, the disk interface control means 205~209 and the exclusive OR generation means 203, and when all processes are completed, the process is passed to the request termination unit 225 which issues the interrupt signal to the host CPU 101.

When the CPU 101 receives the interrupt signal, it shifts the process to the request termination unit 126 by using the request management unit 121 in the disk array control program area 109 shown in FIG. 2, and the request termination unit 126 terminates the overall process.

In the Embodiment 5, after the array control auxiliary means control command generation means 125 in the disk array control program area 109 shown in FIG. 17 generates the control command, the process is shifted to the request management unit 121. The request management unit 121 shifts the process to the disk array data transfer generation means control unit 130, the disk interface control means control unit 131 and the exclusive OR generation means control unit 132, and the disk array data transfer means control unit 130 issues the control command to the disk array data transfer means 202, the disk interface control means control unit 131 issues the control command to the disk interface control means 205 and the exclusive OR generation means control unit 132 issues the control command to the exclusive OR generation means 203. The request management unit 121 receives the interrupt signals from the disk array data transfer means and the disk interface control means 205~209, and when all processes are completed, the process is passes to the request termination unit 126 which terminates the overall process.

In the Embodiment 5, since the temporary holding means is arranged in the main memory 104, the efficient utilization of the memory is attained and the manufacturing cost is reduced as compared with the Embodiment 1.

A system configuration of an Embodiment 6 is identical to that shown in FIG. 16. Differences from the Embodiment 5 reside in the structure and the operation of the disk array data transfer means 202 and the structure and the operation of the disk interface control means 205~209. The structure and the operation of the disk array data transfer means 202 of the Embodiment 6 are identical to those of the disk array data transfer means 202 of the Embodiment 2 shown in FIG. 9 and the transfer destination in one DMA transfer is only one location. The structure and the operation of the disk interface control means 205~209 are identical to those of the Embodiment 2 and the DMA transfer between the disk interface control means 205~209 and the main memory 104 is conducted.

Unlike the Embodiment 2, in the disk array read/write process of the Embodiment 6, the array control auxiliary means 2 is controlled not by the MPU 210 but by the host CPU 101, and only the main memory 104 of the host system is used as the memory.

A difference between the operations of the disk array read/write processes of the Embodiment 6 and the Embodiment 2 is similar to the difference between the Embodiment 5 and the Embodiment 1 discussed in conjunction with the Embodiment 5. The type classified by the content of the temporary holding means is same for the Embodiment 2 and the Embodiment 6.

The Embodiment 6 may attains the same effects as those of the Embodiment 5.

Figure 18A:
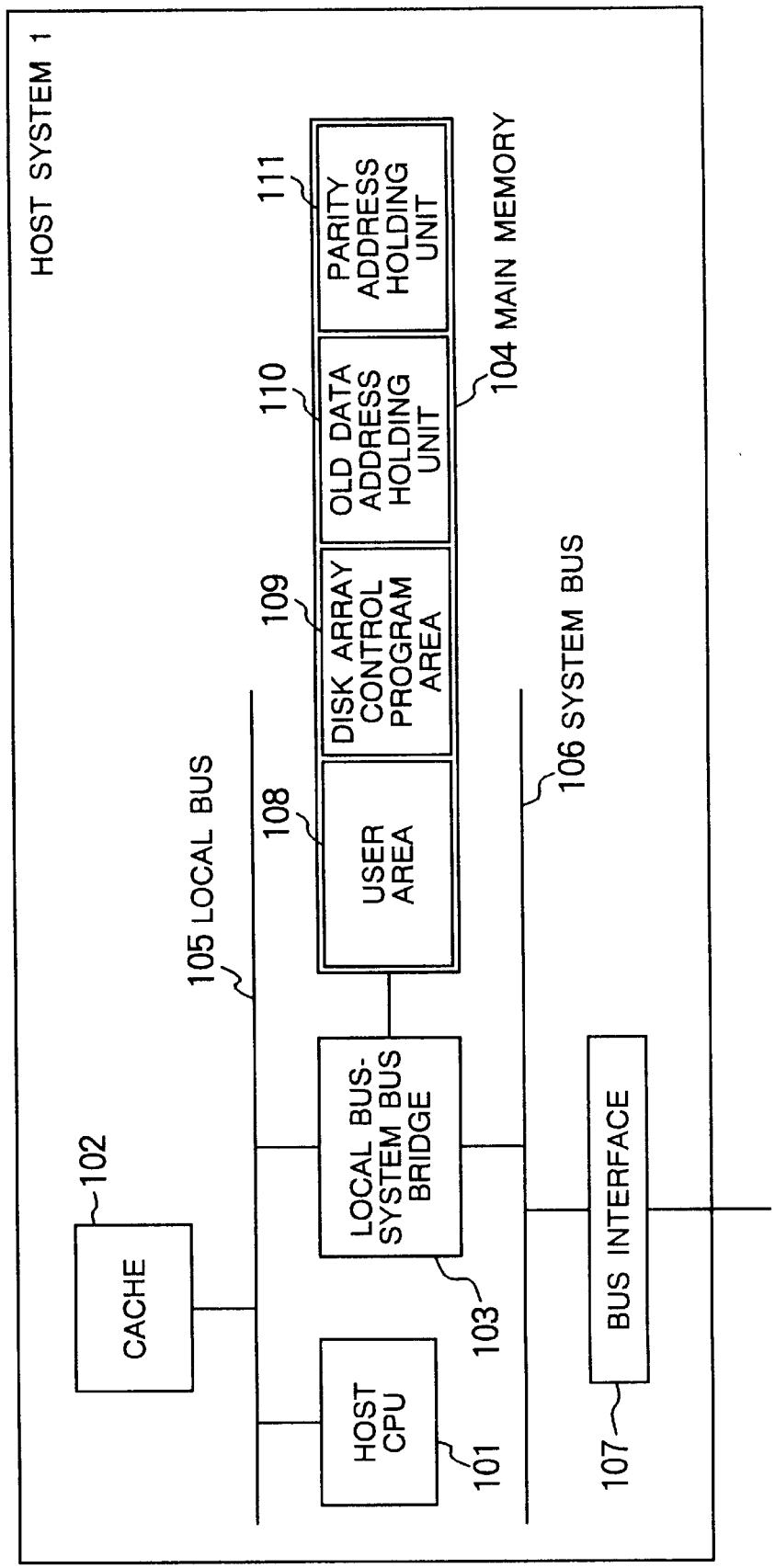
FIGS. 18A and 18B show block diagrams of a computer system in accordance with a seventh embodiment.
Figure 18B:
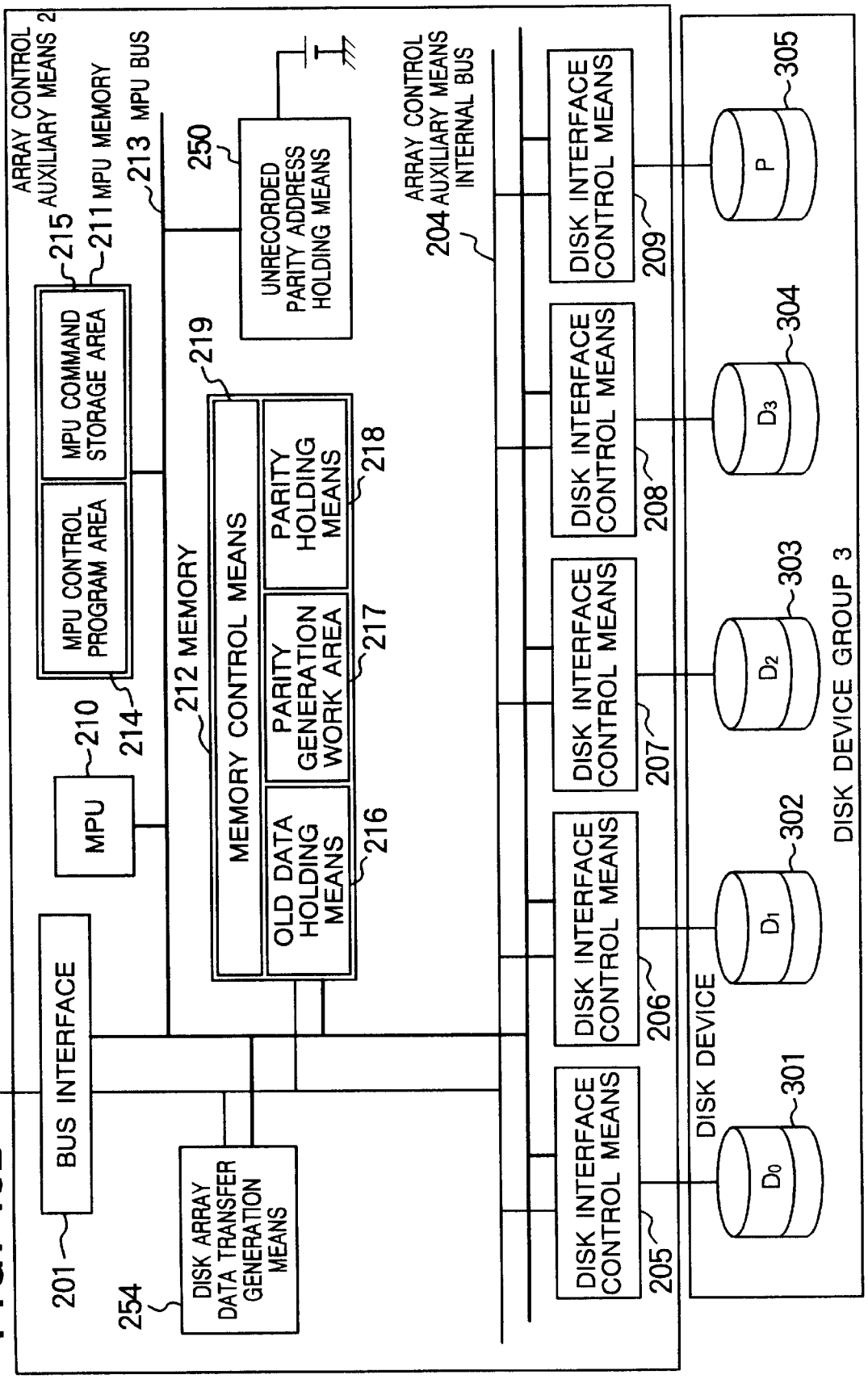

FIG. 18 shows a system configuration of a seventh embodiment.

Figure 19:
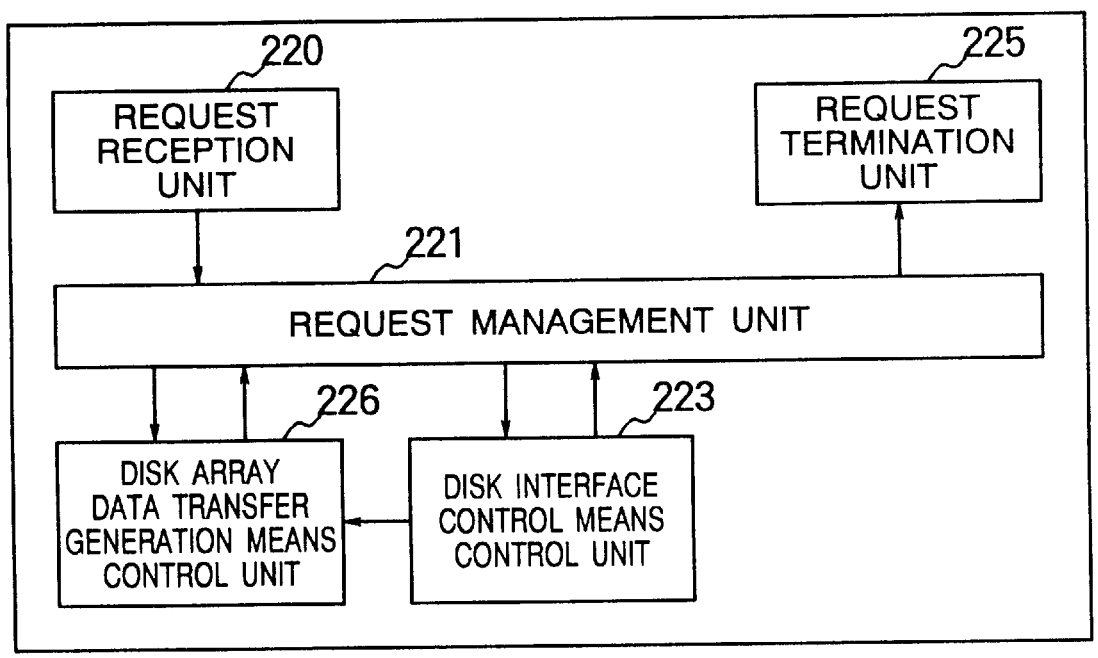
FIG. 19 shows a block diagram of an MPU control program area in the seventh embodiment.

In FIG. 18, the disk array transfer means 202 and the exclusive OR generation means 203 of the Embodiment 1 shown in FIG. 1 are replaced by the disk array data transfer generation means 254 of the Embodiment 3 shown in FIG. 12. By providing the disk array data transfer generation means 254 of the array control auxiliary means 2 in one chip, the effect described in the Embodiment 3 may be attained, and by mounting the disk array data transfer generation means 254 and the memory 212 on one board, the expandability of the system may be enhanced as discussed in the Embodiment 1. As shown in FIG. 19, the MPU control program 214 of the MPU memory 211 comprises the request reception unit 220, the request management unit 221, the disk array data transfer generation means control unit 226, the disk interface control means control unit 223 and the request termination unit 225. The structure of the disk array control program area 109 shown in FIG. 18 is same as that of the Embodiment 1 shown in FIG. 2.

The operation of the disk array data transfer generation means 254 is same as that of the Embodiment 3, and the disk array data transfer generation means 254 may conduct the DMA transfer and the parity generation.

Unlike the Embodiment 3, in the disk array read/write process of the Embodiment 7, the array control auxiliary means 2 is controlled not by the host CPU 101 but by the MPU 210, and the temporary holding means is arranged in the memory 212 in the array control auxiliary means 2.

A difference between the operations of the disk array read/write process in the Embodiment 7 and the Embodiment 3 is shown below.

The types classified by the content of the temporary holding means are same for the Embodiment 3 and the Embodiment 7.

In the Embodiment 3, after the array control auxiliary means control command generation means 125 in the disk array control program area 109 shown in FIG. 11 generates the control command, the process is shifted to the request management unit 121. The request management unit 121 shifts the process to the disk array data transfer generation means control unit 133 and the disk interface control means control unit 131, and the disk array data transfer generation means control unit 133 issues the control command to the disk array data transfer generation means 254 and the disk interface control means control unit 131 issues the control command to the disk interface control means 205~209. The request management unit 121 receives the interrupt signals from the disk array data transfer generation means 254 and the disk interface control means 205~209, and when all processes are completed, it passes the process to the request termination unit 126 which terminates the overall process.

In the Embodiment 7, the control command generated by the array control auxiliary means control command generation unit 125 in the disk array control program area 109 shown in FIG. 2 is passed to the MPU control unit 128 which issues the control command to the MPU 210. When the MPU 210 receives the control command, it conducts the following processes by using the MPU control program area 214 shown in FIG. 19. When the request reception unit 220 receives the control command, it passes the process to the request termination unit 221. The request management unit 221 shifts the process to the disk array data transfer generation means control unit 226 and the disk interface control means control unit 223, and the disk array data transfer generation means control unit 226 issues the control command to the disk array data transfer generation means 254 and the disk interface control means control unit 223 issues the control command to the disk interface control means 205~209. The request management unit 221 receives the interrupt signals from the disk array data transfer generation means 254 and the disk interface control means 205~209, and when all processes are completed, it passes the process to the request termination unit 225 which issues the interrupt signal to the host CPU 101.

When the host CPU 101 receives the interrupt signal, it shifts the process to the request termination unit 126 by using the request management unit 121 in the disk array control program area 109 shown in FIG. 2, and the request termination unit 126 terminates the overall process.

In the Embodiment 7, since the disk array data transfer generation means 254 simultaneously conducts the data transfer in the generation of the new updated data and the new parity and the exclusive OR operation, the overhead created in the transfer of the data for generating the new updated data and the new parity is reduced.

A system configuration of an eighth embodiment is identical to that shown in FIG. 18.

Differences from the Embodiment 7 reside in the structure and the operation of the disk array data transfer generation means 254 and the structure and the operation of the disk interface control means 205~209. The structure and the operation of the disk array data transfer generation means 254 of the Embodiment 8 are identical to those of the disk array data transfer generation means 254 of the Embodiment 4 and the collective DMA transfer and the parity generation are attained. The structure and the operation of the disk interface control means 205~209 are identical to those of the Embodiment 4 and the DMA transfer between the disk interface control means 205~209 and the main memory 104 are conducted.

Unlike the Embodiment 4, in the disk array read/write process of the Embodiment 8, the array control auxiliary means 2 is controlled not by the host CPU 101 but by the MPU 210, and the temporary holding means is arranged in the memory 212 in the array control auxiliary means 2.

A difference between the operations of the disk array read/write process in the Embodiment 8 and the Embodiment 4 is similar to that between the Embodiment 7 and the Embodiment 3 described in conjunction with the Embodiment 7. The types classified by the content of the temporary holding means are same for the Embodiment 4 and the Embodiment 8.

The Embodiment 8 attains the same effect as that of the Embodiment 7.

Figure 20A:
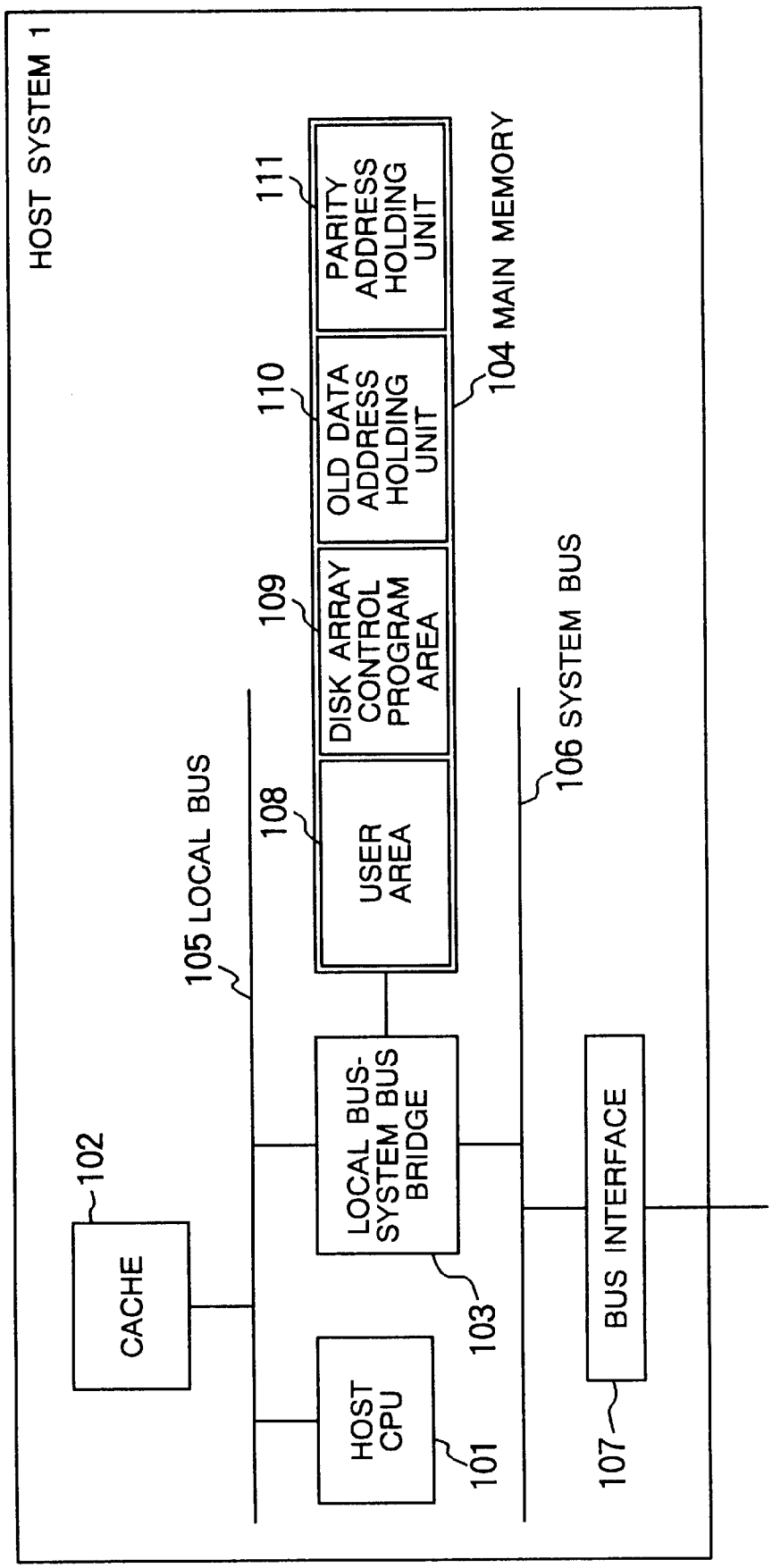

FIG. 20 shows a system configuration of an Embodiment 9.

Difference from the Embodiment 1 resides in the arrangement of a high speed readable/writable cache 251 in the memory 212 of the array control auxiliary means 2. The cache 251 comprises cache management means 252 for managing the address of the cache and a cache memory 253.

When the data transfer is to be made from a memory address in the memory 212 and that memory address is not stored in the cache management means 252 of the cache 251, the data is transferred not from the memory 212 but from the cache 251. Since the data read speed is higher in the cache 251 than in the memory 212, the data transfer rate may be increased.

For example, the read-modify-write mode is considered. The intended data read in the disk array read process is held in the cache memory 253 and the old data holding means 216 as the old data. When the old data is to be read in the subsequent data write process, the old data is read from the cache memory 253 so t hat the process speed is increased as compared with the case where it is read from the old data holding means 216.

When the old data is not stored in the old data holding means 216 in the data write process, the cache hits when the new data is DMA-transferred from the old data holding means 216 to the exclusive OR generation means 203 or when the old data is DMA-transferred from the parity generation work area 217 to the exclusive OR generation means 203. When the old data is stored in the old data holding means 216 in the data write process, the cache hits when the new data is DMA-transferred from the parity generation work area 217 to the exclusive OR generation means 203.

When the updated data is stored in the parity holding means 218 in the delayed parity process, the cache hits when the old parity is DMA-transferred from the parity generation work area 217 to the exclusive OR generation means 203 or when the new parity is DMA-transferred from the parity holding means 218 to the disk interface control means 209.

By arranging the cache 251 in the memory 212,the high speed reading of the data is attained and the process speed of the disk array read/write process is attained.

The arrangement of the high speed readable/writable cache 251 in the memory 212 of the array control auxiliary means 2 may be applied to the Embodiments 2, 7 and 8.

As described hereinabove, in accordance with the computer system of the present invention, the number of times of the disk access other than the writing of the new data is reduced so that the process speed of the disk array write process is increased.

Further, in accordance with the computer system of the present invention, the load of the CPU required for the control of the disk array process program is reduced.

Further, in accordance with the present invention, the expandability to add the simple sub-system to the existing host system is enhanced.

Further, in accordance with the computer system of the present invention, the data for generating the parity is stored in the main memory in the host system so that the memory for holding the data for generating the new parity and the control circuit for controlling the memory are eliminated and the structure is simplified and the cost is reduced.

Further, in accordance with the computer system of the present invention, the traffic of the bus to connect the system bus of the host system and the disk device control circuit for controlling the disk devices or the system bus or the main memory is reduced so that the process speed is increased.

Further, in accordance with the computer system of the present invention, the data necessary for the parity generation is held without impacting to the memory capacity of the main memory so that the traffic of the maim memory access of the host system is reduced and the process speed of the CPU is increased.

Further, in accordance with the computer system of the present invention, the data transfer function to the main memory of the host system which the disk control circuit for controlling the disk devices has is utilized to transfer the data for the parity generation on the main memory to the parity generation memory with the simple structure.

Further, in accordance with the computer system of the present invention, the data transfer function to the main memory of the host system which the disk control circuit for controlling the disk devices is utilized to transfer the data for the parity generation on the main memory to the area in which the data necessary for the parity generation on the main memory is stored, with the simple structure.

Further, in accordance with the computer system of the present invention, the data transfer rate for the parity generation is increased.

We claim:

1. A computer system having a host system including a plurality of disk devices, a processor, a main memory and a disk control circuit for controlling said disk devices, said processor managing said disk devices as one logical disk array system with parity in accordance with a program on said main memory and controlling a generation of new parity and a write process thereof to each disk device in a delayed fashion from and asynchronously with a process to write new data to each disk device, said host system comprising:

a parity generation memory for holding updated data, old parity and old data which are held when a first write operation is issued;

a parity generation circuit for generating new parity or the updated data from data held in said parity generation memory without accessing said plurality of disk drives, when a second write operation is issued after said first write operation and old data corresponding to said new data is in said parity generation memory, and new data held in said main memory and to be written in said disk control circuit; and a data transfer circuit for transferring data corresponding to the data stored in said disk array system to said parity generation memory in a read process from said disk array system, and for transferring data corresponding to the data to be written in said disk array system to said parity generation memory in a write process to said disk array system;

wherein said main memory of said host system comprises a disk control program arga which stores said program for management of said disk devices as said disk array system with parity and wherein maid disk army control program area of said memory comprises an address translation module for conducting an address translation inherent to said disk array system and determining a data disk address and parity disk address, a parity search module for determining whether old updated data or new parity is present in said parity generation circuit, and an array control command generation module for generating a read command, a disk array data transfer control command and an exclusive-OR generation control command.

2. A computer system having a host system including a plurality of disk devices, a processor, a main memory and a disk control circuit for controlling said disk devices, said processor managing said disk devices as one logical disk array system with parity in accordance with a program on said main memory and controlling a generation of new parity and a write process thereof to each disk device in a delayed fashion from and asynchronously with a process to write new data to each disk device, said host system comprising:

a parity generation memory for holding updated data, old parity and old data which are held when a first write operation is issued;

a parity generation circuit for generating new parity or the updated data from data held in said parity generation memory without accessing said plurality of disk drives, when a second write operation is issued after said first write operation and old data corresponding to said new data is in said parity generation memory, and new data held in said main memory and to be written in said disk control circuit; and a data transfer circuit for transferring data to be read, from said disk control circuit to said parity generation memory and said main memory in a read process from said disk array system, and for transferring the new data from said main memory to said parity generation memory and said disk control circuit in a write process to said disk array system;

wherein said main memory of said host system comprises a disk control program area which stores said program for management of said disk devices as said disk array system with parity, and wherein said disk array control program area of said memory comprises an address translation module for conducting an address translation inherent to said disk array system and determining a data disk address and parity disk address, a parity search module for determining whether old updated data or new parity is present in said parity generation circuit, and an array control command generation module for generating a read command, a disk array data transfer control command and an exclusive-OR generation control command.

3. A computer system according to claim 1 or claim 2, wherein said old data is data immediately prior to the writing of said new data, said updated data is data generated by an exclusive OR operation of said new data and the data of said disk array system on which said new data is to be overwritten, said old parity is parity immediately prior to the writing of said new parity, and said new parity is data generated by an exclusive OR operation of said new parity and said updated data.

4. A computer system according to claim 3, wherein said parity generation memory, said parity generation circuit and said data transfer circuit are mounted on a single board and connected to a system bus of said host system.

5. A computer system according to claim 3, wherein said updated data, said old parity and said old data are held in said main memory.

6. A computer system according to claim 3, wherein said data transfer circuit and said parity generation circuit are formed on a single chip, and said single chip is connected to a bus for connecting a system bus of said host system and said disk controller.

7. A computer system according to claim 3, wherein said data transfer circuit and said parity generation circuit are formed on a single chip, and said single chip is connected to a system bus of said host system.

8. A computer system according to claim 3, wherein said updated data, said old parity and said old data are held in said main memory, and said data transfer circuit and said parity generation circuit are formed on a single chip, and said single chip is connected to a bus for connecting a system bus of said host system and said disk controller.

9. A computer system according to claim 3, wherein said updated data, said old parity and said old data are held in said main memory, and said data transfer circuit and said parity generation circuit are formed on a single chip, and said single chip is connected to a system bus of said host system.

10. A computer system having a host system including a plurality of disk devices, a processor, a main memory and a disk control circuit for controlling said disk devices, said processor managing said disk devices as one logical disk array system with parity in accordance with a program on said main memory and controlling a generation of new parity and a write process thereof to each disk device in a delayed fashion from and asynchronously with a process to write new data to each disk device, said host system comprising:

a parity generation memory for holding updated data, old parity and old data which are held when a first write operation is issued, a parity generation circuit for generating new parity or the updated data from data held in said parity generation memory without accessing said plurality of disk drives, when a second write operation is issued after said first write operation and old data corresponding to said new data is in said parity generation memory, and new data held on said main memory and to be written in said disk control circuit;

a data transfer circuit for transferring the data to be read, transferred to said main memory to said parity generation memory in a read process from said disk array system, and for transferring said new data from said main memory to said parity generation memory in a write process to said disk array system;

said disk control circuit for controlling the transferring of data to be read to said main memory in a read process from said disk array system, and for controlling the transferring of said new data from said main memory to said disk control circuit in a write process to said disk array system; and wherein said main memory of said host system comprises a disk control program area which stores said program for management of said disk devices as said disk array system with parity, and wherein said disk array control program area of said memory comprises an address translation module e far conducting an address translation inherent to said disk array system and determining a data disk address and parity disk address, a parity search module for determining whether old updated data or new parity is present in said parity generation circuit, and an array control command generation module for generating a read command, a disk array data transfer control command and an exclusive-OR generation control command.

11. A computer system according to claim 10, wherein said old data is data immediately prior to the writing of said new data, said updated data is data generated by an exclusive OR operation of said new data and said old data and said old parity is parity immediately prior to the writing of said new parity.

12. A computer system according to claim 10 or claim 11, wherein said parity generation memory, said parity generation circuit and said data transfer circuit are mounted on a single board and connected to a system bus of said host system.

13. A computer system according to claim 10 or claim 11, wherein said updated data, said old parity and said old data are held in said main memory.

14. A computer system according to claim 10 or claim 11, wherein said data transfer circuit and said parity generation circuit are formed on a single chip, and said single chip is connected to a bus for connecting a system bus of said host system and said disk controller.

15. A computer system according to claim 10 or claim 11, wherein said data transfer circuit and said parity generation circuit are formed on a single chip, and said singe chip is connected to a system bus of said host system.

16. A computer system according to claim 10 or claim 11, wherein said updated data, said old parity and said old data are held in said main memory, and said data transfer circuit and said parity generation circuit are formed on a single chip, and said single chip is connected to a bus for connecting a system bus of said host system and said disk controller.

17. A computer system according to claim 10 or claim 11, wherein said updated data, said old parity and said old data are held in said main memory, and said data transfer circuit and said parity generation circuit are formed on a single chip, and said single chip is connected to a system bus of said host system.

18. A computer system according to claim 1, claim 2 or claim 10, wherein a cache memory is provided between said parity generation memory and said data transfer circuit.

19. A computer system according to claim 1, wherein said main memory of the host system further comprises a user area which stores a memory address, an old data address holding area which stores old data addresses, and a parity address holding area which stores parity addresses.

20. A computer system according to claim 19, wherein said disk array control program area of the main memory further comprises:

a request reception module which receives a request from an application;

an old data search module which determines whether old data is present in said parity generation memory;

a request termination module which notifies the termination of request to the application, and a delayed parity process determination module which determines whether a delayed parity process is to be conducted.

21. A computer system according to claim 1, wherein said parity generation circuit of the host system comprises:

a data input/output unit;

a data buffer;

an exclusive OR operation unit which conducts an exclusive OR operation of new data and the data of said disk array system on which said new data is to be overwritten; and a data management unit which manages the data input/out unit and initializes the data buffer.

22. A computer system according to claim 1, wherein said updated data is obtained from an exclusive OR operation of new data and old data, and said new parity is obtained from an exclusive OR operation of the newly updated data and the old parity.

23. A computer system according to claim 2, wherein said main memory of the host system further comprises a user area which stores a memory address, an old data address holding area which stores old data addresses, and a parity address holding area which stores parity addresses.

24. A computer system according to claim 23, wherein said disk array control program area of the host system further comprises:

a request reception module which receives a request from an application;

an old data search module which determines whether old data is present in said parity generation memory;

a request termination module which notifies the termination of request to the application; and a delayed parity process determination module which determines whether a delayed parity process is to be conducted.

25. A computer system according to claim 2, wherein said parity generation circuit of the host system comprises:

a data input/output unit;

a data buffer;

an exclusive OR operation unit which conducts an exclusive OR operation of new data and the data of said disk array system on which said new data is to be overwritten; and a data management unit which manages the data input/out unit and initializes the data buffer.

26. A computer system according to claim 2, wherein said updated data is obtained from an exclusive OR operation of new data and old data, and said new parity is obtained from an exclusive OR operation of the newly updated data and the old parity.

27. A computer system according to claim 10, wherein said main memory of the host system further comprises a user area which stores a memory address, an old data address holding area which stores old data addresses, and a parity address holding area which stores parity addresses.

28. A computer system according to claim 27, wherein said disk array control program area of the main memory further comprises:

a request reception module which receives a request from an application;

an old data search module which determines whether old data is present in said parity generation memory;

a request termination module which notifies the determination of request to the application; and a delayed parity process determination module which determines whether a delayed parity process is to be conducted.

29. A computer system according to claim 10, wherein said parity generation circuit of the host system comprises:

a data input/output unit;

a data buffer;

an exclusive OR operation unit which conducts an exclusive OR operation of new data and the data of said disk array system on which said new data is to be overwritten; and a data management unit which manages the data input/out unit and initializes the data buffer.

30. A computer system according to claim 10, wherein said updated data is obtained from an exclusive OR operation of new data and old data, and said new parity is obtained from an exclusive OR operation of the newly updated data and the old parity.

* * * * *